United States Patent
Shibata et al.

(10) Patent No.: US 8,933,003 B2
(45) Date of Patent: Jan. 13, 2015

(54) MULTIFUNCTIONAL HYDROCARBON OIL COMPOSITION

(75) Inventors: Junichi Shibata, Yokohama (JP); Hiroshi Kametsuka, Yokohama (JP); Masahiro Hata, Yokohama (JP); Satoshi Suda, Yokohama (JP); Masanori Ibi, Yokohama (JP); Tadaaki Motoyama, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 334 days.

(21) Appl. No.: 12/286,292

(22) Filed: Sep. 29, 2008

(65) Prior Publication Data

US 2009/0111723 A1 Apr. 30, 2009

Related U.S. Application Data

(63) Continuation of application No. PCT/JP2007/057702, filed on Mar. 30, 2007.

(30) Foreign Application Priority Data

| | | |
|---|---|---|
| Mar. 31, 2006 | (JP) | 2006-100763 |
| Mar. 31, 2006 | (JP) | 2006-100765 |
| Mar. 31, 2006 | (JP) | 2006-100767 |
| Mar. 31, 2006 | (JP) | 2006-100769 |
| Mar. 31, 2006 | (JP) | 2006-100773 |

(51) Int. Cl.
*C10M 105/34* (2006.01)
*C07C 9/00* (2006.01)
(Continued)

(52) U.S. Cl.
CPC .. *C11D 7/24* (2013.01); *B23H 1/08* (2013.01); *C10M 101/02* (2013.01);
(Continued)

(58) Field of Classification Search
USPC .......... 508/463; 585/16; 208/18, 19
See application file for complete search history.

(56) References Cited

U.S. PATENT DOCUMENTS

| 5,072,067 A | 12/1991 | Koyama et al. |
| 5,171,903 A | 12/1992 | Koyama et al. |

(Continued)

FOREIGN PATENT DOCUMENTS

| JP | 2-133495 | 5/1990 |
| JP | 6-506237 | 7/1994 |

(Continued)

*Primary Examiner* — Vishal Vasisth
(74) *Attorney, Agent, or Firm* — Preti Flaherty Beliveau & Pachios LLP

(57) ABSTRACT

A multifunctional, high-performance hydrocarbon composition is demanded. Concretely, a metalworking oil composition having high workability even under a severer lubricating condition while resisting to high productivity, and further capable of suppressing deterioration of working environments or degradation of quality of a product without rise of lubricant cost, a metalworking oil composition for minimal quantitative lubrication system, which is excellent in characteristics as a water-insoluble lubricant for nonferrous metalworking and also in characteristics as a lubricant for cutting/grinding by minimal quantitative lubrication method, and can attain improvement in working efficiency and a further extended tool life, an electric discharge machining oil improved in working environments such as odor or skin roughness and further improved in processing rate, particularly processing rate in high-level finish, a rust preventing oil composition improved in resin compatibility, and a detergent excellent in adaptability with organic material are demanded. Therefore, metalworking oil which contains, as hydrocarbon base oil, hydrocarbon base oil having a density at 15° C. of 0.7 to 0.8 g/cm³, and including a n-paraffin content of 10 to 90% by mass, an aromatic content of 0 to 3% by volume, and a naphthene content of 0 to 20% by volume, a metalworking oil including the above-mentioned base oil and ester oil, and electric discharge machining oil, rust preventing oil, and a detergent composition including the above-mentioned base oil are provided.

11 Claims, 1 Drawing Sheet

(51) Int. Cl.
*C10G 71/00* (2006.01)
*C11D 7/24* (2006.01)
*B23H 1/08* (2006.01)
*C10M 101/02* (2006.01)
*C10M 105/04* (2006.01)
*C10M 107/02* (2006.01)
*C10M 171/00* (2006.01)
*C23G 5/024* (2006.01)

(52) U.S. Cl.
CPC .......... *C10M 105/04* (2013.01); *C10M 107/02* (2013.01); *C10M 171/00* (2013.01); *C23G 5/024* (2013.01); *C10M 2205/173* (2013.01); *C10M 2207/026* (2013.01); *C10M 2207/126* (2013.01); *C10M 2207/2805* (2013.01); *C10M 2207/283* (2013.01); *C10M 2207/401* (2013.01); *C10M 2215/042* (2013.01); *C10M 2215/044* (2013.01); *C10M 2219/044* (2013.01); *C10N 2220/02* (2013.01); *C10N 2220/022* (2013.01); *C10N 2220/025* (2013.01); *C10N 2230/06* (2013.01); *C10N 2230/12* (2013.01); *C10N 2230/36* (2013.01); *C10N 2230/74* (2013.01); *C10N 2240/40* (2013.01)
USPC ............. 508/463; 585/16; 208/18; 208/19

(56) References Cited

U.S. PATENT DOCUMENTS

| | | | | |
|---|---|---|---|---|
| 5,547,592 | A * | 8/1996 | Nakagawa et al. | 508/511 |
| 6,093,861 | A | 7/2000 | Muntz | |
| 6,156,709 | A | 12/2000 | Muntz | |
| 2004/0256286 | A1* | 12/2004 | Miller et al. | 208/58 |
| 2005/0256352 | A1* | 11/2005 | Clark et al. | 585/14 |
| 2005/0277794 | A1* | 12/2005 | Cracknell et al. | 585/14 |
| 2006/0070913 | A1* | 4/2006 | Haase | 208/15 |
| 2006/0135376 | A1* | 6/2006 | Habeeb et al. | 508/244 |
| 2006/0201852 | A1* | 9/2006 | Rosenbaum et al. | 208/19 |
| 2006/0260983 | A1 | 11/2006 | Iki et al. | |
| 2007/0191240 | A1* | 8/2007 | Suda | 508/485 |
| 2008/0026967 | A1 | 1/2008 | Suda et al. | |

FOREIGN PATENT DOCUMENTS

| | | |
|---|---|---|
| JP | 2001-115179 | 4/2001 |
| JP | 2003-165993 | 6/2003 |
| JP | 2003-165994 | 6/2003 |
| JP | 2003-238994 | 8/2003 |
| JP | 2003-238995 | 8/2003 |
| JP | 2003-342595 | 12/2003 |
| JP | 2005-154471 | 6/2005 |
| JP | 2005-248071 | 9/2005 |
| JP | 2005-290163 | 10/2005 |
| JP | 2005 290222 | 10/2005 |
| WO | WO 2004/078887 | 9/2004 |

* cited by examiner

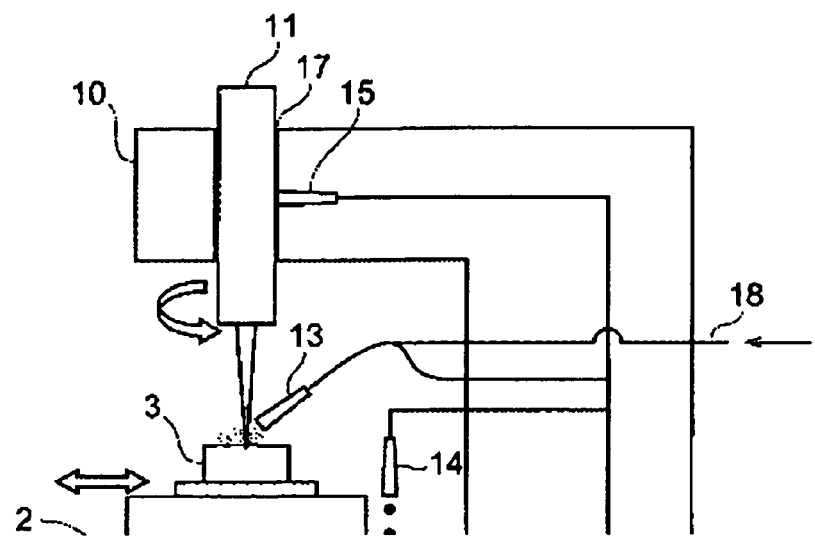

MULTIFUNCTIONAL HYDROCARBON OIL COMPOSITION

This application claims priority to International Application No. PCT/JP2007/057702, with an international filing date of Mar. 30, 2007, which claims priority from: Japanese Patent Application No. 2006-100763 filed Mar. 31, 2006; Japanese Patent Application No. 2006-100765 filed Mar. 31, 2006; Japanese Patent Application No. 2006-100767 filed Mar. 31, 2006; Japanese Patent Application No. 2006-100769 filed Mar. 31, 2006; and Japanese Patent Application No. 2006-100773 filed Mar. 31, 2006.

FIELD OF THE INVENTION

The present invention relates hydrocarbon oil-based multifunctional hydrocarbon oil compositions which are used as base oil for lubricant, diluent or various solvents, more specifically, to, for example, metalworking oils used in a variety of processing of various metals; another metalworking oil; electric discharge machining oil composition; rust preventing oil, for more detail, a rust preventing oil useful in application to a metallic member such as a steel plate or bearing; and detergent composition, for more detail, a detergent composition useful for washing a metallic part incorporated in a refrigeration cycle system such as a freezer, a refrigerator or an air conditioner, or a metallic part subjected to heat treatment.

BACKGROUND OF THE INVENTION

Conventionally, light hydrocarbon oil has been used as base oil for lubricant, diluent or various solvents. More specifically, such hydrocarbon oil is used in, for example, metalworking oil for a variety of processing of various metals, electric discharge machining oil, rust preventing oil, wash oil, and various other solvents. Since improvement in working environments such as volatility, flammability, odor, and safety for irritating property to skin is needed in the use of such light hydrocarbon oil, a multifunctional hydrocarbon oil composition containing such hydrocarbon oil must satisfy various required performances according to the purpose of use in addition to the above-mentioned improvement in working environments. As concrete modes of such a multifunctional hydrocarbon oil composition, for example, metalworking oil, other metalworking oil, electric discharge machining oil, rust preventing oil, and detergent composition as described above can be given. The background art in the respective concrete modes or in a first mode to a fifth mode will be described.

First Mode (Metalworking Oil)

An aluminum fin used in a heat exchanger for a freezing and refrigerating system such as a refrigerator or air conditioner is produced by performing plastic working such as stretching, drawing, stamping, curling, or ironing to an aluminum fin material. Such working of the aluminum fin material is generally performed using a working lubricant, which is prepared by adding an oily agent of fatty acid, fatty acid ester, higher alcohol, α-olefin or the like to mineral oil or synthetic hydrocarbon such as isoparaffin (e.g., refer to Patent Literature 1). However, since such a working lubricant cannot provide sufficient lubricity, adhesion of aluminum to a punch or damage of the material surface can be caused. However, an increased addition amount of additives for solving this problem inhibits performances as fin such as water leakage, in addition to deterioration of the working environments by increased odor and occurrence of a problem in appearance such as discoloration due to imperfect oil removal by heat.

In metal rolling of aluminum and aluminum alloy, conventionally, higher alcohol, fatty acid ester, fatty acid, alkylene glycol ester compound, α-olefin and the like have been used as an oily agent of rolling oil, with higher alcohol being most general, followed by fatty acid ester (refer to Patent Literatures 2 and 3).

However, for improving the productivity, rolling of metal at higher rate and higher draft is required, resulting in exposure of a lubricated portion to a further high temperature. In rolling of high-purity materials with aluminum purity of 99%, 99.9% and more than 99.99%, which are generally called two nines, three nines, and four nines, remarkable adhesion inhibits lubricity, generation of a large amount of abrasion powder disturbs improvement in productivity.

Therefore, a sufficient rolling limit cannot be ensured by addition of a known oily agent, and measures to increase the addition amount of the oily agent or to reduce the rolling rate or draft have been taken. However, the increase in amount of the oily agent causes problems of deterioration of plate quality such as staining at annealing, slip between a work roll and a rolled material, uneven brightness of a rolled plate surface, or increase in amount of abrasion powder; deterioration of working environments by increased oil odor; rise of rolling oil cost, and the like. On the other hand, a reduced rolling rate or draft undesirably causes reduction in productivity.

Patent Literature 1: Japanese Patent Application Laid-Open No. 2-133495
Patent Literature 2: Japanese Patent Application Laid-Open No. 2003-165993
Patent Literature 3: Japanese Patent Application Laid-Open No. 2003-165994

Second Mode (Metalworking Oil)

In cutting/grinding, a cutting/grinding lubricant are generally used for the purpose of improving productivity in machining such as extension of life of a tool used for working such as a drill, an end mill, a bite or a grinding wheel, improvement in surface roughness of a workpiece, and improvement in working efficiency resulting therefrom.

The cutting/grinding lubricant is roughly classified to two types, or a water-soluble cutting/grinding lubricant used by diluting a surfactant and a lubricating component with water and a water-insoluble cutting/grinding lubricant mainly composed of mineral oil and straightly used without dilution. In general, the water-insoluble cutting/grinding lubricant is excellent in lubricating performance, and the water-soluble cutting/grinding lubricant is excellent in cooling performance.

However, the cutting/grinding lubricant effective for improvement of working efficiency also have undesirable points viewed from another side, and a typical problem thereof is environmental effect. The lubricant is gradually deteriorated during use regardless of whether it is water-insoluble or water-soluble, and finally laid in an unusable state. In the water-soluble lubricant, for example, generation of microorganisms reduces the stability of the solution, resulting in separation of components, or remarkably deteriorates the hygienic environment, and the lubricant becomes unusable. In the water-insoluble lubricant, an acidic component produced in the progress of oxidation corrodes a metallic material, or remarkably changes the viscosity, and the lubricant becomes unusable. Further, the lubricant is wastefully used by adhesion to chips or the like.

In such a case, the deteriorated lubricant is disposed, and a new lubricant is used. The lubricant discharged as waste needs various treatments for preventing adverse effects on the environment. For example, a cutting/grinding lubricant which is developed while giving priority to the improvement in working efficiency frequently uses a chlorine-based compound which may generate toxic dioxin in incineration treatment or the like, and thus needs removing treatment of such a compound. Therefore, a cutting/grinding lubricant free from chlorine-based compound is also developed. However, even a cutting/grinding lubricant free from such a toxic component still has the problem of environmental effects associated with heavy discharge of waste. The water-soluble lubricant needs an expensive high-level treatment since it may contaminate environmental water areas.

As an example in which it is difficult to attain both improvement in working efficiency and reduction in environmental load, the manufacturing field of nonferrous metallic parts used as automobile parts or home electric parts can be given. More concretely, although the water-soluble lubricant is generally used for processing of a nonferrous metallic part made of aluminum, aluminum alloy or the like, the metal is frequently dissolved in the waste solution after processing, and treatment of the waste solution requires an enormous cost for treatment of waste solution. Further, in the use of the water-soluble lubricant, strict and frequent management is needed since decay of the lubricant or corrosion of the part surface will be caused if a lubricant having an optimum pH is not used.

Thus, dry working or application of water-insoluble lubricant has been examined for solving the above-mentioned problems in the field of nonferrous metal working.

On the other hand, as a new working method, development of cutting minimal quantitative lubrication type cutting/grinding method is increasingly expanded. This method comprises performing cutting/grinding while supplying a minimal amount of lubricant of about $1/100000$ to $1/1000000$, compared with the usage of lubricant in general cutting/grinding, to a workpiece together with a compressed fluid (e.g., compressed air). According to this system, a cooling effect by compressed air can be obtained, the amount of waste can be reduced since the minimal amount of lubricant is used, and the environmental effect associated with heavy discharge of waste can be also improved. Therefore, this method can be expected not only as a working method of nonferrous metal but also as a working method of ferrous metal.

In the minimal quantitative lubrication method, it is desired that a work with satisfactory surface can be obtained even with a minimal supply amount of lubricant, and cutting/grinding can be efficiently performed with minimized wear of a tool or the like, and further high performances are thus required for the cutting/grinding working oil. From the point of waste disposal or working environments, it is also desired that the lubricant has excellent biodegradability.

Further, in the minimal quantitative lubrication method, it is extremely important to generate satisfactory oil mist. If the state of oil mist is poor, the quantity of oil reaching a working point becomes insufficient due to pipe clogging, easily causing deterioration of working efficiency or reduction of tool life. On the other hand, if the oil is excessively easy to be misted, the oil discharged is scattered to contaminate the working environments. In this case, also, since a loss of oil is caused by scattering of the oil mist, the quantity of oil reaching the working point becomes insufficient due to the loss of oil by scattering of oil mist, easily causing deterioration of working efficiency or reduction of tool life.

Further, since the lubricant is supplied as oil mist in the minimal quantitative lubrication method, a lubricant with poor stability adheres to a machine tool inner part, a work, a tool, a mist collector inner part or the like during use, causing a sticking phenomenon, which hinders the treatment property to deteriorate the working efficiency. Therefore, in the development of lubricant used for the minimal quantitative lubrication method, a lubricant hard to stick is desired In view of such an actual condition, the present inventors proposed a metalworking oil composition for minimal quantitative lubrication method, which contains both ester oil and hydrocarbon oil having a specific kinematic viscosity (Patent Literature 4).

Patent Literature 4: Japanese Patent Application Laid-Open No. 2006-290163

Third Mode (Electric Discharge Machining Oil)

Electric discharge machining is a method for accurately working a workpiece by opposing an electrode (copper, graphite, etc.) to a conductive workpiece within an insulating medium while keeping a narrow space of several microns to several tens microns between the both, and supplying a voltage from a working power source in a pulse-like manner through the space, thereby causing electric discharge when the space between the electrode and the workpiece corresponds to an interval of starting electric discharge at the voltage.

The processing rate (processing efficiency) is a scale showing how much the capability of the power source can be brought out, and it is one of basic performances in electric discharge machining together with processing accuracy (shown by irregularities on a working surface, namely, surface roughness or contamination of the working surface by adhesion of a combustion residue such as oil by discharge or so-called staining/non-staining).

The electric discharge machining oil used as the insulating medium seriously affects not only the processing accuracy but also the processing rate, and plays important roles of scattering molten metal caused by electric discharge machining, discharging scattered working powders out of electrodes, cooling a heated part by electric discharge machining, restoring insulation between electrodes, or the like.

As the base oil of such electric discharge machining oil, in general, a hydrocarbon solvent such as mineral oil, normal paraffin or isoparaffin is used (Patent Literatures 5, 6 and 7).

Patent Literature 5: Japanese Patent Application Laid-Open No. 2001-115179

Patent Literature 6: Japanese Patent Application Laid-Open No. 2003-342595

Patent Literature 7: Japanese Patent Application Laid-Open No. 2005-154471

Fourth Mode (Rust Preventing Oil Composition)

In the field of metallic members such as a steel plate, a bearing or the like, rust preventing oil is generally applied to a produced member for preventing rusting.

As the rust preventing oil, in addition to those used only for simply preventing rusting, a cleaning rust preventing oil having a cleaning effect, and a multifunctional rust preventing oil such as a rust preventing-working oil having both an effect of preventing rusting of an intermediate product and a lubricating effect in the following working process are known. In these rust preventing oils, base oil having a relatively low viscosity or base oil obtained by mixing low-viscosity base oil with high-viscosity base oil is frequently used.

Fifth Mode (Detergent Composition)

A metallic part generally generates abrasion powder since it is subjected to a metal working process such as cutting, grinding, or press working. The abrasive powder causes a lack of oil film, leading to rusting, since the abrasive powder itself easily rusts and easily absorbs an oil content such as rust preventing oil. The abrasion powder or dust left on a steel plate used for an automobile body or the like may cause a problem of flawing during press molding. Therefore, a cleaning process is unavoidable for the metallic part for various reasons described above (Patent Literatures 8 and 9).

Patent Literature 8: Japanese Patent Application Laid-Open No. 2003-238994

Patent Literature 9: Japanese Patent Application Laid-Open No. 2003-238995

DISCLOSURE OF THE INVENTION

Problems to be Solved by the Invention

Under such actual conditions, the present invention is achieved in view of the following situations of the concrete modes or the first to fifth modes including metalworking oil, another metalworking oil, electric discharge machining oil, rust preventing oil, and detergent composition described above.

First Mode (Metalworking Oil)

The present invention provides, in relation to the first mode, a metalworking oil composition, which has high workability even under a severe lubricating condition in response to demand of high productivity, and further can suppress the deterioration of working environments or the degradation of product quality without increase in lubricant cost.

Second Mode (Metalworking Oil)

The present invention provides, in relation to the second mode, a metalworking oil composition for minimal quantitative lubrication method, which is further excellent in features as water-insoluble lubricant for nonferrous metalworking and in features as cutting/grinding working oil for minimal quantitative lubrication method, and can attain improvement in processing efficiency and a further extended tool life.

Third Mode (Electric Discharge Machining Oil)

In recent years, various examinations have been made in response to requirements of improvement in working environments such as odor or skin roughness and further improvement in processing rate, particularly improvement in processing rate in high-level finishing. However, the above-mentioned conventional hydrocarbon solvent cannot provide sufficient effects. The present invention is attained, in relation to the third mode, in view of the problem of the above-mentioned related art.

Fourth Mode (Rust Preventing Oil Composition)

In an apparatus including a metallic member such as a steel sheet or a bearing, members composed of various organic materials are used in addition to the metallic member. Therefore, rust preventing oil used therefor is needed to be excellent also in adaptability with the organic materials. However, the conventional rust preventing oil may cause deterioration of such members composed of organic materials.

Further, when an organic material is used as a packaging material in shipping of the metallic member, the packaging material may be deteriorated. In view of such circumstances, the present inventors proposed rust preventing oil having high adaptability to organic material (Patent Literature 10).

Patent Literature 10: Japanese Patent Application Laid-Open No. 2005-290163

In view of the problem of the related art, the present invention provides, in relation to the fourth mode, rust preventing oil which has sufficiently high adaptability to organic material with excellent treatment property, and can sufficiently prevent rusting of the metallic member.

Fifth Mode (Detergent Composition)

In an apparatus including a metallic part such as a steel sheet or a bearing, members composed of various organic materials are generally used in addition to the metallic part. Therefore, the detergent used therefor is needed to be excellent in adaptability with the organic materials.

When an organic material is used as a packaging material in shipping of the metallic part, the packaging material may be deteriorated. Namely, improvement in compatibility with resin is required.

In view of the problem of the related art, the present invention provides, in relation to the fifth mode, a detergent which has sufficiently high adaptability to organic material and excellent cleaning property for metallic parts.

Means to Solve the Problems

Namely, a first aspect of the present invention relates to a multifunctional hydrocarbon oil composition, which contains hydrocarbon oil having density at 15° C. of 0.7 to 0.8 g/cm$^3$, and including n-paraffin content of 10 to 90% by mass, aromatic component of 0 to 3% by volume, and naphthene content of 0 to 20% by volume.

In a second aspect of the present invention, in the multifunctional hydrocarbon oil composition of the first aspect of the invention, the hydrocarbon oil is a kerosene/light oil fraction produced by a production process including at least one process selected from Fischer-Tropsch (FT) synthesis process, hydrocracking process for wax-containing component, and hydrogenation refining process for components obtained from these processes.

In a third aspect of the present invention, the multifunctional hydrocarbon oil composition of the first or second aspect of the invention is used for any one of ink/paint solvent, cleaning solvent, aerosol solvent, solvent for antiseptic agent/insecticide/agricultural chemicals, solvent for pressure sensitive paper, surfactant diluent, diluent for wax/cleaner/polisher, automotive undercoating agent, printing solvent, organosol, pigment dispersant, blanket detergent, semiconductor detergent, plating pretreatment agent, 2-cycle engine oil, lubricating oil, tire manufacturing adhesive, adhesive, release agent, polyolefin reaction solvent, household cleaner, NAD paint, ore floatation agent, print ink cleaning fluid, remover for automobile temporary protective paint (mainly composed of wax), wood preservative, herbicide, non-carbon paper, water treatment agent, metal extraction diluent, $CO_2$ production for green-house, and metal flaw detecting agent.

In a fourth aspect of the present invention which relates to the first mode for metalworking oil, the multifunctional hydrocarbon oil composition of the first or second aspect of the invention is a metalworking oil composition.

In a fifth aspect of the present invention which relates to the second mode for metalworking oil, the multifunctional hydrocarbon oil composition of the first or second aspect of the invention is a metalworking oil composition further comprising an ester.

In a sixth aspect of the invention which relates to the third mode for electric discharge machining oil, the multifunctional hydrocarbon oil composition of the first or second aspect of the invention is an electric discharge machining oil composition.

In a seventh aspect of the invention which relates to the fourth mode for rust preventing composition, the multifunctional hydrocarbon oil composition of the first or second aspect of the invention is a rust preventing oil composition.

In an eighth aspect of the invention which relates to the fifth mode for detergent composition, the multifunctional hydrocarbon oil composition of the first or second aspect of the invention is a detergent composition.

Effect of the Invention

A hydrocarbon composition which can improve working environments such as safety to volatility, flammability, odor, or skin irritating property and further exhibit various functions can be obtained by including a hydrocarbon oil according to the present invention. The effects of the invention in the concrete modes or the first to fifth modes including metalworking oil, another metalworking oil, electric discharge machining oil, rust preventing oil, and detergent composition described above are as follows.

First Mode (Metalworking Oil Composition)

By using metalworking oil containing hydrocarbon oil having a density at 15° C. of 0.7 to 0.8 g/cm$^3$, and including n-paraffin content of 10 to 90% by mass, an aromatic content of 0 to 3% by volume, and naphthene content of 0 to 20% by volume, the workability in aluminum fin pressing and aluminum rolling can be improved while reducing the odor of lubricant which is undesirable from the point of working environments.

Second Mode (Metalworking Oil Composition)

Further excellent features as water-insoluble lubricant for nonferrous metal working and as cutting/grinding lubricant for minimal quantitative lubrication method can be ensured, and improvement in processing efficiency and a further extended tool life can be attained. Particularly, in metalworking by minimal quantitative lubrication method, workability, particularly, misting feature can be improved.

Third Mode (Electric Discharge Machining Oil Composition)

Electric discharge machining oil capable of attaining improvement in working environments such as odor or skin roughness, and further improvement in processing rate, particularly, improvement in processing rate in high-level finishing can be provided.

Fourth Mode (Rust Preventing Oil Composition)

The resin compatibility as rust preventing oil composition can be improved.

Fifth Mode (Detergent Composition)

A solvent with improved resin compatibility can be provided. Namely, a detergent having sufficiently high adaptability to organic material and excellent cleaning property for metallic parts can be provided.

BRIEF DESCRIPTION OF THE DRAWING

FIG. 1 is an illustrative view showing one example of a machine tool suitably used in cutting/grinding by minimal quantitative lubrication method in relation to a second embodiment of the present invention.

The numerical references in FIG. 1 are as follows:
1. Bed, 2. Table, 3. Workpiece, 11. Tool, 12. Oil feeding tank, 13. Working oil supply part, 14. Sliding surface oil supply part, 15. Bearing oil supply part, 16. Sliding surface, 17. Bearing part, 18. Compressed air inlet part

BEST MODE FOR CARRYING OUT THE INVENTION

Production of hydrocarbon oil which is used as base oil of the multifunctional hydrocarbon oil composition of the present invention will be described first.

The hydrocarbon oil in the present invention is preferably a kerosene/light oil fraction produced, for example, by a production process including at least one process selected from Fischer-Tropsch (FT) synthesis process, hydrocracking process for wax-containing component, and hydrogenation refining process for components obtained from these processes, although the production method therefor is not particularly limited.

The FT synthesis process is a process for applying Fischer-Tropsch (FT) reaction to a mixed gas mainly composed of hydrogen and carbon monoxide (often called also synthetic gas), and gases, liquid fractions corresponding to boiling point ranges of naphtha, kerosene and light oil, paraffin wax (FT wax) and the like are obtained through this process.

The hydrocracking process for wax-containing component is a process for hydrocracking a wax-containing component such as the FT wax or a slack wax which is by-produced in lubricant dewaxing process (which may include isomerization reaction), and gases, liquid fractions corresponding to boiling point ranges of naphtha, kerosene and light oil, lubricant fractions and the like are obtained through this process.

The hydrogenation refining process is a process for hydrogenation refining components obtained through either one or both of the two above-mentioned processes (which may include hydrocracking/isomerization reaction).

In the present invention, kerosene/light oil fractions obtained through each of the processes can be used singly or in combination of two or more kinds thereof, or kerosene/light oil fractions obtained separately through the respective processes can be used in combination of two or more kinds thereof.

The kerosene/light oil fraction referred to herein means a fraction having a boiling point range of 140 to 400° C., preferably 150 to 360° C. under ordinary pressure, with the boiling point range of kerosene fraction being, in general, 140 to 300° C., preferably 150 to 260° C., and the boiling point range of light oil fraction being 150 to 400° C., preferably 180 to 360° C. In the present invention, the kerosene/light oil fraction can be adjusted, as needed, to a desired boiling point range by distillation or the like without departing from the above-mentioned boiling point range.

Each of the FT synthesis process, the hydrocracking process, and the hydrogenation refining process will be then described.

(FT Synthesis Process)
[Raw Material Gas]

The mixed gas used as raw material is mixed gas mainly composed of hydrogen and carbon monoxide, which is obtained by oxidizing a carbon-containing material by use of oxygen and/or water and/or carbon dioxide as oxidizer, and further adjusting hydrogen and carbon monoxide concentrations in the resulting product to predetermined concentrations, respectively, as needed, by shift reaction using water. As the carbon-containing material, a gas component composed of hydrocarbon which is gaseous at ordinary temperature such as natural gas, petroleum liquefied gas or methane gas, and a mixed gas obtained by exposing petroleum asphalt, biomass, coal, waste such as building material or garbage, sludge, heavy crude oil difficult to treat by ordinary methods, unconventional petroleum resources or the like to high temperature are generally used. However, the present invention never limits the raw material as long as it can provide a mixed gas mainly composed of hydrogen and carbon monoxide.

[Catalyst Species]

The Fischer-Tropsch reaction needs a metal catalyst. In the metal catalyst, preferably, a metal of Group 8 of the periodic table, for example, cobalt, ruthenium, rhodium, palladium, nickel, iron or the like, further preferably, a metal of Period 4 of Group 8 is used. A metal group composed of an appropriate mixture of such metals is also usable. Such an active metal is generally used in the form of a catalyst obtained by supporting it on a carrier such as silica, alumina, titania, silica alumina or the like. The catalytic performance can be improved by using a second metal in combination with the above-mentioned active metal. Examples of the second metal include alkali metal and alkali earth metal, concretely, zirconium, hafnium, titanium and the like as well as sodium, lithium and magnesium, and the second metal is appropriately used according to a purpose such as improvement in conversion rate of carbon monoxide or increase in chain growth probability (α) that is an index of wax production.

[Raw Material Mixed Gas Composition]

The Fischer-Tropsch reaction is a synthetic method for generating liquid fractions and paraffin wax, using a mixed gas as raw material. For efficiently performing the synthetic method, in general, it is preferred to control the ratio of hydrogen to carbon monoxide in the mixed gas. The molar mixing ratio of hydrogen to carbon monoxide is set to preferably 1.2:1 or more, more preferably 1.5:1 or more, further more preferably 1.8:1 or more. The molar ratio is also set to preferably 3:1 or less, more preferably 2.6:1 or less, further more preferably 2.2:1 or less.

[Reaction Temperature]

When the Fischer-Tropsch reaction is performed using the above-mentioned catalyst, the reaction temperature is set to preferably 180° C. or higher and 320° C. or lower, more preferably 200° C. or higher and 300° C. or lower. At a reaction temperature below 180° C., the carbon monoxide is hardly reacted, and the hydrocarbon yield tends to fall. At a reaction temperature exceeding 320° C., production of gas such as methane increases, while the production efficiency of liquid fractions and paraffin wax falls.

[Liquid Hourly Space Velocity]

The gas space velocity to the catalyst is preferably 500 $h^{-1}$ or more and 4000 $h^{-1}$ or less, more preferably 1000 $h^{-1}$ or more and 3000 $h^{-1}$ or less, although it is not particularly limited. When the gas space velocity is below 500 $h^{-1}$, the productivity of liquid fuel tends to fall, and when it exceeds 4000 $h^{-1}$, the reaction temperature must be raised, and further the gas production is increased, resulting in reduction in yield of an objective substance.

[Reaction Pressure]

The reaction pressure (partial pressure of synthetic gas composed of carbon monoxide and hydrogen) is set to preferably 0.5 MPa or more and 7 MPa or less, more preferably 2 MPa or more and 4 MPa or less, although it is not particularly limited. At a reaction pressure less than 0.5 MPa, the yield of liquid fractions tends to fall, and at a reaction pressure exceeding 7 MPa, the amount of equipment investment tends to uneconomically increase.

(Hydrogenation Refining Process, Hydrocracking Process)

A component and/or wax-containing component obtained through the FT synthesis process is hydrogenation-refined or hydrocracked by an optional method. Whether hydrogenation refining or hydrocracking can be selected according to the purpose, and these methods can be used singly or in combination without any limitation as long as a hydrocarbon oil of the present invention can be produced thereby.

(Hydrogenation Refining Process)

This process is a process for hydrogenation-refining mainly a component obtained through the FT synthesis process and/or a component obtained through the hydrocracking process for wax-containing component described in detail later. The reaction in this process may include hydrocracking/isomerization reaction.

[Catalyst Species]

The catalyst used for the hydrogenation refining generally comprises a hydrogenation active metal supported on a porous carrier. The present invention never limits the form of the catalyst as long as it can provide the same effect.

As the porous carrier, an inorganic oxide such as alumina is generally used. Concrete examples of the inorganic oxide include alumina, titania, zirconia, boria, silica and zeolite.

Zeolite is a crystalline aluminosilicate, including faujasite, pentasil, and mordenite types, and preferably faujasite, beta or mordenite type zeolite, particularly preferably, Y-type or beta-type zeolite is used. As the Y-type zeolite, a hyperstabilized one is preferred.

As the active metal, the following two types (active metal type A and active metal type B) are preferably used.

The active metal type A is at least one selected from metals of Group 8 of the periodic table, preferably at least one selected from Ru, Rd, Ir, Pd and Pt, further preferably, Pd and/or Pt. As the active metal, these metals may be used in combination, for example, including Pt—Pd, Pt—Rh, Pt—Ru, Ir—Pd, Ir—Rh, Ir—Ru, Pt—Pd—Rh, Pt—Rh—Ru, Ir—Pd—Rh, or Ir—Rh—Ru. When a noble metal-based catalyst composed of such metals is used, the catalyst can be subjected to preliminary reduction treatment under a hydrogen gas flow prior to use. Generally, the active metal on the catalyst is reduced by distributing a gas containing hydrogen and giving heat of 200° C. or higher according to a predetermined procedure, whereby hydrogenating activity is developed.

As the active metal type B, a catalyst containing at least one selected from metals of Group 6A and Group 8 of the periodic table, desirably containing two or more metals selected from metals of Group 6A group and group 8, for example, Co—Mo, Ni—Mo, Ni—Co—Mo, or Ni—W, can be used. When a metal sulfide catalyst composed of such metals is used, preliminary sulfidization process must be included.

As the metal source, a general inorganic salt or complex salt can be used, and as the supporting method of metal, any one of supporting methods used in general hydrogenating catalysts such as impregnation method or ion exchange method can be used. When a plurality of metals is supported, the metals may be simultaneously supported using a mixed solution thereof, or successively supported using respective single solutions. The metal solution can be an aqueous solution or a solution using an organic solvent.

[Reaction Temperature]

When the hydrogenation refining is performed using a catalyst of the active metal type A, the reaction temperature is set to preferably 180° C. or higher and 400° C. or lower, more preferably 200° C. or higher and 370° C. or lower, further preferably 250° C. or higher and 350° C. or lower, further more preferably 280° C. or higher and 350° C. or lower. When the reaction temperature in the hydrogenation refining exceeds 370° C., the side reaction of cracking to naphtha fraction undesirably increases to remarkably reduce the yield of intermediate fractions. When the reaction temperature is below 170° C., alcoholic contents are undesirably left without being removed.

When the hydrogenation refining is performed using a catalyst of the active metal type B, the reaction temperature is set to preferably 170° C. or higher and 320° C. or lower, more preferably 175° C. or higher and 300° C. or lower, further more preferably 180° C. or higher and 280° C. or lower. When the reaction temperature in the hydrogenation refining exceeds 320° C., the side reaction of cracking to naphtha fraction undesirably increases to remarkably reduce the yield of intermediate fractions. When the reaction temperature is below 170° C., alcohol contents are undesirably left without being removed.

[Hydrogen Pressure]

In the hydrogenation refining using the active metal type A catalyst, the hydrogen pressure is set to preferably 0.5 MPa or more and 12 MPa or less, more preferably 1.0 MPa or more and 5.0 MPa or less. Although the hydrogenation reaction is promoted more as the hydrogen pressure is higher, an optimum point generally exists from an economical standpoint.

In the hydrogenation refining using the active metal type B catalyst, the hydrogen pressure is set to preferably 2 MPa or more and 10 MPa or less, more preferably 2.5 MPa or more and 8 MPa or less, further preferably 3 MPa or more and 7 MPa or less. Although the hydrogenation reaction is promoted more as the hydrogen pressure is higher, an optimum point generally exists from an economical standpoint.

[LHSV]

In the hydrogenation refining using the active metal type A catalyst, the liquid hourly space velocity (LHSV) is set to preferably $0.1\ h^{-1}$ or more and $10.0\ h^{-1}$ or less, more preferably $0.3\ h^{-1}$ or more and $3.5\ h^{-1}$ or less. Although a lower LHSV is more advantageous for the reaction, an excessively low velocity is undesirable from an economical standpoint since an extremely large reaction tower volume is needed with excessive equipment investment.

In the hydrogenation refining using the active metal type B catalyst, the liquid hourly space velocity (LHSV) is set to preferably $0.1\ h^{-1}$ or more and $2\ h^{-1}$ or less, more preferably $0.2\ h^{-1}$ or more and $1.5\ h^{-1}$ or less, further preferably $0.3\ h^{-1}$ or more and $1.2\ h^{-1}$ or less. Although a lower LHSV is more advantageous for the reaction, an extremely low velocity is undesirable from an economical standpoint since an extremely large reaction tower volume is needed with excessive equipment investment.

[Hydrogen/Oil Ratio]

In the hydrogenation refining using the active metal type A catalyst, the hydrogen/oil ratio is set to preferably 50 NL/L or more and 1000 NL/L or less, more preferably 70 NL/L or more and 800 NL/L or less. Although the hydrogenation reaction is promoted more as the hydrogen/oil ratio is higher, an optimum point generally exists from an economical standpoint.

In the hydrogenation refining using the active metal type B catalyst, the hydrogen/oil ratio is set to preferably 100 NL/L or more and 800 NL/L or less, more preferably 120 NL/L or more and 600 NL/L or less, further preferably 150 NL/L or more and 500 NL/L or less. Although the hydrogenation reaction is promoted more as the hydrogen/oil ratio is higher, an optimum point generally exists from an economical standpoint.

(Hydrocracking Process)

This process is a process for hydrocracking a wax-containing component, preferably, the above-mentioned FT wax. The reaction in this process may include isomerization reaction.

[Catalyst Species]

The catalyst used for hydrocracking generally comprises a hydrogenation active metal supported on a carrier having solid acid property. The present invention never limits the form of the catalyst as long as it can provide the same effect.

As the carrier having solid acid property, amorphous series and crystalline zeolite are generally used. Concretely, examples of the amorphous series include silica-alumina, silica-magnesia, silica-zirconia, and silica-titania, and examples of the zeolite include faujasite type, beta type, MFI type, and mordenite type. Preferably, faujasite, beta, MFI or mordenite type zeolite, more preferably, Y-type or beta-type zeolite is used. As the Y-type zeolite, a hyperstabilized one is preferred.

As the active metal, the following two types (active metal type C and active metal type D) are preferably used.

The active metal type C is at least one selected from metals of Group 6A and Group 8 of the periodic table, preferably at least one selected from Ni, Co, Mo, Pt, Pd and W. When a noble metal-based catalyst composed of such metals is used, the catalyst can be subjected to preliminary reduction treatment under a hydrogen gas flow prior to use. The active metal on the catalyst is generally reduced by distributing gas containing hydrogen and giving heat of 200° C. or higher according to a predetermined procedure, whereby the hydrogenating activity is developed.

As the catalyst of the active metal type D, these metals can be used in combination of, for example, Pt—Pd, Co—Mo, Ni—Mo, Ni—W, Ni—Co—Mo or the like.

The catalyst composed of such metals is preferably subjected to preliminary sulfidization prior to use.

As the metal source, a general inorganic salt or complex salt can be used, and as the supporting method of metal, any one of supporting methods used in general hydrogenating catalysts such as impregnation method or ion exchange method can be used. When a plurality of metals is supported, the metals can be simultaneously supported using a mixed solution thereof, or successively supported using respective single solutions. The metal solution may be an aqueous solution or a solution using an organic solvent.

[Reaction Temperature]

When the hydrocracking is performed using catalysts of the active metal type C and the active metal type D, the reaction temperature is set to preferably 200° C. or higher and 450° C. or lower, more preferably 250° C. or higher and 430° C. or lower, further more preferably 300° C. or higher and 400° C. or lower. When the reaction temperature in the hydrocracking exceeds 370° C., the side reaction of cracking to naphtha fraction undesirably increases to extremely reduce the yield of intermediate fractions. On the other hand, at a temperature below 200° C., the activity of the catalyst is undesirably reduced.

[Hydrogen Pressure]

In the hydrocracking using the active metal type C and active metal type D catalysts, the hydrogen pressure is set to preferably 1 MPa or more and 20 MPa or less, more preferably 4 MPa or more and 16 MPa or less, further more preferably 6 MPa or more and 13 MPa or less. Although the hydrogenation reaction is promoted more as the hydrogen pressure is higher, the cracking reaction is rather decelerated at such a temperature, causing the necessity to adjust the progress by raising the reaction temperature, which consequently leads to a reduction in catalyst life. Therefore, an optimum point generally exists from an economical standpoint.

[LHSV]

In the hydrocracking using the active metal type C catalyst, the liquid hourly space velocity (LHSV) is set to preferably $0.1\ h^{-1}$ or more and $10\ h^{-1}$ or less, more preferably $0.3\ h^{-1}$ or more and $3.5\ h^{-1}$ or less. Although a lower LHSV is more advantageous for the reaction, an extremely low LHSV is undesirable from an economical standpoint since an extremely large reaction tower volume is needed with excessive equipment investment.

In the hydrocracking using the active metal type D catalyst, the liquid hourly space velocity (LHSV) is set to preferably $0.1\ h^{-1}$ or more and $2\ h^{-1}$ or less, more preferably $0.2\ h^{-1}$ or more and $1.7\ h^{-1}$ or less, further more preferably $0.3\ h^{-1}$ or more and $1.5\ h^{-1}$ or less. Although a lower LHSV is more advantageous for the reaction, an extremely low LHSV is undesirable from an economical standpoint since an extremely large reaction tower volume is needed with excessive equipment investment.

[Hydrogen/Oil Ratio]

In the hydrocracking using the active metal type C catalyst, the hydrogen/oil ratio is set to preferably 50 NL/L or more and 1000 NL/L, more preferably 70 NL/L or more and 800 NL/L or less, further more preferably 400 NL/L or more and 1500 NL/L or less. Although the hydrogenation reaction is promoted more as the hydrogen/oil ratio is higher, an optimum point generally exists from an economical standpoint.

In the hydrocracking using the active metal type D catalyst, the hydrogen/oil ratio is set to preferably 150 NL/L or more and 2000 NL/L or less, more preferably 300 NL/L or more and 1700 NL/L or less, further more preferably 400 NL/L or more and 1500 NL/L or less. Although the hydrogenation reaction is promoted more as the hydrogen/oil ratio is higher, an optimum point generally exists from an economical standpoint.

[Apparatus]

An apparatus for the hydrogenation treatment can have any structure. Namely, the apparatus may include a single reaction tower or a combination of a plurality of reaction towers, with additional injection of hydrogen between the reaction towers, and may include a facility for gas-liquid separating operation or for hydrogen sulfide removal and a distillation tower for obtaining desired fractions by fractioning a hydrogenation product.

The hydrogenation treatment apparatus in the present invention can take a fixed bed system as a reaction form. The apparatus can take, as a form of hydrogen flow to raw material oil, each form of counter flow and parallel flow, and further a combined form of counter flow and parallel flow by including a plurality of reaction towers. A downflow form or gas-liquid double parallel flow form is generally adapted. For the purpose of removing the reaction heat or raising the hydrogen partial pressure, hydrogen gas may be injected to the middle stage of the reaction tower as quench.

The light oil/kerosene fraction produced as above by a production process including at least one process selected from the Fischer-Tropsch synthesis process, the hydrocracking process for wax-containing component and the hydrogenation refining process for components obtained from these processed can be used as the hydrocarbon oil of the present invention.

The hydrocarbon oil of the present invention is produced as above.

The thus-produced hydrocarbon oil is suitably used for the above-mentioned metalworking oil composition, the metalworking oil composition containing ester as an essential component, the electric discharge machining oil composition, the rust preventing oil and the detergent compositions of the first to the fifth modes, and further used for ink/paint solvent, cleaning solvent, aerosol solvent, solvent for antiseptic agent/insecticide/agricultural chemicals, solvent for pressure sensitive paper, surfactant diluent, wax/cleaner/polisher diluent, automotive undercoating agent, printing solvent, organosol, pigment dispersant, blanket detergent, semiconductor detergent, plating pretreatment agent, 2-cycle engine oil, lubricating oil, tire manufacturing adhesive, adhesive, release agent, polyolefin reaction solvent, household cleaner, NAD paint, ore floatation agent, print ink cleaning fluid, remover for vehicle temporary protective paint (mainly composed of wax), wood preservative, herbicide, non-carbon paper, water treatment agent, metal extraction diluent, $CO_2$ production for green-house, metal flaw detecting agent and the like.

The properties of the thus-produced hydrocarbon oil will be then described.

The hydrocarbon oil of the present invention has a density at 15° C. of 0.7 to 0.8 g/cm³, and includes n-paraffin content of 10 to 90% by mass, aromatic content of 0 to 3% by volume and naphthene content of 0 to 20% by volume.

The density at 15° C. of the hydrocarbon oil of the present invention (g/cm³, JIS K2249 (hereinafter the same applies to)) is 0.7 to 0.8 g/cm³, preferably 0.70 to 0.80 g/cm³, more preferably 0.72 to 0.79 g/cm³, further more preferably 0.73 to 0.785 g/cm³. When the density is below the above-mentioned range, a reduced flash point may cause deterioration of workability in the metalworking oil, increase of supply in the electric discharge machining oil, and deterioration of compatibility with organic resin material in the rust preventing oil and the detergent. On the other hand, when the density is above this range, deterioration of oil removability in the metalworking oil, the rust preventing oil and the detergent, and cooling failure of heated part and insufficient prevention of scattering and removal of molten metal (working powder) in the electric discharge machining oil are undesirably caused.

The n-paraffin content (% by mass) of the hydrocarbon oil of the present invention is 10 to 90% by mass, preferably 20 to 80% by mass, further preferably 30 to 70% by mass. When the content is below this range, deterioration of workability in the metalworking oil, and deterioration of compatibility with organic resin material in the rust preventing oil and the detergent are caused in addition to occurrence of a problem in odor. When the content is above this range, the compatibility with ester oil and the solubility of additive are undesirably deteriorated.

The aromatic content (% by volume) in the hydrocarbon oil of the present invention is 0 to 3%, preferably 0 to 2%, more preferably 0 to 1%. A higher aromatic content may lead to deterioration of working environments by emission of odor, development of skin irritating property or the like. Further, the compatibility with organic resin material is undesirably deteriorated in the rust preventing oil and the detergent.

The naphthene content (% by volume) in the hydrocarbon oil of the present invention is 0 to 20%, preferably 0 to 10%, further preferably 0 to 5%. A higher naphthene content undesirably causes emission of odor which leads to deterioration of working environments, and further develops the skin irritating property.

The kinematic viscosity at 40° C. of the hydrocarbon oil of the present invention (mm²/s, JIS K2283 (hereinafter the same applies to)) is preferably 0.5 to 9 mm²/s, further preferably 1.0 to 5.5 mm²/s, more preferably 1.2 to 5.0 mm²/s although it is not particularly limited. When the kinematic viscosity is below this range, a reduced flash point may cause deterioration of workability in the metalworking oil, increase of supply in the electric discharge machining oil, deterioration of rust preventing performance in the rust preventing oil, and deterioration of compatibility with organic resin material in the detergent. A kinematic viscosity above this range may cause deterioration of oil removability in the metalworking oil and the rust preventing oil, cooling failure of heated part and insufficient prevention of scattering and removal of molten metal (working powder) in the electronic discharge machining oil, and deterioration of cleaning property in the detergent.

The flash point (° C.) of the hydrocarbon oil of the present invention, which is measured by tag closed cup type or Pensky-Martens closed cup type flash point testing method according to the regulation of JIS K2265 (hereinafter the same applied to), is preferably 50 to 200° C., more preferably 55 to 150° C., further preferably 58 to 140° C. although it is not particularly limited. A lower flash point may increase the risk of fire, while a higher flash point may cause deterioration of removability in the metalworking oil and the rust preventing oil, and deterioration of cleaning property in the detergent.

The aniline point (° C., JIS K2256 (hereinafter the same applies to)) of the hydrocarbon oil of the present invention is preferably 65 to 110° C., more preferably 70 to 110° C., further more preferably 75 to 110° C. although it is not particularly limited. At an aniline point lower than it, processing performance may be deteriorated.

The sulfur content (ppm by mass, JIS K2541 (hereinafter the same applies to) of the hydrocarbon oil of the present invention is preferably 0 to 30 ppm by mass, more preferably 0 to 10 ppm by mass, further more preferably 0 to 5 ppm by mass, most preferably 0 to 1 ppm by mass although it is not particularly limited. A higher sulfur content may cause deterioration of odor.

The distillation property (° C.) of the hydrocarbon oil of the present invention is based on Engler distillation (JIS K2254 (hereinafter the same applies to)).

The initial boiling point (° C.) of the hydrocarbon oil of the present invention is preferably 140 to 280° C., more preferably 150 to 275° C., further more preferably 160 to 270, most preferably 165 to 265° C. although it is not particularly limited. A lower initial boiling point may cause increase of usage in the metalworking oil, increase of supply in the electric discharge machining oil, and deterioration of compatibility with organic resin material in the rust preventing oil and the detergent.

The 10%-distillation point (° C.) of the hydrocarbon oil of the present invention is preferably 150 to 290° C., more preferably 160 to 285° C., further preferably 170 to 280° C., most preferably 180 to 275° C. although it is not particularly limited.

The 50%-distillation point (° C.) of the hydrocarbon oil of the present invention is preferably 170 to 320° C., more preferably 180 to 310° C., further preferably 190 to 300° C., most preferably 195 to 290° C. although it is not particularly limited.

The 90%-distillation point (° C.) of the hydrocarbon oil of the present invention is preferably 180 to 390° C., more preferably 190 to 370° C., further preferably 200 to 340° C., particularly preferably 210 to 330° C. although it is not particularly limited.

The end point (° C.) of the hydrocarbon oil of the present invention is preferably 190 to 400° C., more preferably 200 to 380° C., further preferably 210 to 350° C., most preferably 220 to 340° C. although it is not particularly limited. A higher end point (° C.) may cause deterioration of removability in the metalworking oil.

$T_{90}$-$T_{10}$ (° C.) in the hydrocarbon oil of the present invention is preferably 15 to 160° C., more preferably 20 to 150° C., further preferably 30 to 140° C., particularly preferably 35 to 135° C. although it is not particularly limited. When the range of $T_{90}$-$T_{10}$ (° C.) is too narrow, the solubility of additive is deteriorated, and when it is too wide, change in properties of base oil becomes serious during circulated use in rolling working in addition to deterioration of oil removability, and increase of supply, cooling failure of heated part, and insufficient prevention of scattering and removing of molten metal (working powder) are undesirably caused in the electric discharge machining oil.

EP-IBP (° C.) in the hydrocarbon oil of the present invention is preferably 35 to 200° C., more preferably 40 to 190° C., further preferably 50 to 180° C., particularly preferably 60 to 170° C. although it is particularly limited. When the range of EP-IBP (° C.) is too narrow, the solubility of additive is deteriorated, and when it is too wide, change in properties of base oil becomes serious during circulated use in rolling working, in addition to deterioration of removability, and increase of supply, cooling failure of heated part and insufficient prevention of scattering and removing of molten metal (working powder) are undesirably caused in the electric discharge machining oil.

The paraffin content (% by volume) in the hydrocarbon oil of the present invention is preferably 80 to 100%, more preferably 90 to 100%, further preferably 95 to 100%, most preferably 99 to 100% although it is not particularly limited.

The content (% by volume) of saturated portion in the hydrocarbon oil of the present invention is preferably 90 to 100%, more preferably 97 to 100%, further preferably 98 to 100%, most preferably 99 to 100% although it is not particularly limited. A higher aromatic content may lead to deterioration of working environments by emission of odor, development of skin irritating property or the like.

The content (% by volume) of unsaturated portion in the hydrocarbon oil of the present invention is preferably 0 to 5%, more preferably 0 to 3%, further preferably 0 to 1% although it is not particularly limited.

The cetane index (JIS K2280 (hereinafter the same applies to)) in the hydrocarbon oil of the present invention is preferably 55 or more, more preferably 60 or more, further preferably 65 or more, particularly preferably 70 or more, and preferably 110 or less although it is not particularly limited. When the cetane index is below this range, the working performance is undesirably deteriorated.

The smoke point (mm, JIS K 2537 (hereinafter the same applies to)) in the hydrocarbon oil of the present invention is preferably 30 mm or more, more preferably 35 mm or more, further preferably 40 mm or more, and preferably 60 or less, more preferably 50 mm or less although it is not particularly limited.

The n-paraffin content referred to herein means a value measured using GC-FID (based on the total quantity of hydrocarbon oil) (hereinafter the same applies to). The n-paraffin content in the present invention is an n-paraffin content (based on the total amount of hydrocarbon oil) identified and quantitatively determined using a n-paraffin-containing standard sample, which is measured using a capillary column of methyl silicone (ULTRAALLOY-1) as column, helium as carrier gas, and a hydrogen ion detector (FID) as detector in conditions of column length 30 m, carrier gas flow rate 1.0 mL/min, division ratio 1:79, sample injection temperature 360° C., column temperature rise condition 140° C.→(8° C./min)→335° C., and detector temperature 360° C. Any measurement conditions can be adapted without being limited to the above-mentioned measurement conditions as long as an equal result can be obtained therein.

Each of the saturated content, unsaturated content and aromatic content means a volume percentage (% by volume) (based on the total amount of hydrocarbon oil) of aromatic content, which is measured according to Japan Petroleum Institute JPI-5S-49-96 "Determination of Hydrocarbon Types-High Performance Liquid Chromatography" (published by Japan Petroleum Institute).

The paraffin content and the naphthene content mean volume percentages (% by volume) (based on the total amount of the above-mentioned saturated content) of paraffin (alkane) content and naphthene content, which are measured according to ASTM D2786 "Standard Test Method for Hydrocarbon Types Analysis of Gas-Oil Saturates Fractions by High Ionizing Voltage Mass Spectrometry" (hereinafter the same applies to).

The thus-obtained hydrocarbon oil is used as base oils for the metalworking oil, the other metalworking oil, the electric discharge machining oil, the rust preventing oil, and the detergent composition of the concrete modes described above. The hydrocarbon oil is used as follows in each of the concrete modes or the first to fifth modes, and the hydrocarbon oil in each mode will be described including examples and comparative examples thereof.

First Mode (Metalworking Oil Composition)

Properties of hydrocarbon oil as base oil for metalworking oil composition of the invention in this mode:

The base oil for the metalworking oil of the invention in this mode contains the above-mentioned hydrocarbon oil, or a hydrocarbon oil (hereinafter referred to as "inventive hydrocarbon oil" in the first mode) having a density at 15° C. of 0.7 to 0.8 g/cm$^3$, and including n-paraffin content of 10 to 90% by mass, aromatic content of 0 to 3% by volume, and naphthene content of 0 to 20% by volume.

As further concrete preferable modes of the hydrocarbon oil in the base oil for the metalworking oil of the invention, the following Modes A and B can be given.

In Mode A, the kinematic viscosity at 40° C. (mm$^2$/s) is 1.4 to 2.7 mm$^2$/s. When the kinematic viscosity is below this range, workability may be deteriorated, while the kinematic viscosity exceeding this range may cause deterioration of surface brightness.

In Mode A, the initial boiling point (° C.) is preferably 140 to 260° C., further preferably 150 to 255° C., more preferably 160 to 250° C., most preferably 165 to 245° C. When the initial boiling point is too low, the usage of lubricant may be increased.

In Mode A, the 10%-distillation point (° C.) is preferably 150 to 270° C., further preferably 160 to 265° C., more preferably 170 to 260° C., most preferably 180 to 255° C.

In Mode A, the 90%-distillation point (° C.) is preferably 180 to 320° C., further preferably 190 to 310° C., more preferably 200 to 300° C., most preferably 210 to 290° C.

In Mode A, the end point (° C.) is preferably 190 to 320° C., further preferably 200 to 300° C., more preferably 210 to 290° C., most preferably 220 to 280° C. When the end point (° C.) is too high, deterioration of removability may be caused.

In Mode B, the kinematic viscosity at 40° C. (mm$^2$/s) is 3.8 to 5.0 mm$^2$/s. When the kinematic viscosity is below this range, rolling limitation in strip rolling may be deteriorated, while a kinematic viscosity beyond this range may cause deterioration of oil removability.

In Mode B, the initial boiling point (° C.) is preferably 200 to 280° C., further preferably 210 to 275° C., more preferably 220 to 270° C., most preferably 230 to 265° C. When the initial boiling point is too low, the rolling limitation in strip rolling may be deteriorated.

In Mode B, the 10%-distillation point (° C.) is preferably 210 to 290° C., further preferably 220 to 285° C., more preferably 230 to 280° C., most preferably 240 to 275° C.

In Mode B, the 90%-distillation point (° C.) is preferably 220 to 390° C., further preferably 230 to 370° C., more preferably 240 to 340° C., most preferably 250 to 330° C.

In Mode B, the end point (° C.) is preferably 230 to 400° C., further preferably 240 to 380° C., more preferably 240 to 350° C., most preferably 260 to 350° C. When the end point (° C.) is too high, deterioration of cleaning property in strip rolling may be caused.

Examples of metals to which the metalworking oil of the invention of this mode is applied include, in addition to aluminum, magnesium and alloys thereof, transition metals such as copper, iron, chromium, nickel, zinc, tin and titanium, and alloys thereof. As the applicable working method, for example, metalworking such as cold, warm and hot rolling, pressing, stamping, squeezing, drawing, extracting, or forging can be given. The inventive metalworking oil is suitably applied to, particularly, press working of aluminum fin material (sheet-like pure aluminum (purity 99% or more) or alloy mainly composed of aluminum), and cold, warm and hot rolling of high-purity aluminum (purity 99.9% or more (including those having purity of 99.99% or more)), alloy mainly composed of aluminum, or metals other than the aluminum and alloy mainly composed thereof. In the present invention, the aluminum means the generic name of pure aluminum (including high-purity aluminum) and alloy mainly composed of aluminum unless otherwise specially referred to.

When the metalworking oil of the invention in this mode is used for press working of aluminum fin material, the inventive hydrocarbon oil in this mode preferably has Mode A. When the oil is used for cold, warm and hot rolling of aluminum, the inventive hydrocarbon oil preferably has Mode A or Mode B.

Although the metalworking oil of the invention in this mode contains the inventive hydrocarbon oil as an essential component of base oil, any one of mineral oil, synthetic oil and oil fat can be used in combination without limiting the kind thereof. In the combined use, mineral oil or synthetic oil is particularly preferably used. The combining ratio thereof is not particularly limited, and can be optionally selected as long as the effect of the present invention is impaired. However, the content of the inventive hydrocarbon oil is set to preferably 10% by mass or more, based on the total amount of the metalworking oil composition, further preferably 20% by mass, most preferably 30% by mass or more. The content of base oil other than the inventive hydrocarbon oil is set to preferably 90% by mass or less, based on the total amount of the metalworking oil composition, more preferably 80% by mass or less, most preferably 70% by mass or less.

Examples of the mineral oil usable in combination include kerosene fractions obtained by distillation of paraffin-based or naphthene-based crude oil; normal paraffin obtained by extraction operation from kerosene fractions or the like; and those obtained by refining lubricant fractions obtained by distillation of paraffin-based or naphthene-based crude oil by use of one or a proper combination of refining treatments such as solvent deasphalting, solvent extraction, hydrocracking, solvent dewaxing, catalytic dewaxing, hydrogenation refining, sulfuric acid treatment, and clay treatment. Further, synthetic oil, fat, or the like can be further mixed to the base oil for use.

Examples of the synthetic oil usable in combination include olefin oligomer (propylene oligomer, isobutylene oligomer, polybutene, 1-octene oligomer, 1-decene oligomer, ethylene-propylene oligomer, etc.) or hydrides thereof, alkylbenzene, alkylnaphthalene, diester (ditridecyl glutarate, di-2-ethylhexyl adipate, diisodecyl adipate, ditridecyl adipate, di-2-ethylhexyl sebacate, etc.), polyol ester (trimethylolpropane caprylate, trimethylolpropane pelargonate, pentaerythritol 2-ethylhexanoate, pentaerythritol pelargonate, etc.), polyglycol, silicone oil, dialkyl diphenylether, and polyphenylether. Among them, propylene oligomer hydride, isobutylene oligomer hydride and polybutene hydride are collectively called isoparaffin.

Examples of the fat usable in combination in the invention of this mode include beef tallow, lard, soybean oil, rapeseed oil, rice bran oil, coconut oil, palm oil, palm kernel oil, hydrogen additives thereof, and a mixture of two or more kinds thereof.

Various lubricants can be mixed to the metalworking oil of the invention in this mode.

As such a lubricant, an epoxy compound can be used, and examples of the epoxy compounds include the following (E-1) to (E-8).

(E-1) Phenylglycidyl ether type epoxy compound;
(E-2) Alkylglycidyl ether type epoxy compound;
(E-3) Glycidyl ester type epoxy compound
(E-4) Aryloxysilane compound
(E-5) Alkyloxylane compound
(E-6) Alicyclic epoxy compound
(E-7) Epoxydized fatty acid monoester
(E-8) Epoxydized vegetable oil In the metalworking lubricant composition of the present invention, the epoxy compounds (E-1) to (E-8) can be used singly, or in combination of two or more thereof.

Among (E-1) to (E-8), (E-2), (E-3) and (E-5) are preferable, as the epoxy compound in the present invention, (E-2) and (E-5) are more preferable, and (E-5) is most preferable.

In the metalworking oil of the present invention, the content of the epoxy compound is set to 0.01 to 10.0% by mass, based on the total amount of the composition, preferably 0.05 to 7.5% by mass, more preferably 0.1 to 6.0% by mass. When the content is below 0.01% by mass, the lubricity improving effect can not be expected in some cases. When the content is beyond 10% by mass, not only the lubricity improving effect proportionate to the addition amount cannot be expected, but also oil removal by heat may become insufficient, and inhibition of lubricity or uneven brightness may be also caused depending on the conditions in the case of rolling oil.

The epoxy compound can be used as an alternate of an oily agent, and further can reduce the usage of the oily agent when used in combination with the oily agent, consequently leading to improvement in working environments such as reduction of odor.

The metalworking oil of the present invention can further contain an oxygenated compound for further improving the workability. As such an oxygenated compound, at least one oxygenated compound selected from the group consisting of the following components (A1) to (A8) can be used.

(A1) Alkyleneoxide additive of polyhydric alcohol having 3 to 6 hydroxy groups with a number average molecular weight of 100 or more and 1000 or less
(A2) Hydrocarbyl ether or hydrocarbyl ester of the component (A1)
(A3) Polyalkylene glycol having a number average molecular weight of 100 or more and 1000 or less
(A4) Hydrocarbyl ether or hydrocarbyl ester of the component (A3)
(A5) Dihydric alcohol having 2 to 20 carbon atoms
(A6) Hydrocarbyl ether or hydrocarbyl ester of the component (A5)
(A7) Trihydric alcohol having 3 to 20 carbon atoms
(A8) Hydrocarbyl ether or hydrocarbyl ester of the component (A7)

The polyhydric alcohol constituting the component (A1) has 3 to 6 hydroxy groups. As the polyhydric alcohol having 3 to 6 hydroxy group, saccharide is usable in addition to the polyhydric alcohol described below.

Examples of the polyhydric alcohol include glycerin, polyglycerin, (dimer to tetramer of glycerin, e.g., diglycerin, triglycerin, tetraglycerin), trimethylolalkane (e.g., trimethylolethane, trimethylolpropane, trimethylolbutane), dimer to tetramer thereof, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol glycerin condensate, adonitol, arabitol, xylitol, mannitol, inditol, talitol, dulcitol, and allitol.

Examples of the saccharide include xylose, arabinose, ribose, rhamnose, glucose, fructose, galactose, mannose, sorbose, cellobiose, manitose, isomaltose, trehalose, and sucrose. Among them, glycerin, trimethylolalkane and sorbitol are preferred from the point of excellence in workability.

As the alkyleneoxide constituting the component (A1), alkyleneoxide having 2 to 6 hydrocarbon atoms, preferably 2 to 4 hydrocarbon atoms is used. Examples of the alkyleneoxide having 2 to 6 carbon atoms include ethyleneoxide, propyleneoxide, 1,2-epoxybutane (α-butyleneoxide), 2,3-epoxybutane (β-butyleneoxide), 1,2-epoxy-1-methylpropane, 1,2-epoxyheptane, and 1,2-epoxyhexane. Among them, ethyleneoxide, propyleneoxide and butyleneoxide are preferred, and ethyleneoxide and propyleneoxide are further preferred from the point of excellence in workability.

When two or more kinds of alkyleneoxides are used, the polymerization type of oxyalkylene groups is not particularly limited, and the oxyalkylene groups may be randomly polymerized or block-polymerized. When the alkyleneoxide is added to a polyhydric alcohol having 3 to 6 hydroxy groups, the alkyleneoxide may be added to all or a part of the hydroxy groups. Particularly, addition to all the hydroxy groups is preferred from the point of excellence in workability.

The component (A1) has a number average molecular weight (Mn) of 100 or more and 1000 or less, preferably 100 or more and 800 or less. When Mn is less than 100, the solubility to mineral oil may be reduced. When Mn is larger than 1000, the lubricant may be left on the surface of a worked workpiece in oil removing process. The Mn in this mode means a number average molecular weight in terms of standard polystyrene by gel permeation chromatography (GPC).

The component (A1) can be prepared by additively reacting an alkylene oxide with a polyhydric alcohol having 3 to 6 hydroxy groups so that Mn is 100 or more and 1000 or less. Otherwise, the component (A1) can be prepared by separating an alkyleneoxide adduct mixture of polyhydric alcohol having 3 to 6 hydroxy groups obtained by an optional method or a commercially available alkyleneoxide adduct mixture of polyhydric alcohol having 3 to 6 hydroxy groups by distillation or chromatography so that Mn is 100 or more and 1000 or less. As the component (A1), such compounds can be used singly or as a mixture of two or more kinds thereof.

The component (A2) is a component obtained by hydrocarbyl-etherifying or esterifying an alkyleneoxide adduct of polyhydric alcohol having 3-6 hydroxy groups with Mn of 100 or more and 1000 or less, preferably 100 or more and 800 or less.

The component (A2) can be prepared by partially or entirely hydrocarbyl-etherifying or esterifying terminal hydroxy groups of the alkyleneoxide adduct of the component (A1). The hydrocarbyl group referred to herein means a hydrocarbon group having 1 to 24 carbon atoms such as alkyl group having 1 to 24 carbon atoms, alkenyl group having 2 to 24 carbon atoms, cycloalkyl group having 5 to 7 carbon atoms, alkylcycloalkyl group having 6 to 11 carbon atoms, aryl group having 6 to 10 carbon atoms, alkylaryl group having 7 to 18 carbon atoms, or arylalkyl group having 7 to 18 carbon atoms.

Among them, from the point of excellence in workability, straight or branched alkyl group having 2 to 18 carbon atoms and straight or branched alkenyl group having 2 to 18 carbon atoms are preferred, and straight or branched alkyl group having 3 to 12 carbon atoms and oleyl group (a residue after removing hydroxy groups from oleyl alcohol) are further preferred.

As the acid used for the esterification, carboxylic acid is generally used. The carboxylic acid may be monobasic or polybasic, and concretely, for example, monobasic acid and polybasic acid given in the column of ester oil (A) in the second mode which will be described later are usable. Generally, the monobasic acid is used. Examples of the monobasic acid include a fatty acid having 6 to 24 carbon atoms, which may be straight or branched. The monobasic acid may be a saturated fatty acid, an unsaturated fatty acid or a mixture thereof.

Among them, saturated fatty acid having 8 to 20 carbon atoms, unsaturated fatty acid having 8 to 20 carbon atoms, and mixtures thereof are particularly preferred. As the component (A2), these compounds may be used singly or as a combination of two or more kind thereof.

The component (A3) is a polyalkylene glycol having Mn of 100 or more and 1000 or less, which is obtained by simply polymerizing or copolymerizing an alkylene oxide having 2 to 6 carbon atoms, preferably 2 to 4 carbon atoms. Examples of the alkyleneoxide having 2 to 6 carbon atoms include the alkylene oxide given in the description of the component (A1). From the point of excellence in workability, particularly, ethyleneoxide, propyleneoxide, and butyleneoxide are preferred, and ethyleneoxide and propyleneoxide are further preferred.

When two or more kinds of alkyleneoxides are used in preparation of the polyalkylene glycol, the polymerization form of oxyalkylene groups is not particularly limited, and the oxyalkylene groups can be randomly polymerized or block-polymerized.

The component (A3) has Mn of 100 or more and 1000 or less, preferably 120 or more and 700 or less. A polyalkylene glycol with Mn below 100 may cause deterioration of solubility to mineral oil. When a polyalkylene glycol with Mn exceeding 1000 is used, the lubricant may be left on the surface of a worked workpiece in oil removing process.

The component (A3) can be prepared by polymerizing an alkylene oxide so that Mn is 100 or more and 1000 or less. Otherwise, the component (A3) can be prepared by separating a polyalkylene glycol mixture obtained by an optional method or a commercially available polyalkylene glycol mixture by distillation or chromatography so that Mn is 100 or more and 1000 or less. As the component (A3), such compounds may be used singly or as a mixture of two or more kinds thereof.

The component (A4) is a component obtained by hydrocarbyl-etherifying or esterifying a polyalkylene glycol having Mn of 100 or more and 1000 or less, preferably 120 or more and 700 or less. The component (A4) can be prepared by partially or entirely hydrocarbyl-etherifying or esterifying terminal hydroxy groups of the polyalkylene glycol of the component (A3). The hydrocarbyl group referred to herein means a hydrocarbon group having 1 to 24 carbon atoms, and concrete examples thereof include each group given in the description of the component (A2). Among them, from the point of excellence in workability, straight or branch alkyl group having 2 to 18 carbon atoms and straight or branch alkenyl group having 2 to 18 carbon atoms are preferred, and straight or branched alkyl group having 3 to 12 carbon atoms and oleyl group (a residue after removing hydroxy groups from oleyl alcohol) are further preferred.

The component (A4) can be prepared also by esterifying terminal hydroxy groups of the polyalkylene glycol of the component (A3). Generally, an acid such as carboxylic acid is used for the esterification. Although the carboxylic acid may be monobasic or polybasic, monobasic acid is generally used. Concrete examples thereof include those given in the description of the component (A2). As the component (A4), such compounds may be used singly or as a mixture of two or more kinds thereof.

The component (A5) is a dihydric alcohol having 2 to 20 carbon atoms, preferably 3 to 18 carbon atoms. The dihydric alcohol referred to herein means a one having no ether bond in the molecule. Examples of the dihydric alcohol having 2 to 20 carbon atoms include ethylene glycol, 1,3-propanediol, 1,2-propanediol, 1,4-butanediol, 1,2-butanediol, 2-methyl-1,3-propanediol, 1,5-pentanediol, 1,2-pentanediol, neopentyl glycol, 1,6-hexanediol, 1,2-hexanediol, 2-ethyl-2-methyl-1,3-propanediol, 2-methyl-2,4-pentanediol, 1,7-heptanediol, 1,2-heptanediol, 2-methyl-2-propyl-1,3-propanediol, 2,2-diethyl-1,3-propanediol, 1,8-octanediol, 1,2-octanediol, 1,9-nonanediol, 1,2-nonanediol, 2-butyl-2-ethyl-1,3-propanediol, 1,10-decanediol, 1,2-decanediol, 1,11-undecanediol, 1,2-undecanediol, 1,12-dodecanediol, 1,2-dodecanediol, 1,13-tridecanediol, 1,2-tridecanediol, 1,14-tetradecanediol, 1,2-tetradecanediol, 1,15-heptadecanediol, 1,2-heptadecanediol, 1,16-hexadecanediol, 1,2-hexadecanediol, 1,17-heptadecanediol, 1,2-heptadecanediol, 1,18-octadecanediol, 1,2-octadecanediol, 1,19-nonadecanediol, 1,2-nonadecanediol, 1,20-icosadecanediol, and 1,2-icosadecanediol.

Among them, from the point of excellence in workability, 1,4-butanediol, 1,5-pentanediol, neopentylglycol, 1,6-hexanediol, 2-methyl-2,4-pentanediol, 2-ethyl-2-methyl-1,3-propanediol, 1,7-heptanediol, 1,8-octanediol, 1,9-nonanediol, 1,10-decanediol, 1,11-undecanediol, 1,12-dodecanediol and the like are preferably used. As the component (A5), these compounds may be used singly or as a mixture of two or more kinds thereof.

The component (A6) is a component obtained by hydrocarbyl-etherifying or esterifying a dihydric alcohol having 2 to 20 carbon atoms, preferably 3 to 18 carbon atoms (except for those having ether bond in the molecule). The component (A6) can be prepared by partially or entirely hydrocarbyl-etherifying or esterifying terminal hydroxy groups of the component (A5). The hydrocarbyl group referred to herein means a hydrocarbon group having 1 to 24 carbon atoms, and concrete examples thereof include each group given in the description of the component (A2). Among them, from the point of excellence in workability, straight or branched alkyl group having 2 to 18 carbon atoms and straight or branched alkenyl group having 2 to 18 carbon atoms are preferred, and straight or branched alkyl having 3 to 12 carbon atoms and oleyl group (a residue after removing hydroxy groups from oleyl alcohol) are further preferred.

The component (A6) can be prepared also by esterifying one or both of terminal hydroxyl groups of the dihydric alcohol of the component (5A). Generally, an acid such as carboxylic acid is used for the esterification. Although the carboxylic acid may be monobasic or polybasic, monobasic acid is generally used. Concretely, those given in the description of the component (A2) are usable. Further, the ester of the component (A6) can be a partial ester in which one of terminal groups of the dihydric alcohol of the component (A5) is esterified or a complete ester in which both the terminal hydroxy groups thereof are esterified. The partial ester is particularly preferred from the point of excellence in workability. As the component (A6), these compounds may be used singly or as a mixture of two or more kinds thereof.

The component (A7) is a trihydric alcohol having 3 to 20 carbon atoms, preferably 3 to 18 carbon atoms. The trihydric alcohol referred to herein means a one having no ether bond in the molecule. Examples of the trihydric alcohol having 3 to 20 carbon atoms include glycerin, 1,2,3-butanetriol, 1,2,4-butanetriol, 1,2,5-pentanetriol, 1,3,5-pentanetriol, 1,2,3-pentanetriol, 1,2,4-pentanetriol, 1,2,6-hexanetriol, 1,2,3-hexanetriol, 1,2,4-hexanetriol, 1,2,5-hexanetriol, 1,3,4-hexanetriol, 1,3,5-hexanetriol, 1,3,6-hexanetriol, 1,4,5-hexanetriol, 1,2,7-heptanetriol, 1,2,8-octanetriol, 1,2,9-nonanetriol, 1,2,10-decanetriol, 1,2,11-undecanetriol, 1,2,12-dodecanetriol, 1,2,13-tridecanetriol, 1,2,14-tetradecanetriol, 1,2,15-pentadecanetriol, 1,2,16-hexadecanetriol, 1,2,17-heptadecanetriol, 1,2,18-octadecanetriol, 1,2,19-nonadecanetriol, and 1,2,20-icosanetriol.

Among them, from the point of excellence in workability, 1,2,12-dodecanetriol, 1,2,13-tridecanetriol, 1,2,14-tetradecanetriol, 1,2,15-pentadecanetriol, 1,2,16-hexadecanetriol, 1,2,17-heptadecanetriol, 1,2,18-octadecanetriol are preferably used. As the component (A7), these compounds may be used singly or as a mixture of two or more kinds thereof.

The component (A8) is a component obtained by hydrocarbyl-etherifying or esterifying a trihydric alcohol having 3 to 20 carbon atoms, preferably 3 to 18 carbon atoms (except for those having ether bonds in the molecule). The component (A8) can be prepared by partially or entirely hydrocarbyl-etherifying or esterifying terminal hydroxy groups of the trihydric alcohol of the component (A7). The hydrocarbyl group referred to herein means a hydrocarbon group having 1 to 24 carbon atoms, and concrete examples thereof include each group given in the description of the component (A2). Among them, from the point of excellence in workability, straight or branched alkyl group having 2 to 18 carbon atoms and straight or branched alkenyl group having 2 to 18 carbon atoms are preferred, and straight or branched alkyl group having 3 to 12 carbon atoms and oleyl group (a residue after removing hydroxy groups from oleyl alcohol) are further preferred.

The component (A8) can be prepared also by partially or entirely esterifying terminal hydroxy groups of the trihydric alcohol of the component (A7). Generally, an acid such as carboxylic acid is used for the esterification. Although the carboxylic acid can be monobasic or polybasic, monobasic acid is generally used. Concretely, for example, those given in the description of the component (A2) are usable. The ester of the component (A8) can be a partial ester in which one or two of terminal hydroxy groups of the trihydric alcohol of the component (A7) are esterified or a complete ester in which all the terminal hydroxy groups thereof are esterified. From the point of excellence in workability, the partial ester is particularly preferred.

Preferable examples of the component (A8) include hydrocarbyl ethers or partial esters of glycerin, 1,2,3-butanetriol, 1,2,4-butanetriol, 1,2,5-pentanetriol, 1,3,5-pentanetriol, 1,2,3-pentanetriol, 1,2,4-pentanetriol, 1,2,6-hexanetriol, 1,2,3-hexanetriol, 1,2,4-hexanetriol, 1,2,5-hexanetriol, 1,3,4-hexanetriol, 1,3,5-hexanetriol, 1,3,6-hexanetriol, and 1,4,5-hexanetriol of the component (A7). As the component (A8), these compounds may be used singly or as a mixture of two or more kinds thereof.

In the metalworking oil of the invention in this mode, one oxygenated compound selected from the above-mentioned components (A1) to (A8) may be used singly, or a mixture of two or more oxygenated compounds having different structures selected therefrom may be used. Among the components (A1) to (A8), the components (A3), (A4), (A5) and (A8) are preferred, from the point of excellence in workability, and the components (A3), (A4) and (A8) are more preferred.

The content of the oxygenated compound in the metalworking oil of the invention in this mode is 0.005 to 10.0% by mass based on the total amount of the metalworking oil. Namely, the content of the oxygenated compound is 0.005% by mass or more, preferably, 0.05% by mass or more, more preferably 0.1% by mass or more. The content of the oxygenated compound is also 10% by mass or less, preferably 5.0% by mass or less, more preferably 2.0% by mass or less. If the content of the oxygenated compound is too small, the workability improving effect may become insufficient, and even if the content is increased, the effect proportionate to the content cannot be obtained.

The metalworking oil of the invention in this mode can further contain an oily agent. As the oily agent, at least one selected from the following components (B1) to (B3) is preferably used. The oily agent includes those generally used as lubricant oily agent.

(B1) Ester
(B2) Monohydric alcohol
(B3) Carboxylic acid

The ester of the component (B1) is obtained by reacting an alcohol with a carboxylic acid. The alcohol may be monohydric or polyhydric. The carboxylic acid may be monobasic or polybasic.

As the monohydric alcohol, a monohydric alcohol having 1 to 24 carbon atoms is used. Such alcohol may be straight or branched. Examples of the monohydric alcohol having 1 to 24 carbon atoms include methanol, ethanol, straight or branched propanol, straight or branched butanol, straight or branched pentanol, straight or branched hexanol, straight or branched heptanol, straight or branched octanol, straight or branched nonanol, straight or branched decanol, straight or branched undecanol, straight or branched dodecanol, straight or branched tridecanol, straight or branched tetradecanol, straight or branched pentadecanol, straight or branched hexadecanol, straight or branched heptadecanol, straight or branched octadecanol, straight or branched nonadecanol, straight or branched eicosanol, straight or branched heneicosanol, straight or branched tricosanol, straight or branched tetracosanol, and mixtures thereof.

As the polyhydric alcohol, generally, divalent to decavalent, preferably, divalent to hexavalent polyhydric alcohols are used, and concrete examples thereof include divalent to hexavalent polyhydric alcohols given in the column of (A) Ester oil in the second mode which will described later.

As the monobasic acid constituting the ester oily agent, monobasic acids given in the column of (A) Ester oil in the second mode described later are usable, and straight or branched fatty acid having 6 to 24 carbon atoms is generally used.

As the polybasic acid constituting the ester oily agent, polybasic acids given in the column of (A) Ester oil in the second mode described later are usable.

Examples of the ester oily agent include the following components (1b) to (7b). As the ester oily agent, an ester obtained by reacting an optional alcohol with a carboxylic acid as the exemplified components can be used without being particularly limited thereto.

(1b) Ester of monohydric alcohol with monobasic acid
(2b) Ester of polyhydric alcohol with monobasic acid
(3b) Ester of monohydric alcohol with polybasic acid
(4b) Ester of polyhydric alcohol with polybasic acid
(5b) Mixed ester of a mixture of monohydric alcohol and polyhydric alcohol with polybasic acid
(6b) Mixed ester of polyhydric alcohol with a mixture of monobasic acid and polybasic acid
(7b) Mixed ester of a mixture of monohydric alcohol and polyhydric alcohol with a mixture of monobasic acid and polybasic acid When polyhydric alcohol is used as the above-mentioned alcohol component, the resulting ester means a complete ester in which all hydroxy groups in the polyhydric alcohol are completely esterified. When polybasic acid is used as the carboxylic acid component, the resulting ester may be a complete ester in which carboxyl groups in the polybasic acid are completely esterified or a partial ester in which the carboxyl groups are partially left as carboxyl groups without being esterified.

As the ester oily agent, although any one of those described above is usable, (1b) an ester of monohydric alcohol with monobasic acid, (2b) an ester of polyhydric alcohol with monobasic acid, and (3b) an ester of monohydric alcohol with polybasic acid are preferred from the point of excellence in workability. In aluminum fin working and aluminum rolling, particularly the ester of monohydric alcohol with monobasic acid (1b) and the ester of polyhydric alcohol with monobasic acid (2b) are more preferred. In metal rolling other than aluminum, the ester of monohydric alcohol with monobasic acid (1b) and the ester of polyhydric alcohol with monobasic acid (2b) are more preferred, and a combined use of the ester of monohydric alcohol with monobasic acid (1b) and the ester of monohydric alcohol with polybasic acid (3b) is most preferred.

The total number of carbon atoms in the ester of monohydric alcohol with monobasic acid (1b) used as the oily agent is preferably 7 or more, from the point of improvement in workability, more preferably 9 or more, most preferably 11 or more although it is not particularly limited. The total number of carbon atoms in the ester is also preferably 26 or less, from the point of oil removability, more preferably 24 or less, most preferably 22 or less. The number of carbon atoms in the monohydric alcohol is preferably 1 to 10, more preferably 1 to 8, further more preferably 1 to 6, most preferably 1 to 4 although it is not particularly limited. The number of carbon atoms in the monobasic acid is preferably 8 to 22, more preferably 10 to 20, most preferably 12 to 18 although it is not particularly limited. For the total number of carbon atoms, the number of carbon atoms in the alcohol, and the number of carbon atoms in the monobasic acid as described above, the upper limit values thereof are set in consideration for probabilities of increased staining or corrosion, difficulty to handle in winter due to loss of flowing property and increased precipitation by reduction in solubility to base oil, and the lower limit values thereof are set in consideration for lubricating performance and deterioration of working environment by odor.

As the monohydric alcohol of the component (B2), compounds given as the alcohol constituting the ester in the description of the component (B1) are usable. From the point of excellence in workability, the total number of carbon atoms of the monohydric alcohol is preferably 6 or more, more preferably 8 or more, most preferably 10 or more. From the point of oil removability, the total number of carbon atoms in the monohydric alcohol is preferably 20 or less, more preferably 18 or less, most preferably 16 or less.

The carboxylic acid of the component (B3) may be monobasic or polybasic. Examples of such carboxylic acid include compounds given as the carboxylic acid constituting the ester in the description of the component (B1). From the point of excellence in workability, monobasic acid is particularly preferred. From the point of excellence in workability, the number of carbon atoms in the carboxylic acid is preferably 6 or more, more preferably 8 or more, most preferably 10 or more. From the point of oil removability, the total number of carbon atoms in the carboxylic acid is preferably 20 or less, more preferably 18 or less, most preferably 16 or less.

Although various oily agents described above can be used singly or as a mixture of two or more thereof as the oily agent used for the metalworking oil of the invention in this mode, the oily agent is preferably (1) an ester having 7 to 26 carbon atoms in total which is obtained from monohydric alcohol and monobasic acid; (2) a monohydric alcohol having 6 to 20 carbon atoms, particularly, a combination of monohydric alcohol having 9 or more carbon atoms and monohydric alcohol having 8 or less carbon atoms; (3) a monobasic acid having 6 to 20 carbon atoms; or a mixture thereof.

The content of the oily agent is 0.01 to 70% by mass based on the total amount of the metalworking oil of the invention in this mode. From the point of workability, the lower limit value of content of the oily agent is preferably 0.01% by mass or more, more preferably 0.05% by mass, further more preferably 0.07% by mass. On the other hand, the lower limit value of content of the oily agent is 70% by mass or less. From the point of oil removability, the lower limit value is preferably 50% by mass or less, more preferably 15% by mass or less, further more preferably 10% by mass or less.

To the metalworking oil of the invention in this mode, alkylbenzene can be mixed. Particularly, when a base oil with a small aromatic content, concretely, mineral oil or isoparaffin with an aromatic content of 5% by volume or less (further concretely, 1% by volume) is used, the addition effect of the oily agent can be further enhanced by adding the alkylbenzene. The kinematic viscosity at 40° C. of the alkylbenzene used in the invention ranges from 1 to 60 mm$^2$/s. When the kinematic viscosity at 40° C. is below 1 mm$^2$/s, the addition effect can not be expected, and when the kinematic viscosity at 40° C. exceeds 60 mm$^2$/s, staining or corrosion may be increased. The kinematic viscosity is thus preferably 40 mm$^2$/s or less, more preferably 20 mm$^2$/s or less.

The metalworking oil of the invention in this mode may further contain a straight olefin having 6 to 40 carbon atoms. The lubricity of the metalworking oil is further improved by including the straight olefin therein.

A straight olefin having less than 6 carbon atoms is improper because it has a low flash point. For ensuring an appropriately high flash point, the number of carbon atoms is preferably 8 or more, more preferably 10 or more, further more preferably 12 or more. On the other hand, a straight olefin having more than 40 carbon atoms is also improper since it becomes difficult to use by solidification, and further difficult to mix with or dissolve in another component (mineral oil or additive) or the like. Further, the straight olefin having more than 40 carbon atoms is not general and hardly available. In view of such inconveniences, a straight olefin having 30 or less carbon atoms is preferably used.

Such a straight olefin preferably includes one double bond in the molecule, although it may include two or more double bonds. From the point of excellence in lubricity, the straight olefin is preferably a straight olefin having double bond at a terminal or n-α-olefin without particularly limitation for the position of double bond.

Examples of the straight olefin include 1-octene, 1-decene, 1-docosene, 1-tetradecene, 1-hexadecene, 1-octadecene, 1-icocene, and a mixture of two or more thereof. The straight olefin can be prepared by various preparation methods and, for example, an ethylene oligomer obtained by polymerizing ethylene by a general means can be used. As the straight olefin, these compounds may be used singly or as a mixture of two or more kinds thereof.

The content of the straight oligomer can be operationally set. However, from the point of improvement in lubricity of the metalworking oil of the invention in this mode, the content is preferably 1% by mass or more, based on the total amount of the metalworking oil, more preferably 3% by mass or more, further preferably 5% by mass or more. Further, for ensuring an effect proportionate to the addition amount, the content is preferably 30% by mass or less, based on the whole amount of the metalworking oil, more preferably 25% by mass or less, further more preferably 20% by mass or less.

In the metalworking oil of the invention in this mode, for the purpose of further improving the excellent effect, additives such as extreme pressure agent, antioxidant, rust preventive agent, corrosion inhibitor, defoaming agent, demulsifier, and antimold can be added thereto singly or in combination of two or more kinds thereof as needed.

Examples of the extreme pressure agent include a phosphoric compound such as tricresyl phosphate and an organic metal compound such as zinc dialkyldithiophosphate. Examples of the antioxidant include a phenolic compound such as 2,6-di-tert-butyl-p-cresol (DBPC), an aromatic amine such as phenyl-α-naphthylamine, and an organic metal compound such as zinc dialkyldithiophosphate. Examples of the rust preventive agent include salt of fatty acid such as oleic acid, sulfonate such as dinonylnaphthalene sulfonate, partial ester of polyhydric alcohol such as sorbitan monooleate, amine and derivatives thereof, and phosphate and derivatives thereof. Examples of the corrosion inhibitor include benzotriazole. Examples of the defoaming agent include silicone-based ones. As the demulsifier, a surfactant is used, and examples thereof include quaternary ammonium salt and imidazoline type as cationic series; sulfonated oil and aerosol type as anionic series; and ethyleneoxide additive of castor oil, phosphoric ester of ether-type nonionic active agent, ethyleneoxide-propyleneoxide block copolymer, and ester with dimer acid as nonionic series. Examples of the antimold include phenolic compound, formaldehyde donator compound, and salicylanilide-based compound.

The total content of the additives is generally 15% by mass, based on the total amount of the metalworking oil of the invention, preferably 10% by mass.

The metalworking oil of the invention in this mode (hereinafter referred also to as inventive compound of this mode) can further contain water as needed although it is principally used in a non-water state substantially free from water, except for the moisture naturally absorbed during storage, and further can be used in combination with water. The inventive composition of this mode, when it contains water, can take any one of an emulsified state in which an oil component is minutely dispersed in water as a continuous layer, whereby an emulsion is formed, a soluble state in which water is dissolved in the oil component, and a suspension state in which water is mixed with the lubricant by strong agitation. Otherwise, the inventive composition and water can be separately supplied to a working portion. A practical metalworking oil can be obtained only by diluting the inventive composition (stock solution) with water or by using it together with water. The dilution magnification (the magnification of stock solution+water to stock solution in combined use) may be optionally selected depending on the using condition. Generally, the practical metalworking oil is prepared by diluting the stock solution with water 3 to 100-fold by weight, preferably 3 to 70-fold. As the diluting water, city water, industrial water, ion exchange water, distilled water or the like is usable, regardless of whether hard water or soft water. In the emulsion type, where an emulsion having the oil component finely dispersed to water as a continuous phase is formed by diluting the inventive composition with water, the average particle size of oil drops dispersed to water is preferably 300 nm or less, particularly preferably 100 nm or less. A larger average particle size of dispersed oil drops not only can easily cause oil pit, which impairs the surface brightness of a worked product, but also disables use of a fine filter for purification of the metalworking oil.

Although the viscosity of the inventive metalworking oil of this mode is not particularly limited, the kinematic viscosity at 40° C. thereof is 0.5 to 500 mm$^2$/s, preferably 1.0 to 200 mm$^2$/s. In aluminum fin working, the viscosity is preferably 1.0 to 5.0 mm$^2$/s, more preferably 1.2 to 3.0 mm$^2$/s, most preferably 1.3 to 2.8 mm$^2$/s from the point of workability, volatility of oil and oil removability. In aluminum rolling, the viscosity is preferably 1.0 to 10 mm$^2$/s, more preferably 1.0 to 8.0 mm$^2$/s, from the point of lubricity and surface quality. In metal rolling other than aluminum, the viscosity is preferably 1.0 to 20 mm$^2$/s, more preferably 2.0 to 15 mm$^2$/s, most preferably 3.0 to 15 mm$^2$/s.

The metalworking oil of the invention in this mode is used as various metalworking oils, and examples of metals to which the oil is applied include aluminum, magnesium, transition metals such as copper, iron, chromium, nickel, zinc, tin, and titanium, and alloys thereof. As the applicable working method, for example, metalworking such as cold, warm and hot rolling, pressing, stamping, squeezing, drawing, extraction, forging, or cutting and grinding including minimal quantitative lubrication cutting (MQL) can be given. The metalworking oil lubricant composition of the invention is suitably used, particularly, for working of aluminum fin material (sheet-like pure aluminum (purity 99% or more) or alloy mainly composed of aluminum), and for cold, warm and hot rolling of various metals. Of such rolling, the composition is particularly suitable for cold rolling. Further, the composition is particularly suitable for rolling of high-purity aluminum (purity 99.9% or more (including those having purity of 99.99% or more)), alloy mainly composed of aluminum, stainless, copper and copper alloy among the above-mentioned various metals, and most suitable for rolling of high purity aluminum and alloy composed of aluminum.

In the working of aluminum fin material, the metalworking oil of the invention in this mode can be used to not only a precoated material in which a surface of the aluminum fin material is preliminarily coated, but also a material not subjected to such coating treatment.

The coat referred to herein means a film composed of an anticorrosive undercoat formed on the aluminum fin material and a hydrophilic coat formed thereon. The anticorrosive undercoat includes an inorganic undercoat and an organic undercoat. Examples of the inorganic undercoat include chromate coat, boehmite coat, silicate coat and a combined coat thereof. Examples of the organic undercoat include vinyl resin such as polyvinyl chloride-vinyl acetate, polyethylene or polypropylene, acrylic resin, epoxy resin, urethane resin, styrol resin, phenol resin, fluorine resin, silicate resin, diarylphthalate resin, polycarbonate resin, polyamide resin, alkyd resin, polyester resin, urea-melamine resin, polyacetal resin, and fibrous resin.

Examples of the hydrophilic coat include the following (a) to (e).

(a) A compound including a low molecular organic compound having carbonyl group and an alkali silicate as main components (b) Specific water glass including a component obtained by adding a water-soluble organic polymer compound to the above component (a) as a main component (c) Silicate such as sodium silicate, potassium silicate or water glass, silicic acid, silica gel or alumina sol (d) A hydrophilic modified organic polymer obtained by reacting a hydrophilic organic polymer with a crosslinking agent including a low molecular weight organic compound having carbonyl group (e) A hydrophilic polyvinylalcohol-based modified organic polymer obtained by reacting a polyvinylalcohol-based hydrophilic organic polymer and a water-soluble organic polymer with a crosslinking agent Examples of the working of aluminum fin material include stretching, drawing, stamping, curling, and ironing for increasing a cylindrical raised wall around a tube insert hole by ironing.

Embodiment (First Mode for Metalworking Oil Composition)

The present invention of this mode will be further described in reference to examples.

(1) Production Method of Base Oil
(Production of Hydrogenation Refined Oil of FT Synthesis Oil, Wax Hydrocracked Oil, and Inventive Base Oils 1 to 6)

1) FT synthetic hydrocarbon oil using natural gas as raw material (content of hydrocarbon with boiling point of 150° C. or higher: 82% by mass, content of hydrocarbon with boiling point of 360° C. or higher: 41% by mass) was separated into a light fraction with boiling point of 150° C. or lower, an intermediate fraction with boiling point of 150 to 360° C., and a tower bottom residue heavy wax content (FT wax: corresponding to a fraction with boiling point of higher than 360° C.) in a distillation tower.

2) The intermediate fraction separated in 1) was hydrogenation-refined by use of a hydrogenation refining catalyst (Pt: 0.8% by mass to carrier, USY zeolite/silica alumina/alumina binder: 3/57/40 by weight) under hydrogen gas flow in conditions of reaction temperature: 311° C., hydrogen pressure: 3.0 MPa, LHSV: 2.0 $h^{-1}$, and hydrogen/oil ratio; 340 NL/L.

3) The hydrogenation refined oil obtained in 2) was fractioned to a 150-250° C. fraction (kerosene fraction 1) and a 250-360° C. fraction (light oil fraction 1) by distillation.

4) The FT wax obtained in 1) was hydrocracked by use of a hydrocracking catalyst (Pt: 0.8% by mass to carrier, USY zeolite/silica alumina/alumina binder: 3/57/40 by weight) under hydrogen gas flow in conditions of reaction temperature: 326° C., hydrogen pressure: 4.0 MPa. LHSV: 2 $h^{-1}$, and hydrogen/oil ratio: 680 NL/L.

5) The hydrocracked oil obtained in 4) was fractioned to a 150-250° C. fraction (kerosene fraction 2) and a 250-360° C. fraction (light oil fraction 2) by distillation.

Base Oil 1: Base oil 1 was obtained by mixing the light oil fractions 1 and 2 together in a ratio of 56:44 (by mass).

Base Oil 2: Base oil 2 was obtained by mixing the light oil fractions 1 and 2 together in a ratio of 51:49 (by mass).

Base Oil 3: Base oil 3 was obtained by mixing the kerosene fractions 1 and 2 in a ratio of 63:37 (by mass).

Base Oil 4: Base oil 4 was obtained by mixing the kerosene fractions 1 and 2 in a ratio of 49:51 (by mass).

Base Oil 5: A 230-270° C. fraction (base oil 5) was obtained by mixing the hydrogenation refined oil and hydrocracked oil obtained in the above followed by atmospheric distillation.

Base Oil 6: A 250-305° C. fraction (base oil 6) was obtained by mixing the hydrogenation refined oil and hydrocracked oil obtained in the above followed by atmospheric distillation.

(Base Oils 7 to 10, Base Oils 11 to 12)

Base Oils 7-10: Hydrogenation-refined mineral oils were used.

Base Oils 11-12: Isoparaffins were used.

(2) Properties of Base Oils

Properties of Base Oils 1 to 12 are summarized in Tables 1.1 and 2.1.

EXAMPLE 1

In this example, performances as aluminum rolling oil are tested.

Metalworking oils were prepared by adding, as oily agents, butyl stearate, lauryl alcohol and oleic acid to base oils shown in Table 1.1 in amounts shown in Table 2.1, respectively.

Each of the resulting metalworking oils was subjected to a test for aluminum rolling, odor determination and an oil removability test as described below.

The results are summarized in Table 3.1

Method of Rolling Test:

A load required for processing was measured by performing rolling at a rolling rate of 250 m/min and a draft of 35%, using aluminum (JIS A1050; thickness 0.15 mm, width 78 mm). A smaller required load is more preferable with more satisfactory workability.

Measuring Method of Odor:

Odor determination was carried out in a state where each sample oil was heated to 40° C.

The odor of each sample was evaluated by ten panelists by giving an evaluation point to each sample oil based on a scoring reference of non-disturbing: 0, slight odorous: 2, and odorous: 4, and an average value of the points was calculated for each sample oil.

The result is shown by ○: less than 1, Δ: 1 or more and less than 2, and x: 2 or more.

Oil Removability Test:

The degree of staining is evaluated by dropping 0.2 ml of each sample oil into an aluminum cup 4.5 cm in diameter, raising the temperature from room temperature to 350° C. over 1 hour, retaining the cup at that temperature for 2 hours, and then cooling the cup to room temperature. A sample oil which caused no staining is shown by ○, and a one which caused staining by x.

The results are shown in Table 3.1

TABLE 1.1

| | | Base Oil Number | | | | | |
| --- | --- | --- | --- | --- | --- | --- | --- |
| | | Base Oil 1 | Base Oil 2 | Base Oil 3 | Base Oil 4 | Base Oil 5 | Base Oil 6 |
| Density (15° C.) | kg/m³ | 782.8 | 783.0 | 748.9 | 749.4 | 0.774 | 0.782 |
| Kinematic Viscosity (@40° C.) | mm²/s | 3.329 | 3.341 | 1.245 | 1.242 | 2.310 | 4.183 |
| Flash Point | ° C. | 130 | 128 | 60 | 58 | 120 | 145 |
| Aniline Point | ° C. | 97.7 | 97.8 | 82.1 | 82.2 | 91.0 | 99.0 |
| Sulfur Content | mass ppm | Less than 1 | Less than 1 | Less than 1 | Less than 1 | Less than 1 | Less than 1 |

TABLE 1.1-continued

|  |  |  | Base Oil 1 | Base Oil 2 | Base Oil 3 | Base Oil 4 | Base Oil 5 | Base Oil 6 |
|---|---|---|---|---|---|---|---|---|
| Distillation | IBP | °C. | 257.0 | 259.5 | 168.0 | 171.0 | 235.0 | 254.0 |
| Properties | 5% | °C. | 266.5 | 268.0 | 182.0 | 180.5 | 239.0 | 260.0 |
|  | 10% | °C. | 269.0 | 270.0 | 184.0 | 182.0 | 244.0 | 268.0 |
|  | 50% | °C. | 283.0 | 283.5 | 198.5 | 197.5 | 250.0 | 274.0 |
|  | 90% | °C. | 315.5 | 316.5 | 221.5 | 221.5 | 261.0 | 281.0 |
|  | 95% | °C. | 324.0 | 325.5 | 226.5 | 226.0 | 264.0 | 293.0 |
|  | EP | °C. | 336.0 | 338.0 | 238.0 | 236.5 | 269.0 | 304.0 |
| Distillation Range (90-10) | | °C. | 46.5 | 46.5 | 37.5 | 39.5 | 17.0 | 33.0 |
| Distillation Range (EP-IBP) | | °C. | 79.0 | 78.5 | 70.0 | 65.5 | 34.0 | 50.0 |
| n-Paraffin Content | | % by mass | 40.4 | 36.8 | 56.8 | 47.3 | 58.5 | 54.4 |
| Naphthene Content | | vol % | 0 | 0 | 0 | 0 | 0 | 0 |
| Paraffin Content | | vol % | 100 | 100 | 100 | 100 | 100 | 100 |
| Aromatic Content | | vol % | 0 | 0 | 0 | 0 | 0 | 0 |
| Saturated Content | | vol % | 100 | 100 | 100 | 100 | 100 | 100 |
| Unsaturated Content | | vol % | 0 | 0 | 0 | 0 | 0 | 0 |
| Cetane Index | | | 90.8 | 90.9 | 78.2 | 77.2 | 78.3 | 81.4 |
| Smoke Point | | mm | — | — | 45 | 45 | | |

TABLE 2.1

|  |  |  | Base Oil 7 | Base Oil 8 | Base Oil 9 | Base Oil 10 | Base Oil 11 | Base Oil 12 |
|---|---|---|---|---|---|---|---|---|
| Density (15° C.) | | kg/m³ | 0.805 | 0.797 | 0.798 | 0.86 | 0.788 | 0.775 |
| Kinematic Viscosity (@40° C.) | | mm²/s | 2.325 | 2.55 | 2.37 | 4.142 | 2.833 | 1.305 |
| Flash Point | | °C. | 102 | 113 | 102 | 138 | 94 | 68 |
| Aniline Point | | °C. | 81 | 80 | 77 | 89 | 93 | 81 |
| Sulfur Content | | mass ppm | Less than 1 | Less than 1 | Less than 1 | Less than 1 | Less than 1 | Less than 1 |
| Distillation | IBP | °C. | 235 | 238 | 228 | 277 | 195.5 | 176.6 |
| Properties | 5% | °C. | 236 | 243 | 231 | 280 | 204 | 185 |
|  | 10% | °C. | 239 | 247 | 237 | 281 | 209 | 187.4 |
|  | 50% | °C. | 245 | 251 | 240 | 286 | 241.7 | 195.7 |
|  | 90% | °C. | 254 | 256 | 244 | 295 | 258.6 | 205.4 |
|  | 95% | °C. | 260 | 257 | 246 | 296 | 264 | 207.8 |
|  | EP | °C. | 265 | 264 | 250 | 297 | 280.1 | 218.3 |
| Distillation Range (90-10) | | °C. | 15.0 | 9.0 | 7.0 | 16.0 | 49.6 | 18.0 |
| Distillation Range (EP-IBP) | | °C. | 30 | 26.0 | 22.0 | 20.0 | 84.6 | 41.7 |
| n-Paraffin Content | | % by mass | 36 | 29 | 7 | 24 | 0 | 0 |
| Naphthene Content | | vol % | 18 | 58 | 78 | 44 | 0 | 0 |
| Paraffin Content | | vol % | 82 | 42 | 22 | 56 | 100 | 100 |
| Aromatic Content | | vol % | 0 | 0 | 0 | 0 | 0 | 0 |
| Saturated Content | | vol % | 100 | 100 | 100 | 100 | 100 | 100 |
| Unsaturated Content | | vol % | 0 | 0 | 0 | 0 | 0 | 0 |
| Cetane Index | | | 61.7 | 67.2 | 63.4 | 50.1 | 68.7 | 59.2 |
| Smoke Point | | mm | | | | | | |

TABLE 3.1

|  | Example 1 | | | | | Comparative Example 1 | | | | | | | |
|---|---|---|---|---|---|---|---|---|---|---|---|---|---|
|  | 1 | 2 | 3 | 4 | 5 | 1 | 2 | 3 | 4 | 5 | 6 | 7 | 8 |
| Base Oil 5 | 100 | 100 | 100 | 100 | — | — | — | — | — | 100 | — | — | — |
| Base Oil 6 | — | — | — | — | 100 | — | — | — | — | — | — | — | — |
| Base Oil 7 | — | — | — | — | — | 100 | 100 | 100 | 100 | — | — | — | — |
| Base Oil 8 | — | — | — | — | — | — | — | — | — | — | 100 | — | — |
| Base Oil 9 | — | — | — | — | — | — | — | — | — | — | — | 100 | — |
| Base Oil 10 | — | — | — | — | — | — | — | — | — | — | — | — | 100 |
| Lauryl Alcohol mass % | 5 | 3 | 4.9 | 3 | 3 | 5 | 3 | 4.9 | 3 | — | 3 | 3 | 3 |
| Butyl Stearate mass % | — | 2 | — | 1.9 | 2 | — | 2 | — | 1.9 | — | 2 | 2 | 2 |

TABLE 3.1-continued

|  | Example 1 | | | | | Comparative Example 1 | | | | | | | |
| --- | --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 | 8 |
| Oleic Acid mass % | — | — | 0.1 | 0.1 | — | — | — | 0.1 | 0.1 | — | — | — | — |
| Rolling Load tonf | 2.1 | 1.9 | 2.2 | 1.8 | 1.4 | 2.3 | 2.2 | 2.4 | 2.1 | 5.4 | 2.5 | 3.1 | 2.0 |
| Odor Evaluation | ○ | ○ | ○ | ○ | ○ | ○ | ○ | ○ | ○ | ○ | x | ○ | x |
| Removability | ○ | ○ | ○ | ○ | ○ | x | x | x | x | ○ | ○ | ○ | x |

EXAMPLE 2

In this example, performances as aluminum fin working oil are tested.

Metal working oils were prepared by mixing butyl stearate, lauryl alcohol, 1-tetradecene, and tetrapropylene glycol to base oils shown in Table 1.1 in amounts shown in Table 2.1 respectively.

Each of the resulting metal working oils was tested for aluminum fin working. Namely, frictional coefficient was evaluated as lubricity. Odor and drying property were also evaluated.

then weighted to determine A (g). The test piece is then cooled to room temperature within a desiccator, and coated with each sample oil at a ratio of 2.5 g/m² to determine masses of the test piece before and after coating B (g) and C (g), respectively. This test piece is weighted immediately after stationarily placing it in a 150° C.-thermostatic bath for 5 minutes to determine D (g). The evaporation amount of the sample oil is determined from the respective obtained masses, according to the following equation.

Evaporation amount (%)=100×$(D-A)/(C-B)$.

The results are shown in Table 4.1

TABLE 4.1

|  | Example 2 | | | | Comparative Example 2 | | | |
| --- | --- | --- | --- | --- | --- | --- | --- | --- |
|  | 1 | 2 | 3 | 4 | 1 | 2 | 3 | 4 |
| Base Oil 5 | 100 | 100 | 100 | 100 | — | — | — | — |
| Base Oil 11 | — | — | — | — | 82 | 82 | 82 | 82 |
| Base Oil 12 | — | — | — | — | 18 | 18 | 18 | 18 |
| Lauryl Alcohol mass % | 2 | — | — | — | 2 | — | — | — |
| Butyl Laurate mass % | — | 2 | — | — | — | 2 | — | — |
| 1-Tetradecene mass % | — | — | 3 | — | — | — | 3 | — |
| Tetrapropylene glycol mass % | — | — | — | 1 | — | — | — | 1 |
| Frictional Coefficient | 0.11 | 0.13 | 0.97 | 0.15 | 0.23 | 0.21 | 0.20 | 0.23 |
| Odor Evaluation | ○ | ○ | ○ | ○ | x | x | x | x |
| Drying Property, % | 100 | 99.4 | 99.7 | 100 | 100 | 100 | 99.5 | 99.9 |

The results are summarized in Table 4.1
Testing methods of the test items are as follows.
Testing Method of Lubricity:
 Material: Aluminum JIS A1050 material
 The frictional coefficient is evaluated by Bauden Test.
 Load 250 g, Sliding speed 100 mm/s
Measuring Method of Odor:
 Odor determination was carried out in a state where each sample oil was heated to 40° C.
 The odor of each sample oil was evaluated by ten panelists by giving an evaluation point to each sample oil based on a scoring reference of non-disturbing: 0, slight odorous: 2, and odorous: 4, and an average value of the points was calculated for each sample oil.
 The result is shown by ○: less than 1, Δ: 1 or more and less than 2, and x: 2 or more.
Evaluation Method of Drying Property:
 An aluminum test piece washed with a solvent is stationarily placed in a 150° C.-thermostatic bath for 5 minutes and Second Mode (Metalworking Oil Composition)

The metalworking oil of the invention in this mode further includes ester oil (A). The ester oil used in combination will be described first.

This ester oil may be either a natural material (generally contained in natural fats of animals and plants, or the like) or a synthetic material. In the invention of this mode, a synthetic ester is preferred from the point of stability of the resulting lubricant or uniformity of ester components, and a natural ester is preferred from the point of the effect on the environment.

The alcohol constituting the ester oil (A) may be monohydric or polyhydric, and the acid constituting the ester oil may be monobasic or polybasic.

As the monohydric alcohol, those having generally 1 to 24, preferably 1 to 12, more preferably 1 to 8 carbon atoms are used. Such alcohol may be straight or branched, and further may be saturated or unsaturated. Concrete examples of the alcohol having 1 to 24 carbon atoms include methanol, ethanol, straight or branched propanol, straight or branched butanol, straight or branched pentanol, straight or branched hexanol, straight or branched heptanol, straight or branched octanol, straight or branched nonanol, straight or branched decanol, straight or branched undecanol, straight or branched dodecanol, straight or branched tridecanol, straight or branched tetradecanol, straight or branched pentadecanol, straight or branched hexadecanol, straight or branched heptadecanol, straight or branched octadecanol, straight or branched nonadecanol, straight or branched eicosanol, straight or branched heneicosanol, straight or branched tricosanol, straight or branched tetracosanol, and mixtures thereof.

As the polyhydric alcohol, generally divalent to decavalent, preferably divalent to hexavalent ones are used. As the divalent to decavalent polyhydric alcohols, concrete and preferable examples of the divalent to hexavalent polyhydric alcohols include ethylene glycol, diethylene glycol, polyethylene glycol (trimer to decamer of ethylene glycol), propylene glycol, dipropylene glycol, polypropylene glycol (trimer to decamer of propylene glycol), 1,3-propanediol, 2-methyl-1,2-propanediol, 2-methyl-1,3-propanediol, neopentyl glycol, glycerin, diglycerin, triglycerin, trimethylolalkane (trimethylolethane, trimethylolpropane, trimethylolbutane, etc.) and dimers to tetramers thereof, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol-glycerin condensate, adonitol, arabitol, xylitol, mannitol, and mixtures thereof. Further, ethylene glycol, propylene glycol, neopentyl glycol, glycerin, trimethylolethane, trimethylolpropane, pentaerythritol, sorbitan and mixtures thereof are more preferred. Particularly, from the point that further high heat/oxidation stability can be ensured, neopentyl glycol, trimethylolethane, trimethylolpropane, pentaerythritol, and mixtures thereof are most preferred.

The alcohol constituting the ester oil (A) is preferably a polyhydric alcohol from the point that more excellent lubricity can be attained and from the point that the handling property in winter and cold districts is further improved since a one with low pour point is more easily obtained, although it may be monohydric or polyhydric as described above. When an ester oil of polyhydric alcohol is used, the effects of improving accuracy of work finished surface and preventing wear of tool cutting edge can be further enhanced.

As the monobasic acid of the basic acid of the acid constituting the ester oil (A), fatty acid having 2 to 24 carbon atoms is generally used, and such fatty acid may be straight or branched, and further may be saturated or unsaturated. Particularly, from the point that the lubricity and the handling property can be further enhanced, saturated fatty acid having 3 to 20 carbon atoms, unsaturated fatty acid having 3 to 33 carbon atoms, and mixtures thereof are preferred, saturated fatty acid having 4 to 18 carbon atoms, unsaturated fatty acid having 4 to 18 carbon atoms, and mixtures thereof are more preferred, and unsaturated fatty acid having 4 to 18 carbon atoms is further preferred. From the point of sticking preventing performance, saturated fatty acid having 4 to 18 carbon atoms is further preferred.

As the polybasic acid, dibasic acid having 2 to 16 carbon atoms, trimellitic acid and the like are used. The dibasic acid having 2 to 16 carbon atoms may be straight or branched, and further may be saturated or unsaturated. Concretely, although the acid constituting the ester oil (A) may be monobasic or polybasic as described above, the monobasic acid is preferably used since an ester contributable to improvement of viscosity index and improvement of sticking preventive performance can be easily obtained.

As the ester oil usable in the invention, for example, the following esters can be given although the combination of alcohol and acid which constitute the ester (A) can be optionally selected without particular limitation.
(i) Ester of monohydric alcohol with monobasic ester
(ii) Ester of polyhydric alcohol with monobasic acid
(iii) Ester of monohydric alcohol with polybasic acid
(iv) Ester of polyhydric alcohol with polybasic acid
(v) Mixed ester of mixture of monohydric alcohol and polyhydric alcohol with polybasic acid
(vi) Mixed ester of polyhydric alcohol with mixture of monobasic acid and polybasic acid
(vii) Mixed ester of mixture of monohydric alcohol and polyhydric alcohol with mixture of monobasic acid and polybasic acid Among them, the ester of polyhydric alcohol with monobasic acid (ii) is preferred from the points that further excellent lubricity can be ensured, that the handling property in winter and cold districts can be further improved since a one with low pour point is more easily obtained, and that a one with high viscosity index can be more easily obtained.

Examples of naturally-derived ester used in the present invention include natural fats including vegetable oils such as palm oil, palm kernel oil, rapeseed oil, soybean oil, sunflower oil, and high-oleic rapeseed oil, high-oleic sunflower oil or the like in which the content of oleic acid in a fatty acid constituting glyceride is increased by breed improvement or generic recombination operation, and animal oils such as lard.

Among these naturally-derived esters, from the point of stability of lubricant, high-oleic natural fat with increased content of oleic acid is preferred, and a triester of a fatty acid with glycerin (hereinafter referred simply to as "triester") in which the content of oleic acid in the fatty acid is 40 to 98% by mass is particularly preferred. By using such triester, balanced lubricity and heat/oxidation stability can be attained in a high level. The content of oleic acid in the fatty acid constituting the triester is preferably 50% by mass or more, more preferably 60% by mass or more, further preferably 70% by mass or more from the point that the balanced lubricity and heat/oxidation stability can be attained in a high level, and also preferably 95% by mass or less, more preferably 90% by mass or less from the same point.

The ratio of oleic acid in the fatty acid constituting the triester (hereinafter referred to as "component fatty acid" in this mode) or the ratio of linoleic acid or the like described later is measured according to "Fatty Acid Composition", Paragraph 2.4.2 of Standard Methods for the Analysis of Fats, Oils and Related Materials, established by Japan Oil Chemists' Society.

The fatty acid other than the oleic acid of the component fatty acid of the triester is preferably a fatty acid having 6 to 24 carbon atoms although it is not particularly limited as long as lubricity and heat/oxidation stability are never impaired. The fatty acid having 6 to 24 carbon atoms may be a saturated fatty acid or an unsaturated fatty acid having 1 to 5 unsaturated bonds. This fatty acid may be straight or branched. Further, the fatty acid may have 1 to 3 hydroxy groups (—OH) in addition to carboxyl group (—COOH). Concrete examples of such fatty acid include caproic acid, caprylic acid, lauric acid, myristic acid, palmitic acid, stearic acid, arachic acid, behenic acid, lignoceric acid, lauroleic acid, myristoleic acid, palmitoleinic acid, gadoleic acid, erucic acid, ricinolic acid, linoleic acid, linoleinic acid, eleostearic acid, licanic acid, arachidonic acid, and curvadic acid. Among these fatty acids, linoleic acid is preferred from the point of compatibility between lubricity and heat/oxidation stability, and 1 to 60% by mass (more preferably, 2 to 50% by mass, further preferably 4 to 40% by mass) of the fatty acid constituting the triester is composed of the linoleic acid.

In the above-mentioned triester, 0.1 to 30% by mass (more preferably 0.5 to 20% by mass, further preferably 1 to 10% by mass) of the component fatty acid is composed of fatty acid having 6 to 16 carbon atoms. The heat/oxidation stability tends to fall when the ratio of the fatty acid having 6 to 16 carbon atoms is less than 0.1% by mass, while the lubricity tends to fall when it exceeds 30% by mass.

The total unsaturation degree of the triester is preferably 0.3 or less, more preferably 0.2 or less. When the total unsaturation degree of the triester exceeds 0.3, the heat/oxidation stability of the lubricant of the invention tends to deteriorate. The total unsaturation degree referred to in the present invention means a total unsaturation degree measured by the same apparatus and operation method according to JIS K1557-1970 "Testing Method of Polyether for Polyurethane", except using the triester instead of polyether for polyurethane.

As such triester used in the invention, those obtained by synthesis may be used as long as the ratio of oleic acid in the component fatty acid satisfies the above-mentioned condition, or natural oil such as vegetable oil containing the triester may be used. From the point of safety to human body, however, natural oil such as vegetable oil is preferably used. As such vegetable oil, rapeseed oil, sunflower oil, soybean oil, cone oil, and canola oil are preferably used, and sunflower oil, rapeseed oil and soybean oil are particularly preferred.

Although most of such natural vegetable oils have a total unsaturation degree exceeding 0.3, the total unsaturation degree can be reduced by a treatment such as hydrogenation in the refining process thereof A vegetable oil with low total unsaturation degree can be easily produced by genetic recombination technique. As vegetable oil having a total unsaturation degree of 0.3 or less and including 70% by mass or more of oleic acid, high-oleic canola oil or the like can be given, and as a one including 80% by mass or more of oleic acid, high-oleic soybean oil, high-oleic sunflower oil, high-oleic rapeseed oil or the like can be given.

In the invention of this mode, the ester obtained using polyhydric alcohol as the alcohol component may be a perfect ester in which all hydroxy groups in the polyhydric alcohol are esterified, or a partial ester in which a part of the hydroxy groups is left as it is without being esterified. The organic acid ester obtained using polybasic acid as the acid component may be a perfect ester in which all carboxyl groups in the polybasic acid are esterified, or a partial ester in which a part of the carboxyl groups is left as it is without being esterified.

The iodine value of the ester oil (A) is preferably 0 to 80, more preferably 0 to 60, further preferably 0 to 40, further more preferably 0 to 20, most preferably 0 to 10. The bromine value of the ester in the invention is preferably 0 to 50 $gBr_2/100$ g, more preferably 0 to 30 $gBr_2/100$ g, further preferably 0 to 20 $gBr_2/100$ g, most preferably 0 to 10$gBr_2/100$ g. When the iodine value or bromine value of the ester is within the respective range, the sticking preventing performance of the resulting lubricant can be further enhanced. The iodine value referred to herein means a value measured by the indicator titration method of JIS K0070 "Measuring Methods for Acid Value, Saponification Value, Ester Value, Iodine Value, Hydroxy Value and Unsaponification Value of Chemical Products". The bromine value means a value measured by JIS K2605 "Chemical Products-Bromine Value Testing Methods-Electric Titration Method" (hereinafter the same applies to).

For giving further satisfactory lubricating performance to the metalworking oil composition of the invention in this mode, it is preferred that the hydroxy value of the ester oil (A) is 0.01 to 300 mgKOH/g, and the saponification value is 100 to 500 mgKOH/g. The upper limit value of hydroxy value of the ester for ensuring further high lubricity in the invention is more preferably 200 mgKOH/g, most preferably 150 mgKOH/g, while the lower limit value thereof is more preferably 0.1 mgKOH/g, further preferably 0.5 mgKOH/g, further preferably 1 mgKOH/g, further preferably 3 mgKOH/g, most preferably 5 mgKOH/g. The upper limit value of saponification value of the ester oil (A) is further preferably 400 mgKOH/g, while the lower limit value thereof is further preferably 200 mgKOH/g. The hydroxy value referred to herein means a value measured by the indicator titration method of JIS K0070 "Measuring Methods for Acid Value, Saponification Value, Ester Value, Iodine Value, Hydroxy Value and Unsaponification Value of Chemical Products". The saponification value means a value measured by the indicator titration method of JIS K2503 "Testing Method of Lubricant Oil for Aircraft" (hereinafter the same applies to).

Although the kinematic viscosity of the ester oil (A) is not particularly limited, the kinematic viscosity at 40° C. is preferably 300 $mm^2/s$ or less, more preferably 200 $mm^2/s$ or less, further preferably 100 $mm^2/s$ or less, particularly preferably 75 $mm^2/s$ or less. The kinematic viscosity of the ester is also preferably 1 $mm^2/s$ or more, more preferably 3 $mm^2/s$ or more, further preferably 5 $mm^2/s$ or more.

Although the pour point and viscosity index of the ester oil (A) are not particularly limited, the pour point is preferably −10° C. or lower, further preferably −20° C. or lower. The viscosity index is preferably 100 or more and 200 or less.

The content of the ester oil (A) in the metalworking oil composition of the invention in this mode is preferably 95% by mass or less, based on the total amount of the composition, more preferably 90% by mass or less, further preferably 80% by mass or less, particularly preferably 70% by mass or less although it is not particularly limited. When the content exceeds 95% by mass, an increased working resistance due to increased welding tends to deteriorate the processing efficiency and the tool life. The content of the ester oil (A) is also preferably 10% by mass or more, based on the total amount of the composition, more preferably 20% by mass or more, further preferably 30% by mass or more, particularly preferably 40% by mass or more. When the content is less than 10% by mass, an increased working resistance due to increased welding tends to deteriorate the processing efficiency and the tool life. When applied to cutting/grinding by minimal quantitative lubrication method, biodegradability tends to deteriorate.

Hydrocarbon base oil (B) of the invention in this mode which is used in combination with the above-mentioned ester oil will be described in detail.

(B) Hydrocarbon Base Oil

The hydrocarbon base oil of the invention in this mode is the above-mentioned hydrocarbon oil, which has a density at 15° C. of 0.7 to 0.8 $g/cm^3$, and includes a n-paraffin content of 10 to 90% by mass, an aromatic content of 0 to 3% by volume and a naphthene content of 0 to 20% by volume. More specifically, as a more concrete and preferable mode, the following mode B can be given although the properties of the hydrocarbon oil (B) are as described above.

Namely, base oil (B1) having an initial distillation point of 200° C. or lower and a flash point of 50° C. or higher is preferred.

The properties of the base oil of (B1) are as follows.

The density (15° C.) is preferably 0.70 to 0.80 g/cm$^3$, more preferably 0.72 to 0.79 g/cm$^3$, further preferably 0.74 to 0.76 g/cm$^3$ although it is not particularly limited.

The 40° C.-kinematic viscosity (mm$^2$/s) is preferably 0.5 to 3.0 mm$^2$/s, more preferably 1.0 to 2.5 mm$^2$/s, further preferably 1.2 to 2.0 mm$^2$/s although it is not particularly limited. A high viscosity lubricant can be used by setting the kinematic viscosity within this range.

The flash point (TC) (° C.) is 50° C. or higher, preferably 50 to 100° C., more preferably 55 to 80° C., further preferably 55 to 65° C.

The distillation properties (° C.) are as follows, based on Engler distillation (JIS K2254).

The initial boiling point (° C.) is 200° C. or lower. It is preferably 150° C. or higher and 200° C. or lower, more preferably 160 to 180° C., further preferably 165 to 175° C.

The 10%-distillation point (° C.) is preferably 160° C. or higher and 210° C. or lower, more preferably 170 to 200° C., further preferably 180 to 190° C. although it is not particularly limited.

The 50%-distillation point (° C.) is preferably 170° C. or higher and 230° C. or lower, more preferably 180 to 220° C., further preferably 190 to 210° C. although it is not particularly limited.

The 90%-distillation point (° C.) is preferably 190° C. or higher and 250° C. or lower, more preferably 200 to 240° C., further preferably 210 to 230° C. although it is not particularly limited.

The end point (° C.) is 190 to 400° C. It is preferably 210° C. or higher and 270° C. or lower, more preferably 220 to 260° C., further preferably 230 to 250° C.

$T_{90}$-$T_{10}$ (° C.) is preferably 15° C. or higher and 70° C. or lower, more preferably 20 to 60° C., further preferably 30 to 50° C. although it is not particularly limited.

EP-IBP (° C.) is preferably 35° C. or higher and 110° C. or lower, more preferably 40 to 100° C., further preferably 50 to 90° C. although it is particularly limited.

The aniline point (° C.) is preferably 65° C. or higher, more preferably 70 to 90° C., further preferably 75 to 85° C. although it is particularly limited. The processing performance is improved within this range.

The cetane index (JIS K2280) is 55 or more. It is preferably 60 to 110, more preferably 65 to 90, further preferably 70 to 80. The processing performance is improved within this range.

The compositions are as follows.

The amount of the n-paraffin content (% by mass) is 10 to 90% by mass, preferably 20 to 80% by mass, further preferably 30 to 70% by mass. The workability is undesirably deteriorated when it is below this range, and the compatibility with the ester oil (A) is undesirably deteriorated when it is beyond this range.

The base oil (B) of the invention in this mode is further preferably base oil (B2) having an initial boiling point of 200° C. or higher, a flash point of 70° C. or more, and a cetane index of 60 or more.

The properties of the distilled oil (B2) are as follows.

The density (15° C.) is preferably 0.70 to 0.80 g/cm$^3$, more preferably 0.72 to 0.79 g/cm$^3$, further preferably 0.74 to 0.785 g/cm$^3$, particularly preferably 0.76 to 0.785 g/cm$^3$ although it is not particularly limited. A flash point can be attained by setting the density within this range.

The 40° C.-kinematic viscosity (mm$^2$/s) is preferably 2.0 to 9.0 mm$^2$/s, more preferably 2.5 to 5.5 mm$^2$/s, further preferably 3.0 to 5.0 mm$^2$/s although it is not particularly limited. A high flash point can be attained by setting the kinematic viscosity within this range.

The flash point (TC) (° C.) is 50° C. or higher, preferably 70 to 200° C., more preferably 80 to 150° C., further preferably 100 to 140° C., particularly preferably 120 to 140° C. The safety can be improved by setting the flash point within this range.

The distillation properties (° C.) are as follows, based on Engler distillation (JIS K2254).

The initial boiling point (° C.) is 200° C. or more. It is preferably 210 to 270° C., more preferably 220 to 260° C.

The 10%-distillation point (° C.) is preferably 210° C. or higher and 290° C. or lower, more preferably 220 to 285° C., further preferably 230 to 280° C., particularly preferably 240 to 275° C. although it is not particularly limited.

The 50%-distillation point (° C.) is preferably 230° C. or higher and 320° C. or lower, more preferably 240 to 310° C., further preferably 250 to 300° C., particularly preferably 260 to 290° C. although it is not particularly limited.

The 90%-distillation point (° C.) is preferably 250° C. or higher and 390° C. or lower, more preferably 260 to 370° C., further preferably 270 to 340° C., particularly preferably 280 to 330° C. although it is not particularly limited.

The end point (° C.) is 190 to 400° C. It is preferably 270° C. or higher and 400° C. or lower, more preferably 280 to 380° C., further preferably 290 to 350° C.

$T_{90}$-$T_{10}$ (° C.) is preferably 15° C. or higher and 70° C. or lower, more preferably 20 to 60° C., further preferably 30 to 50° C. although it is not particularly limited.

EP-IBP (° C.) is preferably 35° C. or higher and 110° C. or lower, more preferably 40 to 100° C., further preferably 50 to 90° C. although it is particularly limited.

The aniline point (° C.) is preferably 65° C. or higher, more preferably 75 to 110° C., further preferably 85 to 105° C. although it is not particularly limited.

The cetane index (JIS K2280) is 55 or more. It is preferably 60 to 110, more preferably 65 to 100, further preferably 70 to 95.

The compositions are as follows.

The n-paraffin content (% by mass) is 10 to 90% by mass, preferably 20 to 80% by mass, further preferably 30 to 70% by mass. The workability is undesirably deteriorated when it is below this range, while the compatibility with the ester oil (A) is undesirably deteriorated when it is beyond this range.

The content of the hydrocarbon oil (B) in the metalworking oil composition of the invention in this mode is preferably 70% by mass or less, based on the total amount of the composition, more preferably 60% by mass or less, further preferably 50% by mass or less. When the content exceeds 70% by mass, oil misting characteristic is deteriorated, and deterioration of processing efficiency and tool life is apt to be caused thereby when applied to cutting/grinding by minimal quantitative lubrication method. The content of the hydrocarbon oil (B) is also preferably 1% by mass or more, based on the total amount of the composition, more preferably 5% by mass or more, further preferably 10% by mass or more, particularly preferably 20% by mass or more. When the content is less than 1% by mass, increase of welding or working resistance in nonferrous metal working cannot suppressed, and deterioration of processing efficiency and tool life is apt to be caused thereby.

The metalworking oil composition of the invention in this mode, which comprises the ester oil (A) and the hydrocarbon oil (B), may further include other base oils.

Concrete examples of the other base oils include polyglycol such as polyethylene glycol, polypropylene glycol, polyoxyethylene polyoxypropylene glycol, polyethylene glycol monoether, polypropylene glycol monoether, polyoxyethylene polyoxypropylene glycol monoether, polyethylene glycol diether, polypropylene glycol diether or polyoxyethylene polyoxypropylene glycol diether; phenyl ether such as monoalkyldiphenylether, dialkyldiphenylether, monoalkyltriphenylether, dialkyltriphenylether, tetraphenylether, monoalkyltetraphenylether, dialkyltetraphenylether or pentaphenylether; silicone oil; and fluoroether such as perfluoroether. These compounds may be used singly or in combination of two or more thereof.

The content of the other base oils is preferably 65% by mass or less, based on the total amount of the composition, more preferably 50% by mass or less, further preferably 30% by mass or less, further more preferably 20% by mass or less, particularly preferably 10% by mass or less.

The metalworking oil composition of the invention in this mode preferably further includes an oily agent (C) from the point that the processing efficiency and the tool life can be further enhanced.

Examples of such an oily agent includes an alcohol oily agent (C-1), a carboxylic acid oily agent (C-2), a sulfide of unsaturated carboxylic acid (C-3), a compound represented by the following general formula (1) of this mode (C-4), a compound represented by the following general formula (2) of this mode (C-5), a polyoxyalkylene compound (C-6), an ester oily agent (C-7), a hydrocarbylether of polyhydric alcohol (C-8), and an amine oily agent (C-9).

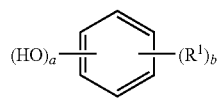

(1)

wherein $R^1$ represents a hydrocarbon group having 1 to 30 carbon atoms, a represents an integer of 1 to 6, and b represents an integer of 0 to 5.

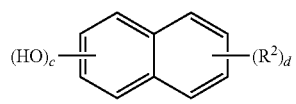

(2)

wherein $R^2$ represents a hydrocarbon group having 1 to 30 carbon atoms, c represents an integer of 1 to 6, and d represents an integer of 0 to 5.

The alcohol oily agent (C-1) may be monohydric or polyhydric. From the point that further high processing efficiency and tool life can be ensured, monohydric alcohol having 1 to 40 carbon atoms is preferred, alcohol having 1 to 25 carbon atoms is more preferred, and alcohol having 8 to 18 carbon atoms is most preferred. Concretely, those given in the abovementioned examples of the alcohol constituting the ester oil (A) of the base oil can be used. Such alcohol may be straight or branched, and further may be saturated or unsaturated. From the point of sticking preventing performance, a saturated one is preferably used.

The carboxylic acid oily agent (C-2) may be monobasic or polybasic. From the point that further high processing efficiency and tool life can be ensured, monovalent carboxylic acid having 1 to 40 carbon atoms is preferred, carboxylic acid having 5 to 25 carbon atoms is further preferred, and carboxylic acid having 5 to 20 carbon atoms is most preferred. Concretely, those given in the above-mentioned examples of the carboxylic acid constituting the ester of the ester oil (A) as the base oil can be used. Such carboxylic acid may be straight or branch, and further may be saturated or unsaturated. From the point of sticking preventing performance, a saturated carboxylic acid is preferably used.

As the sulfide of unsaturated carboxylic acid (C-3), for example, sulfides of unsaturated ones of the above-mentioned carboxylic acids in (B) can be given, concretely including sulfide of oleic acid.

In the compound (C-4) represented by the general formula (1) of this mode, examples of the hydrocarbon group having 1 to 30 carbon atoms represented by $R^1$ include straight or branched alkyl group having 1 to 30 carbon atoms, cycloalkyl group having 5 to 7 carbon atoms, alkylcycloalkyl group having 6 to 30 carbon atoms, straight or branched alkenyl group having 2 to 30 carbon atoms, aryl group having 6 to 10 carbon atoms, alkylaryl group having 7 to 30 carbon atoms, and arylalkyl group having 7 to 30 carbon atoms. Among them, straight or branched alkyl group having 1 to 30 carbon atoms is preferred, straight or branched alkyl group having 1 to 10 carbon atoms is more preferred, and straight or branched alkyl group having 1 to 4 carbon atoms is most preferred. Examples of the straight or branched alkyl group having 1 to 4 carbon atoms include methyl group, ethyl group, straight or branched propyl group, and straight or branched butyl group.

When the compound has two or more hydroxy groups, the hydroxy groups are preferably substituted by carbon atoms adjacent thereto although the substation position of hydroxy groups is optional. (a) is preferably an integer of 1 to 3, further preferably 2. (b) is preferably an integer of 0 to 3, further preferably 1 or 2. Examples of the compound represented by the general formula (1) of this mode include p-tert-buthylcatechol.

In the compound (C-5) represented by the general formula (2) of this mode, examples of the hydrocarbon group having 1 to 30 carbon atoms represented by $R^2$ include the same as the above-mentioned examples of the hydrocarbon group having 1 to 30 carbon atoms represented by $R^1$ in the general formula (1) of this embodiment, and preferred examples are also the same. When the compound has two or more hydroxyl groups, the hydroxyl groups are preferably substituted by carbon atoms adjacent thereto although the substitution position of hydroxyl group is optional. (c) is preferably an integer of 1 to 3, further preferably 2. (d) is preferably an integer of 0 to 3, further preferably 1 or 2. Examples of the compound represented by the general formula (2) include 2,2-dihydroxynaththalene and 2,3-dihydroxynaphthalene.

Examples of the polyoxyalkylene compound (C-6) include a compound represented by the following general formula (3) or (4) of this mode.

(3)

wherein $R^3$ and $R^5$ each independently represent hydrogen atom or a hydrocarbon group having 1 to 30 carbon atoms, $R^4$ represents an alkylene group having 2 to 4 carbon atoms, and e represents an integer such that the number average molecular weight is 100 to 3500.

(4)

wherein A represents a residue after entirely or partially removing hydrogen atoms of hydroxyl groups of a polyhydric alcohol having 3 to 10 hydroxyl groups, $R^6$ represents an alkylene group having 2 to 4 carbon atoms, $R^7$ represents hydrogen atom or a hydrocarbon group having 1 to 30 carbon atoms, f represents an integer such that the number average molecular weight is 100 to 3500, and g represents the same number as the number of hydrogen atoms removed from the hydroxyl groups of A.

In the general formula (3), at least one of $R^3$ and $R^5$ is preferably hydrogen atom. As the hydrocarbon group having 1 to 30 carbon atoms represented by $R^3$ and $R^5$, for example, the same as in the above-mentioned examples of the hydrocarbon group having 1 to 30 carbon atoms represented by $R^1$ in the general formula (1) of this mode can be given, and preferred examples are also the same. Concrete examples of the alkylene group having 2 to 4 carbon atoms represented by $R^4$ include ethylene group, propylene group (methylethylene group) and butylene group (ethylethylene group). (e) is preferably an integer such that the number average molecular weight is 300 to 2000, further preferably an integer such that the number average molecular weight is 500 to 1500.

As the polyhydric alcohol having 3 to 10 hydroxyl groups constituting A in the general formula (4) of this mode, glycerin, polyglycerin, trimethylolalkane and dimers to tetramers thereof, pentaerythritol, dipentaerythritol, sorbitol, and sorbitan are preferred.

Examples of the alkylene group having 2 to 4 carbon atoms represented by $R^6$ include the same as in the above-mentioned examples of the alkylene group having 2 to 4 carbon atoms represented by $R^4$ in the general formula (3) of this mode. Examples of the hydrocarbon group having 1 to 30 carbon atoms represented by $R^7$ include the same as in the above-mentioned examples of the hydrocarbon group having 1 to 30 carbon atoms represented by $R^1$ in the general formula (1) of this mode, and preferred examples are also the same. At least one of g-pieces of $R^7$ is preferably hydrogen atom, and all of them are further preferably hydrogen atoms. (f) is preferably an integer such that the number average molecular weight is 300 to 2000, further preferably an integer such that the number average molecular weight is 500 to 1500.

In the ester oily agent (C-7), the alcohol constituting the agent may be monohydric or polyhydric, and the carboxylic acid constituting the agent may be monobasic or polybasic.

As the examples of the monohydric alcohol and the polyhydric alcohol, the alcohol may be monohydric or polyhydric, and the acid constituting the ester oily agent may be monobasic or polybasic.

As the monohydric alcohol, a one having, generally 1 to 24, preferably 1 to 12, more preferably 1 to 8 carbon atoms is used, concretely, including those given in the above-mentioned examples of the monohydric alcohol constituting the ester oil (A) of the base oil. Such alcohol may be straight or branched, and further may be saturated or unsaturated.

As the polyhydric alcohol, generally divalent to decavalent, preferably divalent to hexavalent ones are used. Concretely, as the divalent to decavalent polyhydric alcohol, those given in the above-mentioned examples of the polyhydric alcohol constituting the ester oil (A) of the base oil can be used. Among them, neopentyl glycol, trimethylolethane, trimethylolpropane, pentaerythritol and mixtures thereof are most preferred since further high heat/oxidation stability can be ensured.

Although the alcohol constituting the ester oily agent may be monohydric or polyhydric as described above, polyhydric alcohol is preferred from the point that excellent processing efficiency and tool life can be attained by preventing welding and increase of processing resistance and from the point that the handling property in winter and cold districts can be further improved since a one with low pour point can be more easily obtained. When an ester of polyhydric alcohol is used, the effects of improving accuracy of work finished surface and preventing wear of tool cutting edge can be enhanced in cutting/grinding.

As the monobasic acid of the acid constituting the ester oily agent, fatty acid having 2 to 24 carbon atoms is generally used, and such fatty acid may be straight or branched, and further may be saturated or unsaturated. Concretely, those given in the above-mentioned examples of the monobasic acid constituting the ester oil (A) of the base oil can be used. Among them, from the point that excellent processing efficiency and tool life can be attained by preventing welding and increase of processing resistance and from the point of handling property, saturated fatty acid having 3 to 20 carbon atoms, unsaturated fatty acid having 3 to 22 carbon atoms and mixtures thereof are preferred, saturated fatty acid having 4 to 18 carbon atoms, unsaturated fatty acid having 4 to 18 carbon atoms and mixtures thereof are more preferred, and unsaturated fatty acid having 4 to 18 carbon atoms is further preferred. From the point of sticking preventing performance, saturated fatty acid having 4 to 18 carbon atoms is further preferred.

As the polybasic acid, dibasic acid having 2 to 16 carbon atoms, trimellitic acid and the like are usable. The dibasic acid having 2 to 16 carbon atoms may be straight or branched, and further may be saturated or unsaturated. Concretely, the above-mentioned examples of the polybasic acid constituting the ester oil (A) of the base oil can be used. Although the combination of alcohol and acid in the ester oily agent can be optionally determined without particular limitation, for example, the above-mentioned combinations of alcohol and acid constituting the ester (A) of the base oil can be adapted as an ester oily agent usable in the invention.

When a polyhydric alcohol is used as the alcohol component, the resulting ester may be a perfect ester in which all hydroxyl groups in the polyhydric alcohol are esterified, or a partial ester in which a part of the hydroxyl groups is left as it is without being esterified. When a polybasic acid is used as the carboxylic acid component, the resulting ester may be a perfect ester in which all carboxyl groups in the polybasic acid are esterified, or a partial ester in which a part of the carboxyl groups is left as it is without being esterified.

Although the total number of carbon atoms in the ester oily agent is not particularly limited, the ester has preferably 7 or more, further preferably 9 or more, most preferably 11 or more carbon atoms in total from the point that excellent processing efficiency and tool life can be attained by preventing welding and increase of processing resistance. From the point of prevention of increase of staining or corrosion and from the point of adaptability with organic material, the ester has preferably 60 or less carbon atoms, more preferably 45 or less carbon atoms, further preferably 26 or less carbon atoms, further more preferably 24 or less carbon atoms, most preferably 22 or less carbon atoms in total.

As the polyhydric alcohol constituting the hydrocarbyl ether of polyhydric alcohol (C-8), generally divalent to decavalent, preferably divalent to hexavalent ones are used. Concrete examples of the divalent to decavalent polyhydric alcohols include those given in the above-mentioned examples of the polyhydric alcohol constituting the ester oil (A) of the base oil. Among them, glycerin is most preferred from the point that excellent processing efficiency and tool life can be attained by preventing welding and increase of processing resistance.

As the hydrocarbyl ether of polyhydric alcohol (C-8), those obtained by entirely or partially hydrocarbyl-etherifying hydroxyl groups of the above-mentioned polyhydric alcohol can be used. From the point that excellent processing efficiency and tool life can be attained by preventing welding and increase of processing resistance, those obtained by partially hydrocarbyl-etherifying hydroxyl groups of the polyhydric alcohol (partial ethers) are preferred. The hydrocarbyl group referred to herein means a hydrocarbon group having 1 to 24 carbon atoms such as alkyl group having 1 to 24 carbon atoms, alkenyl group having 2 to 24 carbon atoms, cycloalkyl group having 5 to 7 carbon atoms, alkylcycloalkyl group having 6 to 11 carbon atoms, aryl group having 6 to 10 carbon atoms, alkylaryl group having 7 to 18 carbon atoms, or arylalkyl group having 7 to 18 carbon atoms.

Among them, from the point that excellent processing efficiency and tool life can be attained by preventing welding and increase of processing resistance, straight or branched alkyl group having 2 to 18 carbon atoms and straight or branched alkenyl group having 2 to 18 carbon atoms are preferred, and straight or branched alkyl group having 3 to 12 carbon atoms and oleyl group (residue after removing hydroxyl groups from oleyl alcohol) are more preferred.

As the amine oily agent (C-9), monoamine is preferably used. The number of carbon atoms in the monoamine is preferably 6 to 24, more preferably 12 to 24. The number of carbon atoms referred to herein means the number of all carbon atoms contained in the monoamine and, when the monoamine has two or more hydrocarbon groups, it means the total number of carbon atoms in such hydrocarbon groups.

As the monoamine used in the present invention, primary monoamine is preferred from the point that excellent processing efficiency and tool life can be attained by preventing welding and increase of processing resistance although each of primary monoamine, secondary monoamine, and tertiary monoamine is usable.

As a hydrocarbon group bonded to nitrogen atom of the monoamine, alkyl group or alkenyl group is preferred from the point that excellent processing efficiency and tool life can be attained by preventing welding and increase of processing efficiency, although each of alkyl group, alkenyl group, cycloalkyl group, alkylcycloalkyl group, aryl group, alkylaryl group, arylalkyl group and the like is usable. Such alkyl group or alkenyl group is preferably straight from the point that the processing efficiency and tool life can be improved by preventing welding and increase of processing resistance although it may be straight or branched.

Among them, from the point that excellent processing efficiency and tool life can be attained by preventing welding and increase of processing resistance, primary monoamine having 12 to 24 carbon atoms is preferred, primary monoamine having 14 to 20 carbon atoms is more preferred, and primary monoamine having 16 to 18 carbon atoms is further preferred.

In the invention of this mode, only one selected from the above-mentioned oily agents (C-1) to (C-9) may be used, or a mixture of two or more kinds selected therefrom may be used. From the point that excellent processing efficiency and tool life can be attained by preventing welding and increase of processing resistance, one kind or a mixture of two kinds or more selected from the carboxylic acid oily agent (C-2) and the amine oily agent (C-9) is preferably used.

From the point that excellent processing efficiency and tool life can be attained by preventing welding and increase of processing resistance, the content of the oily agent (C) is preferably 0.01% by mass or more, based on the total amount of the composition, more preferably 0.05% by mass or more, further preferably 0.1% by mass or more although it is not particularly limited. From the point of stability, the content of the oily agent is preferably 15% by mass or less, based on the total amount of the composition, more preferably 10% by mass or less, further preferably 5% by mass or less.

The metalworking oil composition of the invention in this mode preferably further includes an extreme pressure agent (D) from the point that excellent processing efficiency and tool life can be attained by preventing welding and increase of processing resistance. Particularly, when the extreme pressure agent (D) is used together with the above-mentioned oily agent (C), the welding and increase of processing resistance can be further prevented by the synergistic effect thereof to attain further excellent processing efficiency and tool life. The metalworking oil composition of the invention can be used as a non-working part lubricant for machine tool as described later, and in this case, it is desirable that the composition contains the oily agent (C).

As the extreme pressure agent, for example, the following sulfur compound (D-1) and phosphor compound (D-2) can be given.

As the sulfur compound (D-1), dihydrocarbyl polysulfide, sulfidized ester, sulfidized mineral oil, zinc dithiophosphate compound, zinc dithiocarbamate compound, molybdenum dithiophosphate compound, and molybdenum dithiocarbamate are preferably used although it is not particularly limited as long as it does not impair the characteristics of the metalworking oil composition.

The dihydrocarbyl polysulfide is a sulfur-based compound generally called polysulfide or sulfidized olefin, and concretely means a compound represented by the following general formula (5):

$$R^8-S_h-R^9 \qquad (5)$$

wherein $R^8$ and $R^9$, which may be the same or different, each represent a straight or branched alkyl group having 3 to 20 carbon atoms, an aryl group having 6 to 20 carbon atoms, an alkylaryl group having 6 to 20 carbon atoms, or an arylalkyl group having 6 to 20 carbon atoms, and h represents an integer of 2 to 6, preferably 2 to 5. In the general formula (5) of this mode, from the point that excellent processing efficiency and tool life can be attained by preventing welding and increase of processing resistance, each of $R^8$ and $R^9$ is more preferably independently a branched alkyl group having 3 to 18 carbon atoms derived from ethylene or propylene, particularly preferably a branched alkyl group having 6 to 15 carbon atoms derived from ethylene or propylene.

Concrete examples of the sulfidized ester include animal and vegetable fat such as beef tallow, lard, fish oil, rapeseed oil or soybean oil; unsaturated fatty acid esters obtained by reacting unsaturated fatty acid (including oleic acid, linoleic acid, fatty acid extracted from the above-mentioned animal and vegetable fat, or the like) with various alcohols; and those obtained by sulfidizing mixtures thereof by an optional method.

The sulfidized mineral oil means mineral oil having simple sulfur dissolved thereto. Although the mineral oil used for the sulfidized mineral oil in the invention is not particularly limited, concrete examples thereof include paraffin-based mineral oil, naphthene-based mineral oil or the like which is obtained by refining a lubricant fraction obtained by performing atmospheric distillation and vacuum distillation to crude oil through a proper combination of refining treatments such as solvent deasphalting, solvent extraction, hydrocracking, solvent dewaxing, catalytic dewaxing, hydrogenation refining, sulfuric acid treatment, and clay treatment. As the simple sulfur, powdery or molten liquid-like simple sulfur is preferably used since the dissolution to the base oil can be efficiently performed, although the simple sulfur may have each of massive form, powdery form, molten liquid form and the like. However, the molten liquid-like simple sulfur must be handled at a temperature of the melting point of simple sulfur or higher, and is not necessarily easy to handle with the need of a special device such as a heating facility, dangerousness due to handling in a high-temperature atmosphere, or the like, although it has the advantage that the dissolving work can be performed in an extremely short time due to liquid-to-liquid mixing. On the other hand, the powdery simple sulfur is particularly preferred since it is inexpensive and easy to handle, and the time necessary to dissolve it is also sufficiently short. The sulfur content in the sulfidized mineral oil in the invention of this mode is preferably 0.05 to 1.0% by mass, based on the total amount of the sulfidized mineral oil, more preferably 0.1 to 0.5% by mass, although it is not particularly limited.

The zinc dithiophosphate compound, the zinc dithiocarbamate compound, the molybdenum dithiophosphate compound, and the molybdenum dithiocarbamate compound mean compounds represented by the following general formulae (6) to (9), respectively:

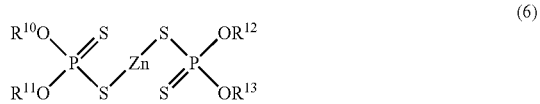

(6)

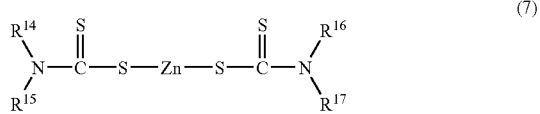

(7)

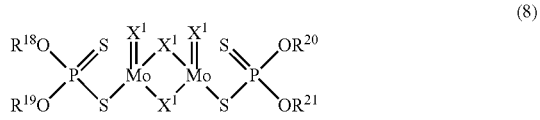

(8)

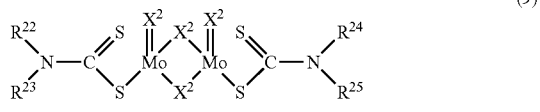

(9)

wherein $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$, which may be the same or different, each represent a hydrocarbon group having one or more carbon atoms, and $X^1$ and $X^2$ each represent oxygen atom or sulfur atom.

In the invention of this mode, among the above-mentioned sulfur compounds, at least one kind selected from the group consisting of dihydrocarbyl polysulfide and sulfidized ester is preferably used since further high-level processing efficiency and tool life can be attained by preventing welding and increase of processing resistance.

Concrete examples of the phosphor compound (D-2) include phosphate, acidic phosphate, amine salt of acidic phosphate, chlorinated phosphate, phosphite, phosphorothionate, and metal salt of a phosphor compound represented by the following general formula (10) or (11) of this mode. Examples of the phosphor compound include ester of phosphoric acid, phosphorous acid or thiophosphoric acid with alkanol or polyether type alcohol, or derivative thereof.

(10)

wherein $X^3$, $X^4$ and $X^5$, which may be the same or different, each represent oxygen atom or sulfur atom, at least two of $X^3$, $X^4$ and $X^5$ being oxygen atom, and $R^{26}$, $R^{27}$ and $R^{28}$, which may be the same or different, each represent hydrogen atom or a hydrocarbon group having 1 to 30 carbon atoms.

(11)

wherein $X^6$, $X^7$, $X^8$, and $X^9$, which may be the same or different, each represent oxygen atom or sulfur atom, at least three of $X^6$, $X^7$, $X^8$ and $X^9$ being oxygen atoms, and $R^{29}$, $R^{30}$ and $R^{31}$, which may be the same or different, each represent hydrogen atom or a hydrocarbon group having 1 to 30 carbon atoms.

Examples of the phosphate include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, and xylenyldiphenyl phosphate.

In the metal salt of the phosphor compound represented by the general formula (10) or (11) of this mode, the hydrocarbon group having 1 to 30 carbon atoms represented by $R^{26}$ to $R^{31}$ is preferably an alkyl group having 1 to 30 carbon atoms or an aryl group having 6 to 24 carbon atoms, further preferably an alkyl group having 3 to 18 carbon atoms, further preferably an alkyl group having 4 to 12 carbon atoms.

Preferably one to three, more preferably one to two, further preferably two of $R^{26}$, $R^{27}$ and $R^{28}$ which may be the same or different and each represent hydrogen or the above-mentioned hydrocarbon are the above-mentioned hydrocarbon groups.

Preferably one to three, more preferably one to two, further preferably two of $R^{29}$, $R^{30}$ and $R^{31}$ which may be the same or different and each represent hydrogen or the above-mentioned hydrocarbon group are the above-mentioned hydrocarbon groups.

In the phosphor compound represented by the general formula (10) of this mode, all of $X^3$ to $X^5$ are preferably oxygen atoms although at least two of $X^3$ to $X^5$ are needed to be oxygen atoms.

In the phosphor compound represented by the general formula (11) of this mode, all of $X^6$ to $X^9$ are preferably oxygen atoms although at least three of $X^6$ to $X^9$ are needed to be oxygen atoms.

Examples of the phosphor compound represented by the general formula (10) of this mode include phosphorous acid or monothiophosphorous acid; phosphorous monoester or monothiophosphorous monoester having one hydrocarbon group having 1 to 30 described above; phosphorous diester or monothiophosphorous diester having two hydrocarbon groups having 1 to 30 carbon atoms described above; phosphorous triester or monothiophosphorous triester having three hydrocarbon groups having 1 to 30 carbon atoms described above; and mixtures thereof. Among them, the phosphorous monoester and the phosphorous diester are preferred, and the phosphorous diester is more preferred.

Examples of the phosphor compound represented by the general formula (11) of this mode include phosphoric acid and monothiophosphoric acid; phosphoric monoester and monothiophosphoric monoester having one hydrocarbon group having 1 to 30 carbon atoms described above; phosphoric diester and monothiophosphoric diester having two hydrocarbon groups having 1 to 30 carbon atoms described above; phosphoric triester and monothiophosphoric triester having three hydrocarbon groups having 1 to 30 carbon atoms described above; and mixtures thereof. Among them, the phosphoric monoester and the phosphoric diester are preferred, and the phosphoric diester is more preferred.

As the metal salt of the phosphor compound represented by the general formula (10) or (11) of this mode, a metal obtained by partially or entirely neutralizing acidic hydrogen of the phosphor compound with a metal base is adaptable. Examples of such metal base include metal oxide, metal hydride, metal carbonate, and metal chloride, and concrete examples of the metal thereof include alkali metal such as lithium, sodium, potassium or cesium, alkali earth metal such as calcium, magnesium, or barium, and heavy metal such as zinc, copper, iron, lead, nickel, silver or manganese. Among them, alkali earth metal such as calcium or magnesium, and zinc are preferred.

The metal salt of the phosphor compound has no limitation for the structure since the structure is varied depending on the valency of the metal or the number of OH groups or SH groups of the phosphor compound. For example, when zinc oxide 1 mol is reacted with a phosphoric diester (having one OH group) 2 mol, a compound having a structure represented by the following formula (12) of this mode is conceivably obtained as a main component, but polymerized molecules will be also present therein.

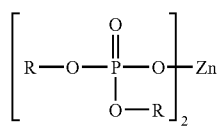
(12)

Further, when zinc oxide 1 mol is reacted with a phosphoric monoester (having two OH groups) 1 mol, for example, a compound having a structure represented by the following formula (13) of this mode is conceivably obtained as a main component, but polymerized molecules are will be also present therein.

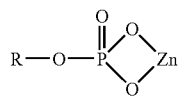
(13)

A mixture of two or more of such compounds can be also used.

In the invention of this mode, among the above-mentioned phosphor compounds, phosphate, acidic phosphate, and amine salt of acidic phosphate are preferred from the point that excellent processing efficiency and tool life can be attained by preventing welding and increase of processing resistance.

The metalworking oil composition of the invention in this mode is applicable to purposes other than metalworking as described later. When the metalworking oil composition of the invention is used as sliding surface oil for machine tool, the composition preferably includes the acidic phosphate or the amine salt of acidic phosphate. When the metalworking oil composition of the invention is used as hydraulic working fluid, the composition preferably includes the phosphate. Further, when the composition is used as dual purpose oil of sliding surface oil and hydraulic working fluid, combined use of at least one kind selected from the acidic phosphate and the amine salt of acidic phosphate with the phosphate is preferred.

The metalworking oil composition of the invention in this mode may include only one of the sulfur compound (D-1) and the phosphor compound (D-2), or may include the both. From the point that excellent processing efficiency and tool life can be attained by preventing welding and increase of processing resistance, the composition includes preferably the sulfur compound (D-1), or both the sulfur compound (D-1) and the phosphor compound (D-2), more preferably both the sulfur compound (D-1) and the phosphor compound (D-2).

From the point that excellent processing efficiency and tool life can be attained by preventing welding and increase of processing resistance, the content of the extreme pressure agent (D) is preferably 0.005% by mass or more, based on the total amount of the composition, more preferably 0.01% by mass or more, further preferably 0.05% by mass or more although it can be optionally determined. From the point of prevention of abnormal abrasion, the content of the extreme pressure agent is preferably 15% by mass or less, based on the total amount of the composition, more preferably 10% by mass or less, further preferably 7% by mass or less.

In the invention of this mode, combined use of the oily agent (C) and the extreme pressure agent (D) is preferred from the point that excellent processing efficiency and tool life can be attained by preventing welding and increase of processing resistance, although only one of the oily agent (C) and the extreme pressure agent (D) may be used.

The metalworking oil composition of the invention in this mode preferably includes an organic acid salt (E) from the point that excellent processing efficiency and tool life can be attained by preventing welding and increase of processing resistance. As the organic acid salt, sulfonate, phenate, salicilate, and mixtures thereof are preferably used. Examples of the positive component of such organic acid salt include alkali metal such as sodium or potassium; alkali earth metal such as magnesium, calcium, or barium; ammonia; amine such as alkylamine having alkyl group having 1 to 3 carbon atoms (monomethylamine, dimethylamine, trimethylamine, monoethylamine, diethylamine, triethylamine, monopropylamine, dipropylamine, tripropylamine, etc.) or alkanolamine having alkanol group having 1 to 3 carbon atoms (monomethanol amine, dimethanolamine, trimethanolamine, monoethanolamine, diethanolamine, triethanolamine, monopropanolamine, dipropanolamine, tripropanolamine, etc.); and zinc. Among them, the alkali metal or the alkali earth metal is preferred, and calcium is particularly preferred. The use of the alkali metal or alkali earth metal as the positive component of the organic acid salt is apt to provide further high lubricity.

The content of the organic acid salt (E) is preferably 0.1 to 30% by mass, based on the total amount of the composition, more preferably 0.5 to 25% by mass, further preferably 1 to 20% by mass. When the content of the organic acid salt (E) is less than the above-mentioned lower limit value, the effect of improving the processing efficiency and tool life by prevention of welding and increase of processing resistance by the addition is apt to be insufficient, while the content exceeds the above-mentioned upper limit value, the organic acid salt is apt to be easily deposited since the stability of the metalworking oil composition is deteriorated.

In the invention of this mode, the organic acid salt (E) may be used singly or in combination with another additive. From the point that excellent processing efficiency and tool life can be attained by preventing welding and increase of processing resistance, the organic acid salt is preferably used in combination with the above-mentioned extreme pressure agent, and combined use of three kinds of the sulfur compound, the phosphor compound and the organic acid salt is particularly preferred.

The metalworking oil composition of the invention in this mode preferably further includes an antioxidant (F). By adding the antioxidant, the sticking by alteration of components can be prevented and, further, thermal/oxidation stability can be also improved.

Examples of the antioxidant (F) include phenolic antioxidant, amine-based antioxidant, zinc dithiophosphate-based antioxidant, and those used as food additives.

As the phenolic antioxidant, an optional phenolic compound used as lubricant antioxidant is usable. For example, an alkylphenol compound is preferably used although it is not particularly limited.

Concrete examples of the amine-based antioxidant include 4-butyl-4'-octyldiphenylamine, phenyl-α-naphthylamine, octylphenyl-α-naphtylamine, dodecylphenyl-α-naphthylamine, and mixtures thereof.

Antioxidants used as food additives are also usable, and examples thereof include 2,6-di-tert-butyl-p-crezol (DBPC), 4,4'-methylenebis(2,6-di-tert-buthylphenol), 4,4'-bis(2,6-di-tert-butylphenol), 4,4'-thiobis(6-tert-butyl-o-crezol), ascorbic acid (vitamin C), fatty acid ester of ascorbic acid, tocopherol (vitamin E), 3,5-di-tert-butyl-4-hydroxyanisol, 2-tert-butyl-4-hydroxyanisol, 3-tert-butyl-4-hydroxyanisol, 1,2-dihydro-6-ethoxy-2,2,4-trimethylquinoline (ethoxyquin), 2-(1,1-dimethyl)-1,4-benzenediol (TBHQ), and 2,4,5-trihydroxybutyrophenone (THBP).

Among these antioxidants, the phenolic antioxidant, the amine-based antioxidant and the above-mentioned antioxidants used as food additives are preferred.

For maintaining satisfactory thermal/oxidation stability, the content of the antioxidant (F) is preferably 0.01% by mass or more, based on the total amount of the composition, further preferably 0.05% by mass or more, most preferably 0.1% by mass or more although it is not particularly limited. On the other hand, the content is also preferably 10% by mass or less, further preferably 5% by mass or less, most preferably 3% by mass or less since improvement of the effect proportionate to the addition amount cannot be expected.

The metalworking oil composition of the invention in this mode can further include other known additives in addition to those described above. Examples of such additives include extreme pressure agent other than the above-mentioned phosphor compound and sulfur compound (including chlorine-based extreme pressure agent); humidifier such as ethylene glycol monoalkyl ether; film forming agent such as acrylic polymer, paraffin wax, microwax, slack wax, or polyolefin wax; water displacement agent such as fatty acid amine salt; solid lubricant such as graphite, graphite fluoride, molybdenum disulfide, boron nitride, or polyethylene powder; anticorrosive agent such as amine, alkanolamine, amide, carboxylic acid, carboxylate, sulphonate, phosphoric acid, phosphate or partial ester of polyhydric alcohol; metal inactivator such as benzotriazole or thiadiazole; defoaming agent such as methylsilicone, fluorosilicone, or polyacrylate; ash-free dispersant such as alkenyl succinimide, benzylamine, or polyalkenylamine aminoamide; and the like. Although the contents of these known additives in combined use are not particularly limited, these known additives are generally added in amounts such that the total content thereof is 0.1 to 10% by mass based on the total amount of the composition.

Although the metalworking oil of the invention in this mode may include a chlorine-based additive such as chlorine-based extreme pressure agent as described above, the oil is preferably free from such chlorine-based additive from the points of improvement in safety and of reduction in environmental load. The chlorine concentration is preferably 1000 ppm by mass or less, based on the total amount of the composition, more preferably 500 ppm by mass or less, further preferably 200 ppm by mass or less, particularly preferably 100 ppm by mass or less.

Although the kinematic viscosity of the metalworking oil of the invention in this mode is not particularly limited, the kinematic viscosity at 40° C. is preferably 200 mm$^2$/s or less, further preferably 100 mm$^2$/s or less, most preferably 50 mm$^2$/s or less from the point of easiness of supply to a working part. On the other hand, the lower limit value thereof is preferably 1 mm$^2$/s, further preferably 3 mm$^2$/s, most preferably 5 mm$^2$/s.

From the point of storage stability and rust preventing property, the moisture content of the metalworking oil composition of the invention in this mode is preferably 20000 ppm or less, more preferably 10000 ppm or less, further preferably 5000 ppm or less. Further, from the point that excellent processing efficiency and tool life can be attained by preventing welding and increase of processing resistance, the moisture content is preferably 200 ppm or more, more preferably 300 ppm or more, further preferably 400 ppm or more, further more preferably 500 ppm or more.

The moisture content referred to herein means a moisture content measured by Karl Fisher type coulometric titration method according to JIS K2275.

When the moisture content of the metalworking oil composition of the invention in this mode is adjusted by adding water, the water added may be soft or hard, and city water, industrial water, ion exchange water, distilled water, alkali ionic water or the like can be optionally used.

The metalworking oil composition of the invention in this mode having the above-mentioned constitution can be suitably used for extensive purposes of metalworking field since it is excellent in processing performance such as processing efficiency or tool life and further in handling property. The metalworking referred to herein means overall metalworking without being limited to cutting/grinding.

Although the metalworking oil composition of the invention in this mode can be applied to general lubrication metalworking, it is preferably used as a lubricant for minimal quantitative lubrication (MQL) working since a further remarkable effect can be exhibited.

Concrete examples of the kinds of metalworking include cutting, grinding, rolling, forging, pressing, drawing, milling and the like. Particularly, the metalworking oil composition of the invention is extremely useful for cutting, grinding, rolling and the like.

Although material of a workpiece to which the metalworking oil composition of the invention in this mode is applied is not particularly limited, the metalworking oil composition of the invention can be suitably used as a lubricant for nonferrous working, and is particularly excellent as a lubricant for aluminum or aluminum alloy working.

The metalworking oil composition of the invention can be used further as a non-working part lubricating solution for machine tool such as a sliding surface lubricant, a bearing part lubricant, or a hydraulic equipment lubricant, and is thus extremely useful to attain space saving and energy saving in a machine tool.

The sliding surface lubricant referred to herein means a lubricating solution used for a guide mechanism for sliding movement of two abutting planes of constituting members of a machine tool used for cutting/grinding. For example, in a machine tool adapted to place a workpiece on a table movable on a bed and move the table to carry the workpiece toward a cutting/grinding tool, the sliding surface between the table and the bed is lubricated with the sliding surface lubricant. In a machine tool adapted to fix a cutting/grinding tool on a base movable on a bed, and move the base to move a workpiece toward the tool, the sliding surface between the base and the bed is lubricated with the sliding surface oil agent.

Friction characteristics such as minimized frictional coefficient on the sliding surface, high stick-slip preventing property and the like are required for such sliding surface oil. When stick-slip occurs on a sliding surface such as a working table of a machine tool, the frictional vibration is transferred to a workpiece as it is, consequently causing a problem such as deterioration of processing accuracy or reduction of tool life by the vibration. The metalworking oil composition of the invention, which can sufficiently prevent such a phenomenon when used as the sliding surface lubricant, preferably includes the phosphor compound from the point of the frictional characteristic.

For lubrication of a bearing part, a lubricating method such as lubricant bearing lubrication or mist bearing lubrication is used. The oil composition of the invention can be used in both the methods.

The lubricant bearing lubrication means a lubrication system for supplying lubricant as it is liquid to a bearing part to smooth sliding of the part, in which cooling of the bearing part by the lubricant or the like can be also expected. The lubricating lubricant for such bearing lubrication is needed to hardly cause thermal deterioration or to be excellent in heat resistance since it is used in a further high-temperature part. The metalworking oil composition of the invention can be used also for such lubricant bearing lubrication.

The mist bearing lubrication means a lubrication system for atomizing lubricant by a mist generator and supplying the atomized oil to a bearing part over gas such as air to smooth sliding of the part. Recent machine tools frequently adapt this lubrication system since the cooling effect by air or the like can be expected in a high-temperature part such as bearing part. The lubricating lubricant for such mist lubrication is needed to hardly cause thermal deterioration, or to be excellent in heat resistance since it is used in a further high-temperature part. The oil composition of the invention can be used also for such mist bearing lubrication.

In hydraulic equipment adapted to hydraulically operate and control machinery, hydraulic working fluid expected to have lubricating, sealing and cooling effects is used in a hydraulic control portion which controls the operation of machinery. Since the hydraulic working fluid or lubricant is compressed to high pressure by a pump to generate a hydraulic pressure for moving the equipment, high lubricity, high oxidation stability and thermal stability are demanded for the lubricant. The oil composition of the invention in this mode can be used also as such hydraulic working fluid. When the metalworking oil composition of the invention in this mode is used as a hydraulic working fluid-and-lubricant, the composition preferably further includes the phosphor compound for further improving the lubricity.

An example of the cutting/grinding method using the metalworking oil composition of the invention in this mode will be described.

FIG. 1 is an illustrative view showing one example of a machine tool suitably used in minimal quantitative lubrication cutting/grinding method. In FIG. 1, the machine tool comprises a table 2 movable on a bed 1 in the direction of an arrow; and a tool 11 supported by a support means 10 to be rotatable in the direction of an arrow. An oil feeding tank 12 stores the lubricant of the invention, and when a workpiece 3 placed on the table 2 is cut/ground, the mist-like lubricant of the invention is supplied from a working oil supply part 13 toward a working part together with compressed air supplied from a compressed air inlet part 18. The lubricant of the invention stored in the oil feeding tank 12 is supplied to a sliding surface 16 between the bed 1 and the table 2 through a sliding surface oil supply part 14, and also supplied to a bearing part between the support means 10 and the tool 11 through a bearing oil supply part 15 to lubricate the sliding surface 16 and the bearing part 17, respectively.

In the minimal quantitative lubrication cutting/grinding method of the invention of this mode, thus, improvement of workability and improvement of processing efficiency in minimal quantitative lubrication cutting/grinding can be attained by performing the lubrication of the cutting/grinding working portion, the sliding surface of the machine tool, or further the bearing part by use of a lubricant containing the same ester.

In the minimal quantitative lubrication cutting/grinding method of the invention of this mode, further, the same lubricant is preferably used as the cutting/grinding lubricant, the sliding surface lubricant or further the bearing lubricant as shown in FIG. 1, since space saving and energy saving in the machine tool can be attained due to no need of separately providing oil feeding tanks for supplying the respective lubricants.

In the invention of this mode, the lubricant of the invention in this mode stored in the oil feeding tank 12 can be supplied to hydraulic equipment provided on the machine tool, and used as hydraulic working fluid, although it is not shown in FIG. 1.

Embodiment (Second Mode for Metalworking Oil Composition)

The present invention of this mode will be further described in reference to Examples and Comparative Examples, but the present invention is never limited thereby.

In Examples and Comparative Examples, base oils and additives shown in Table 2.2 were used. Base oils a, b, c, and d are described below, and base oils e, f, and g are shown in Table 1.2. For the base oil d, the fatty acid composition and the total unsaturation degree are shown in Table 4.2

The present invention is further described in detail by Examples and Comparative Examples.

(Production of Hydrogenation Refined Oil of FT Synthetic Oil, Wax Hydrocracked Oil, and Hydrocarbon Oils 1 to 3)

1) FT synthetic hydrocarbon oil using natural gas as raw material (content of hydrocarbon with boiling point of 150° C. or higher: 82% by mass, content of hydrocarbon with boiling point of 360° C. or higher: 41% by mass) was separated into a light fraction with boiling point of 150° C. or lower, an intermediate fraction with boiling point of 150 to 360° C., and a tower bottom residue heavy wax content (FT wax: corresponding to a fraction with boiling point of higher than 360° C.) in a distillation tower.

2) The intermediate fraction separated in 1) was hydrogenation-refined by use of a hydrogenation refining catalyst (Pt: 0.8% by mass to carrier, USY zeolite/silica alumina/alumina binder: 3/57/40 by weight) under hydrogen gas flow in conditions of reaction temperature: 311° C., hydrogen pressure: 3.0 MPa, LHSV: 2.0 $h^{-1}$, and hydrogen/oil ratio; 340 NL/L.

3) The hydrogenation refined oil obtained in 2) was fractioned to a 150-250° C. fraction (kerosene fraction 1) and a 250-360° C. fraction (light oil fraction 1) by distillation.

4) The FT wax obtained in 1) was hydrocracked by use of a hydrocracking catalyst (Pt: 0.8% by mass to carrier, USY zeolite/silica alumina/alumina binder: 3/57/40 by weight) under hydrogen gas flow in conditions of reaction temperature: 326° C., hydrogen pressure: 4.0 MPa. LHSV: 2.0 h$^{-1}$, and hydrogen/oil ratio: 680 NL/L.

5) The hydrocracked oil obtained in 4) was fractioned to a 150-250° C. fraction (kerosene fraction 2) and a 250-360° C. fraction (light oil fraction 2) by distillation.

Inventive Base Oil e: Inventive base oil e was obtained by mixing the light oil fractions 1 and 2 together in a ratio of 56:44 (by mass).

Inventive Base Oil f: Inventive base oil f was obtained by mixing the kerosene fractions 1 and 2 together in a ratio of 63:37 (by mass).

Inventive Base Oil g: Poly-alpha-olefin (PAO)

Inventive Base Oil h: White oil

Inventive Base Oil i: Inventive base oil i was obtained by mixing the light oil fractions 1 and 2 together in a ratio of 51:49 (by mass).

Inventive Base Oil j: Inventive base oil j was obtained by mixing the kerosene fractions 1 and 2 together in a ratio of 49:51 (by mass).

Metalworking oil compositions having compositions shown in Table 2.2 were prepared using these base oils, and tested.

(Base Oil)

a: Triester of trimethylolpropane with oleic acid (kinematic viscosity at 40° C.: 46 mm$^2$/s)

b: Diester of neopentylglycol with oleic acid (kinematic viscosity at 40° C.: 24 mm$^2$/s)

c: Diester of isodecylalcohol with adipic acid (kinematic viscosity at 40° C.: 14 mm$^2$/s)

d: High-oleic rapeseed oil (kinematic viscosity at 40° C.: 39 mm$^2$/s)

Additives used are as follows:

(Additives)

A: Oleylalcohol

B: Oleylamine

C: Oleic acid

D: Glycerin monooleate

E: Tricresyl phosphate

F: Sulfidized ester

Each metalworking oil composition of Examples and Comparative Examples was subjected to the following evaluation tests.

(Tapping Test)

A tapping test was carried out by minimal quantitative lubrication (MQL) method or general lubrication method.

In the test by MQL, the tapping test was performed in conditions described below by alternately using each metalworking oil composition and a reference standard oil (DIDA: Diisodecyl adipate), and the tapping energies thereof were measured.

Tapping Conditions (Minimal quantitative lubrication (MQL)):
Tool: Nut tap M8 (P=1.25 mm)
Prepared hole diameter: φ7.2 mm
Work: AC 8A (t=10 mm)
Cutting rate: 9.0 m/min
Lubrication Method:
Metalworking oil composition: Sprayed in conditions of compressed air 0.2 MPa and oil composition 25 ml/h
DIDA: Sprayed directly to a working portion at 4.3 mL/min without using compressed air.

Tapping energy efficiency (%)=(Tapping energy in use of DIDA)/(Tapping energy in use of oil composition)

In the test by general lubrication, the tapping test was performed in conditions described below by alternately using each metalworking oil composition and a reference standard oil (DIDA: diisodecyl adipate), and the tapping energies thereof were measured.

Tapping Conditions (General lubrication):
Tool: Nut tap M8 (P=1.25 mm)
Prepared hole diameter: φ7.2 mm
Work: AC 8A (t=10 mm)
Cutting rate: 9.0 m/min
Lubrication Method:
Metalworking oil composition and DIDA: Directly sprayed at 4.3 mL/min without using compressed air.

Then, tapping energy efficiency (%) was calculated using the obtained tapping energy measurement value for each of MQL and general lubrication according to the following equation.

The obtained results are shown in Tables 2.2 and 3.2. In Tables 2.2 and 3.2, a higher value of tapping energy efficiency means higher lubricity.

Tapping energy efficiency (%)=(Tapping energy in use of DIDA)/(Tapping energy in use of oil composition)

TABLE 1.2

| | | | Working Oil Base Oil Number | | | | | |
|---|---|---|---|---|---|---|---|---|
| | | | Base Oil e | Base Oil f | Base Oil g | Base Oil h | Base Oil i | Base Oil j |
| Density (15° C.) | | kg/m$^3$ | 782.8 | 748.9 | 798 | 830 | 783.0 | 749.4 |
| Kinematic Viscosity (@40° C.) | | mm$^2$/s | 3.329 | 1.245 | 5.1 | 5 | 3.341 | 1.242 |
| Flash Point | | ° C. | 130 | 60 | | 146 | 128 | 58 |
| Aniline Point | | ° C. | 97.7 | 82.1 | | | 97.8 | 82.2 |
| Sulfur Content | | mass ppm | Less than 1 | Less than 1 | Less than 1 | 25 | Less than 1 | Less than 1 |
| Distillation Properties | IBP | ° C. | 257.0 | 168.0 | | | 259.5 | 171.0 |
| | 5% | ° C. | 266.5 | 182.0 | | | 268.0 | 180.5 |
| | 10% | ° C. | 269.0 | 184.0 | | | 270.0 | 182.0 |
| | 50% | ° C. | 283.0 | 198.5 | | | 283.5 | 197.5 |

TABLE 1.2-continued

|  |  | Working Oil Base Oil Number | | | | | |
|---|---|---|---|---|---|---|---|
|  |  | Base Oil e | Base Oil f | Base Oil g | Base Oil h | Base Oil i | Base Oil j |
| 90% | °C. | 315.5 | 221.5 |  |  | 316.5 | 221.5 |
| 95% | °C. | 324.0 | 226.5 |  |  | 325.5 | 226.0 |
| EP | °C. | 336.0 | 238.0 |  |  | 338.0 | 236.5 |
| Distillation Range (90-10) | °C. | 46.5 | 37.5 |  |  | 46.5 | 39.5 |
| Distillation Range (EP-IBP) | °C. | 79.0 | 70.0 |  |  | 78.5 | 65.5 |
| n-Paraffin Content | % by mass | 40.4 | 56.8 | 0 |  | 36.8 | 48.2 |
| Naphthene Content | vol % | 0 | 0 | 0 | 30 | 0 | 0 |
| Paraffin Content | vol % | 100 | 100 | 100 | 70 | 100 | 100 |
| Aromatic Content | vol % | 0 | 0 | 0 | 0 | 0 | 0 |
| Saturated Content | vol % | 100 | 100 | 100 | 100 | 100 | 100 |
| Unsaturated Content | vol % | 0 | 0 | 0 | 0 | 0 | 0 |
| Cetane Index |  | 90.8 | 78.2 |  |  | 90.9 | 77.2 |
| Smoke Point | mm |  | 45 |  |  |  | 44 |

TABLE 2.2

|  |  | Example 1 | Example 2 | Example 4 | Example 5 | Example 6 | Example 7 | Example 8 | Example 9 | Example 10 | Example 11 | Example 12 |
|---|---|---|---|---|---|---|---|---|---|---|---|---|
| Base Oil | a | 70 | 70 |  |  |  |  | 90 | 50 | 66.5 | 66.5 | 66.5 | 66.5 |
|  | b |  |  | 70 |  |  |  |  |  |  |  |  |
|  | c |  |  |  | 70 |  |  |  |  |  |  |  |
|  | d |  |  |  |  | 70 |  |  |  |  |  |  |
|  | e | 30 |  |  |  |  |  |  |  |  |  |  |
|  | f |  | 30 | 30 | 30 | 30 | 10 | 50 | 28.5 | 28.5 | 28.5 | 28.5 |
|  | g |  |  |  |  |  |  |  |  |  |  |  |
|  | h |  |  |  |  |  |  |  |  |  |  |  |
| Additive | A |  |  |  |  |  |  |  |  | 5 |  |  |  |
|  | B |  |  |  |  |  |  |  |  |  | 5 |  |  |
|  | C |  |  |  |  |  |  |  |  |  |  | 5 |  |
|  | D |  |  |  |  |  |  |  |  |  |  |  | 5 |
|  | E |  |  |  |  |  |  |  |  |  |  |  |  |
|  | F |  |  |  |  |  |  |  |  |  |  |  |  |
| Kinematic Viscosity (40° C.) mm²/s |  | 8 | 16 | 11 | 8 | 14 | 31 | 9 | 17 | 19 | 17 | 18 |
| Tapping Energy Efficiency (MQL) % |  | 110 | 116 | 111 | 109 | 113 | 112 | 111 | 122 | 120 | 120 | 124 |
| Tapping Energy Efficiency (General Lubrication) % |  | 119 | 124 | 120 | 120 | 121 | 121 | 119 | 129 | 126 | 126 | 133 |

TABLE 3.2

|  |  | Example 13 | Example 14 | Example 15 | Example 16 | Example 17 | Example 18 | Example 19 | Comparative Example 1 | Comparative Example 2 | Comparative Example 3 | Comparative Example 4 | Comparative Example 5 |
|---|---|---|---|---|---|---|---|---|---|---|---|---|---|
| Base Oil | a | 66.5 | 63 | 59.5 | 63 | 59.5 | 56 | 70 | 100 |  | 70 |  |  |
|  | b |  |  |  |  |  |  |  |  |  |  |  |  |
|  | c |  |  |  |  |  |  |  |  |  |  |  |  |
|  | d |  |  |  |  |  |  |  |  |  |  |  |  |
|  | e |  |  |  |  |  |  |  |  |  |  |  |  |
|  | f | 28.5 | 27 | 22.5 | 27 | 22.5 | 24 | 30 |  | 100 |  |  |  |
|  | g |  |  |  |  |  |  |  |  |  | 30 | 100 |  |
|  | h |  |  |  |  |  |  |  |  |  |  |  | 100 |
| Additive | A |  |  |  |  |  |  |  |  |  |  |  |  |
|  | B |  |  |  |  |  |  |  |  |  |  |  |  |
|  | C |  |  |  |  |  |  |  |  |  |  |  |  |
|  | D |  |  |  | 5 | 5 | 5 |  |  |  |  |  |  |
|  | E | 5 |  | 5 | 5 |  | 5 |  |  |  |  |  |  |
|  | F |  | 10 | 10 |  | 10 | 10 |  |  |  |  |  |  |
| Kinematic Viscosity (40° C.) mm²/s |  | 19 | 19 | 20 | 21 | 21 | 22 | 16 | 46 | 3 | 24 | 5 | 5 |
| Tapping Energy Efficiency (MQL) % |  | 115 | 116 | 118 | 127 | 126 | 131 | 119 | 85 | 78 | 110 | 75 | 73 |

TABLE 3.2-continued

|  | Example 13 | Example 14 | Example 15 | Example 16 | Example 17 | Example 18 | Example 19 | Comparative Example 1 | Comparative Example 2 | Comparative Example 3 | Comparative Example 4 | Comparative Example 5 |
|---|---|---|---|---|---|---|---|---|---|---|---|---|
| Tapping Energy Efficiency (General Lubrication) % | 126 | 127 | 129 | 138 | 140 | 144 | 130 | 109 | 97 | 123 | 95 | 96 |

TABLE 4.2

|  |  | Base Oil d (High-Oleic Acid Rapeseed Oil) |
|---|---|---|
| Fatty Acid Composition (% by mass) | Oleic Acid | 64 |
|  | Linoleic Acid | 20 |
|  | Palmitic Acid | 5 |
|  | Stearic Acid | 2 |
|  | Other Fatty Acids | 9 |
| Content of C6-16 Fatty Acid (% by mass) |  | 9 |
| Total Unsaturation Degree |  | 0.26 |

Third Mode (Electric Discharge Machining Oil Composition)

Properties of Hydrocarbon Oil as Base Oil for Electric Discharge Machining Oil Composition:

The electric discharge machining oil of the invention in this mode contains the above-mentioned hydrocarbon oil, or hydrocarbon oil (hereinafter referred to as "inventive hydrocarbon oil" in the third mode) having a density at 15° C. of 0.7 to 0.8 g/cm$^3$, and including a n-paraffin content of 10 to 90% by mass, an aromatic content of 0 to 3% by volume, and a naphthene content of 0 to 20% by volume. More specifically, although the hydrocarbon oil has the properties as described above, the following mode A can be given as a further concrete and preferably mode.

In the preferable mode A, the initial boiling point (° C.) is preferably 140 to 260° C., further preferably 150 to 255° C., more preferably 160 to 250° C., most preferably 165 to 245° C. When the initial boiling point is too low, the usage of lubricant may be increased.

In the preferable mode A, the 10%-distillation point (° C.) is preferably 150 to 270° C., further preferably 160 to 265° C., more preferably 170 to 300° C., most preferably 180 to 255° C.

In the preferable mode A, the 90%-distillation point (° C.) is preferably 180 to 320° C., further preferably 190 to 310° C., more preferably 200 to 300° C., most preferably 210 to 290° C.

In the preferable mode A, the end point (° C.) is preferably 190 to 310° C., further preferably 200 to 300° C., more preferably 210 to 290° C., most preferably 220 to 280° C.

In the invention of this mode, which includes the inventive hydrocarbon oil as an essential component of base oil, any one of mineral oil, synthetic oil, and fat and oil can be used in combination therewith out limiting the kind thereof. Mineral oil or synthetic oil is particularly preferably used in combination. The combining ratio thereof is not particularly limited, and can be optionally selected as long as the effect of the present invention is not impaired. However, the content of the inventive hydrocarbon oil is set to preferably 60% by mass or more, based on the total amount of the electric discharge machining oil composition, further preferably 80% by mass, most preferably 95% by mass or more. The content of the base oil other than the inventive hydrocarbon oil is set to preferably 40% by mass or less, based on the total amount of the electric discharge machining oil composition, more preferably 20% by mass or less, most preferably 5% by mass or less.

Examples of the mineral oil usable in combination include kerosene fractions obtained by distillation of paraffin-based or naphthene-based crude oil; normal paraffin obtained by extraction operation from kerosene fractions or the like; and those obtained by refining lubricant fractions obtained by distillation of paraffin-based or naphthene-based crude oil by use of one or a proper combination of two or more of refining treatments such as solvent deasphalting, solvent extraction, hydrocracking, solvent dewaxing, catalytic dewaxing, hydrogenation refining, sulfuric acid treatment, and clay treatment.

Concrete examples of the synthetic oil usable in combination include poly-α-olefin (propylene oligomer, isobutylene oligomer, polybutene, 1-octene oligomer, 1-decene oligomer, ethylene-propylene oligomer, etc.) or hydrides thereof, alkylbenzene, alkylnaphthalene, diester (ditridecyl glutarate, di-2-ethylhexyl adipate, diisodecyl adipate, ditridecyl adipate, di-2-ethylhexyl sebacate, etc.), polyolester (trimethylolpropane caprylate, trimethylolpropane pelargonate, pentaerythritol 2-ethylehexanoate, pentaerythritol pelargonate, etc.), polyglycol, silicone oil, dialkyl diphenylether, polyphenylether, and polyalkylene glycol. Synthetic oil generally called isoparaffin includes propylene oligomer hydroxide, isobutylene oligomer hydroxide, and polybutene hydroxide.

As the alkylbenzene of the above-mentioned synthetic oils, a one having one or two alkyl groups is preferred, and a one having one alkyl group is more preferred although an optional one is usable. The number of carbon atoms of the alkyl group in the alkylbenzene is preferably 8 to 40, more preferably 8 to 24. The volatility may be increased when the number of carbon atoms of the alkyl group is less than 8 carbon atoms, while the performance as the base oil of electric discharge machining oil may become insufficient when the number of carbon atoms exceeds 40. The alkyl group is preferably a branched alkyl group from the point of safety of work although it may be straight or branched. The alkylbenzene may be an alkylbenzene having a single structure, or a mixture of two or more alkylbenzenes having different structures.

When the above-mentioned mineral oil or synthetic oil is used in combination in the invention of this mode, one kind or a mixture of two kinds or more of the above-mentioned mineral oils or synthetic oils can be used. As the combination of oils combined in the base oil, each combination of mineral oil-to-mineral oil, synthetic oil-to-synthetic oil, and mineral oil-to-synthetic oil can be adapted. Further, the mixing ratio thereof is desirably selected so that the kinematic viscosity at 40° C. of the mixed base oil is within a preferable range described later, although it may be appropriately selected.

The content of the base oil is preferably 40% by mass or more, based on the total amount of the composition, more preferably 50% by mass or more, further preferably 60% by mass, most preferably 70% by mass or more. On the other hand, for facilitating elimination of working scraps or a tarry substance staying between electrodes, the content of the base oil is preferably 99.85% by mass or less, based on the total amount of the composition, more preferably 99.5% by mass or less, most preferably 99.0% by mass or less.

The electric discharge machining oil composition of the invention can include a compound having two or more hydroxyphenyl groups (A) (hereinafter referred to as component (A) in some cases).

Each of the hydroxyphenyl groups of the component (A) is preferably substituted by an alkyl group having 1 to 4 carbon atoms although it may be substituted or unsubstituted. Although the number of substituents is not particularly limited when each of the hydroxyphenyl group of the component (A) is substituted by the alkyl group having 1 to 4 carbon atoms, the component (A) is preferably a compound having, preferably one or more alkyl groups, more preferably two or more alkyl groups in each hydroxyphenyl group. The compound used in the invention is preferably a compound having two hydroxyphenyl groups since the generation of tarry substance can be further suppressed, although a compound having three or more hydroxyphenyl groups may be used. Further, a plurality of hydroxyphenyl groups may be bonded together directly or through a hydrocarbon group. Otherwise, the hydroxyphenyl groups may be bonded through a bonding group containing an atom other than carbon and hydrogen such as oxygen or sulfur. Examples of the bonding group containing oxygen and/or sulfur include —S—, —O—C(=O)—, and combinations thereof with hydrocarbon group. Among these bonding groups, a group containing oxygen, a group containing sulfur, or a group containing both oxygen and sulfur are preferred since the generation of tarry substance can be further suppressed, and the group containing both oxygen and sulfur is more preferred.

As the component (A) used in the invention, a bisphenol compound represented by the following general formula (4) of this mode is preferred.

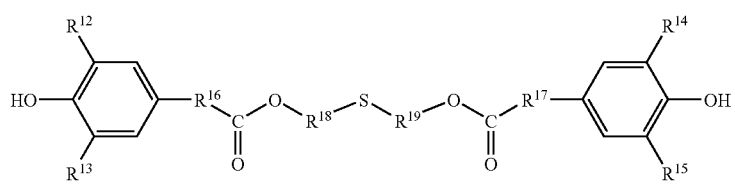

(4)

wherein $R^{12}$, $R^{13}$, $R^{14}$ and $R^{15}$ each independently represents an alkyl group having 1 to 4 carbon atoms, and $R^{16}$, $R^{17}$, $R^{18}$ and $R^{19}$ each independently represent an alkylene group having 1 to 10 carbon atoms.

The alkyl group represented by $R^{12}$ to $R^{15}$ may be straight or branched, and concrete examples thereof include methyl group, ethyl group, n-propyl group, isopropyl group, n-butyl group, isobutyl group, sec-butyl group, and tert-butyl group. Particularly, tert-butyl group is preferred from the point of excellence in the effect of suppressing the generation of tarry substance.

The alkylene group represented by $R^5$ to $R^8$ may be straight or branched, and concrete examples thereof include methylene group, ethylene group, propylene group, butylene group, pentylene group, hexylene group, heptylene group, octylene group, nonylene group, and decylene group (these alkylene groups may be straight or branched). Particularly, methylene group and ethylene group (dimethylene group, methylmethylene group) are preferred.

Preferable concrete examples of the component (A) used in the invention include a compound represented by the following formula (5) of this mode:

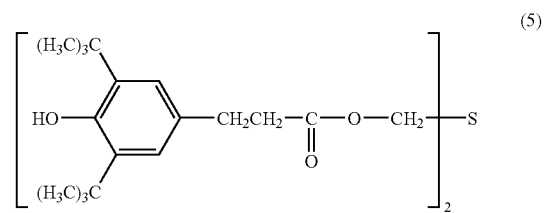

(5)

When the electric discharge machining oil composition of the invention includes the component (A), the content thereof is preferably 0.05% by mass or more, based on the total amount of the composition, more preferably 0.1% by mass or more, although it may be optionally selected. When the content of the component (A) is less than 0.005% by mass, the effect of suppressing the generation of tarry substance in electric discharge machining is apt to be insufficient. On the other hand, the content of the component (A) is preferably 10% by mass or less, based on the total amount of the composition, more preferably 5% by mass or less. When the content of the component (A) exceeds 10% by mass, electrode consumption shows an increasing trend.

Addition Effect of the Component (A)

Since electric discharge is instantaneously performed with electric discharge machining oil as a medium in electric discharge machining, a part of the electric discharge machining oil is thermally decomposed by being locally exposed to high temperature and the resulting thermally decomposition product is polycondensed, whereby a tarry substance may be generated.

When electric discharge machining is performed using such electric discharge machining oil containing the tarry substance, concentration of electric discharge is caused by adhesion of the tarry substance to an electrode or a workpiece and, consequently, the phenomenon of causing local irregularities on a working surface is apt to occur.

Therefore, for further improving the working surface state, it is needed to sufficiently suppress the generation of tarry substance.

For removing the tarry substance from the electric discharge machining oil, a filter can be used. However, since the tarry substance generated in such a system generally contains fine particles having a particle size of 1 μm or less, a complicated facility or complicated operation is needed in addition to extremely strict characteristic requirements to the filter.

The component (A) has the effect of sufficiently suppressing the generation of tarry substance.

In the invention of this mode, a polymer material having a kinematic viscosity at 40° C. of 30 mm²/s or more and a kinematic viscosity at 100° C. of 10 mm²/s or more and/or a polymer material having a weight average molecular weight of 500 or more can be added as additives.

For example, high viscosity oils, polymers and resins having such properties are usable as the additives. Examples of the polymer material having the above-mentioned kinematic viscosities include mineral oils except the kerosene fraction and the normal paraffin fraction of the base oil described previously, concretely including those obtained by refining lubricant fractions obtained by distillation of paraffin-based or naphthene-based crude oil by use of one or a proper combination of two or more of refining treatments such as solvent deasphalting, solvent extraction, hydrocracking, solvent dewaxing, catalytic dewaxing, hydrogenation refining, sulfuric acid treatment, and clay treatment.

Examples of the polymer include poly-α-olefin (e.g., polybutene, polyisobutylene, etc.) or hydrides thereof, polyamide compound, polyalkylstyrene, polyvinyl acetate, polyalkyl (meth)acrylate, ethylene-propylene copolymer or hydroxides thereof, and styrene-maleic anhydride copolymer.

As the resin, for example, terpene resin and petroleum resin can be used. Examples of the terpene resin include monoterpene such as hemiterpene or dipentene, sesuqiterpene, diterpene, sesterterpene, triterpene, tetraterpene, polymer of polyterpene, or hydrides or modified resins thereof. Examples of the petroleum resin include resin started from hydrocarbon fraction having 4 or 5 carbon atoms or hydrocarbon fraction having 9 or 10 carbon atoms of petroleum cracking fractions or resin started from a mixture of these fractions or modified resins thereof, and cyclopentadiene-dicyclopentadiene copolymer-based petroleum resin or hydrides or modified resins thereof.

The polymer component of the invention in this mode is preferably the polymer since processing accuracy and processing rate can be further enhanced, and an excellent effect for improvement of workability such as sticking or the like can be attained in a balanced manner. Among the polymers, poly-α-olefin (e.g., polybutene, polyisobutylene, etc.), ethylene-propylene copolymer, polymethacrylate, or hydrides thereof is more preferred, and polybutene or hydride thereof is further more preferred. The polybutene or hydride thereof is preferred also from the point that staining is hardly caused.

For further improving the processing accuracy and processing rate, the polymer material as the additive component used in the invention of this mode has a kinematic viscosity at 40° C. of preferably 100 mm$^2$/s or more, more preferably 500 mm$^2$/s or more, further preferably 1000 mm$^2$/s or more, most preferably 5000 mm$^2$/s, and a kinematic viscosity at 100° C. of preferably 100 mm$^2$/s or more, more preferably 500 mm$^2$/s or more, most preferably 1000 mm$^2$/s or more. Although upper limits are not particularly defined for the kinematic viscosities at 40° C. and at 100° C., the kinematic viscosity at 40° C. is generally 250000 mm$^2$/s or less. For preventing deterioration of working environments such as sticking, it is preferably 200000 mm$^2$/s or less, more preferably 180000 mm$^2$/s or less. From the same reason, the kinematic viscosity at 100° C. is preferably 10000 mm$^2$/s or less, more preferably 7000 mm$^2$/s or less, further preferably 5000 mm$^2$/s or less.

For ensuring further excellent processing accuracy and processing rate, the polymer material as the additive component in the invention of this mode has a weight average molecular weight of preferably 1000 or more, more preferably 2000 or more, further preferably 3000 or more, most preferably 5000 or more. On the other hand, the upper limit of the weight average molecular weight is generally 50000 or less, preferably 40000 or less, further preferably 30000 or less, most preferably 10000 or less although it is not particularly limited.

The content of the polymer material as the additive component used in the invention of this mode is preferably 0.1% by mass or more, based on the total amount of the composition, more preferably 0.3% by mass or more, further preferably 0.5% by mass or more, most preferably 1% by mass or more. On the other hand, the content is preferably 30% by mass or less, based on the total amount of the composition, more preferably 20% by mass or less, most preferably 15% by mass or less. When the content as the additive component is less than 0.1% by mass based on the total amount of the composition, sufficient processing rate and satisfactory processing accuracy can be hardly obtained, and when the content exceeds 30% by mass based on the total amount of the composition, deterioration of workability such as sticking and increased generation of tarry substance are undesirably caused.

Addition Effect of Polymer Material

The above-mentioned polymer material as the additive component can improve the processing rate.

By using a specific polymer material as the additive component in combination with the component (A), not only high-level working surface state and processing rate can be attained by suppressing the generation of tarry substance, but also the working surface state can be maintained in a high level even if the using period is extended.

Preferable examples of the polymer materials as the additive component are as follows.

(B) Polymer compound having a main chain composed of a hydrocarbon frame and an ester group bonded to a part of carbon atoms constituting the main chain (C) Polybutene having a weight average molecular weight of 650 to 1200

(D) Polyalkylene glycol including butylene oxide as a constituting unit

The electric discharge machining oil composition of the invention can include the polymer compound having a main chain composed of a hydrocarbon frame and an ester group bonded to a part of carbon atoms constituting the main chain (B) (hereinafter referred also simply to as component (B) in some cases).

A side chain of the polymer compound of the component (B) may have a side chain group in addition to the ester group. As such a side chain group, a hydrocarbon group such alkyl group, cycloalkyl group, alkenyl group, alkylcycloalkyl, aryl group, alkylaryl group, or arylalkyl group is preferred, and alkyl group is further preferred. As the alkyl group, alkyl group having 1 to 30 carbon atoms is preferred, alkyl group having 1 to 20 carbon atoms is more preferred, and alkyl group having 2 to 6 carbon atoms is further preferred. The alkyl group as the side chain group may be straight or branched.

Examples of the component (B) used in the invention of this mode include a single polymer of a monomer represented by the following general formula (1) of this mode (maleate polymer, fumarate polymer, etc.) or a copolymer of a monomer represented by the following general formula (21) of this mode with another monomer. Particularly, a copolymer of the monomer represented by the general formula (1) of this mode with the monomer represented by the following general formula (2) of this mode is particularly preferred.

(1)

wherein $R^1$ represents a hydrocarbon group, and $R^2$, $R^3$ and $R^4$ each independently represent hydrogen atom, a hydrocarbon group or an ester group.

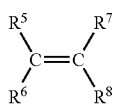 (2)

wherein $R^5$, $R^6$, $R^7$ and $R^8$ each independently represent hydrogen atom or an alkyl group.

Concrete examples of the hydrocarbon group represented by $R^1$ in the general formula (1) of this mode include alkyl group, cycloalkyl group, alkenyl group, alkylcycloalkyl group, aryl group, alkylaryl group, and arylalkyl group, and alkyl group is particularly preferred. Such alkyl group may be straight or branched. When $R^1$ is the alkyl group, the number of carbon atoms thereof is preferably 1 or more, more preferably 2 or more, further preferably 3 or more from the point of workability. From the point of stability, the number of carbon atoms in this alkyl group is preferably 30 or less, more preferably 20 or less, further preferably 6 or less.

In the general formula (1) of this mode, $R^2$, $R^3$ and $R^4$ each independently represent hydrogen atom, a hydrocarbon group or an ester group (—COOR; R represents a hydrocarbon group). As the hydrocarbon groups when $R^2$, $R^3$ and $R^4$ are hydrocarbon groups, and the hydrocarbon group R when $R^2$, $R^3$ and $R^4$ are ester groups, for example, alkyl group, cycloalkyl group, alkenyl group, alkylcycloalkyl group, aryl group, alkylaryl group, and arylalkyl group can be given, respectively. Particularly, the alkyl group described in the description of $R^1$ is preferred.

In the above-mentioned general formula (2) of this mode, $R^5$, $R^6$, $R^7$ and $R^8$ each independently represent hydrogen atom or an alkyl group.

Examples of the alkyl group represented by $R^5$, $R^6$, $R^7$ and $R^8$ include the alkyl group described in the description of $R^1$. Particularly, alkyl group having 1 to 30 carbon atoms is preferred, alkyl group having 6 to 20 carbon atoms is more preferred, and alkyl group having 8 to 12 carbon atoms is further preferred.

In the monomer represented by the general formula (2) of this mode, preferably at least one, more preferably one of $R^5$, $R^6$, $R^7$ and $R^8$ is alkyl group.

As the monomer represented by the general formula (2) of this mode, α-olefin having 6 to 20 carbon atoms, more preferably 10 to 14 carbon atoms is preferred.

In the invention of this mode, the monomers represented by the general formula (2) of this mode may be used singly, or in combination of two or more having different structures.

In the copolymer of the monomer represented by the general formula (1) with the monomer represented by the general formula (2), the ratio of each monomer is not particularly limited. However, the ratio of the monomer represented the general formula (1) of this mode is preferably 10 to 90 mol %, based on the total amount of the monomers, more preferably 30 to 70 mol %, further preferably 40 to 60 mol %, from the point that both the workability and the storage stability of the electric discharge machining oil composition can be attained in a high level.

The weight average molecular weight of the component (B) is preferably 5000 or less, more preferably 3000 or less from the point that the characteristic thereof can be maintained in a high level over a long period while improving the working surface state and from the point of improvement of workability such as sticking or the like, although it is not particularly limited. From the point of improvement of processing rate, further, the weight average molecular weight of the component (B) is preferably 800 or more, more preferably 900 or more, further preferably 1000 or more.

As the component (B), a one having a weight average molecular weight satisfying the above-mentioned condition can be prepared by selecting the kinds or polymerization degrees of monomers so as to have a desired weight average molecular weight. Otherwise, a commercially available product having a weight average molecular weight satisfying the above condition (Ketjen lube 115, Ketjen lube 165 (each produced by AKZO NOBEL) may be used as it is as the component (B). Further, a polymer compound corresponding to the component (B), which has a weight average molecular weight satisfying the above-mentioned condition can be separated from a polymer compound obtained by an optional method or a commercially available polymer compound (including mixtures) by distillation or chromatography.

The content of the component (B) in the electric discharge machining oil of the invention is optionally determined, but is generally 0.1 to 20% by mass based on the total amount of the composition.

The electric discharge machining oil composition of the invention can include a polybutene having a weight average molecular weight of 650 to 1200 (C) (hereinafter referred also to as compound (C) in some cases). The polybutene referred to herein means polymers of 1-butene, 2-butene, isobutene and mixtures thereof, and hydrides thereof.

The weight average molecular weight of the compound (C) is needed to be 1200 or less, from the point that the characteristic thereof can be maintained in a high level over a long period while improving the working surface state and from the point of improvement of workability such as sticking or the like, and is preferably 100 or less, more preferably 800 or less. From the point of improvement of processing rate, the weight average molecular weight of the compound (C) is needed to be 650 or more, and is preferably 700 or more, more preferably 750 or more.

The content of the compound (C) used in the invention of this mode is generally 0.1 to 20% by mass, based on the total amount of the composition, although it may be optionally determined. From the point of processing rate and working surface state, the content of the compound (C) is preferably 0.1% by mass or more, based on the total amount of the composition, more preferably 0.3% by mass or more, further preferably 0.5% by mass or more, particularly preferably 1% by mass or more. From the point that the characteristic thereof can be maintained in a high level over a long period while improving the working surface state by suppressing the generation of tarry substance and from the point of improvement of workability such as sticking or the like, the content is preferably 20% by mass or less, more preferably 15% by mass or less, further preferably 10% by mass or less.

The electric discharge machining oil composition of the invention can include a polyalkyleneglycol containing butyleneoxide as a constituting unit (D) (hereinafter referred also to as component (D) in some cases). The butyleneoxide referred to herein include both 1,2-epoxybutane (α-butyleneoxide) and 2,3-epoxybutane (β-butyleneoxide).

The polyalkyleneglycol as the component (D) may be a single polymer of butylene oxide or a copolymer of butyleneoxide with another alkyleneoxide, and further may be a mixture of two or more thereof.

The single polymer of butylene oxide is preferably used in the invention of this mode from the point of workability and solubility to base oil, although either the single polymer of butylenes oxide or the copolymer of butyleneoxide with another alkyleneoxide may be used.

The weight average molecular weight of the component (D) is preferably 5000 or less, more preferably 3000 or less, further preferably 2000 or less, from the point that the characteristic can be maintained in a high level while improving the working surface state, and from the point of improvement of workability such as sticking or the like, although it is not particularly limited. From the point of improvement of processing rate, the weight average molecular weight of the compound (D) is preferably 800 or more, more preferably 900 or more, further preferably 1000 or more.

The content of the component (D) in the electric discharge machining oil of the invention is generally 0.1 to 20% by mass, based on the total amount of the composition, although it can be optionally determined. From the point of processing rate and working surface state, the content of the compound (D) is preferably 0.1% by mass or more, based on the total amount of the composition, more preferably 0.3% by mass or more, further preferably 0.5% by mass or more, particularly preferably 1% by mass or more. From the point that further high storage stability can be ensured, from the point that the characteristics can be maintained in a high level over a long period while improving the working surface state by suppressing the generation of tarry substance, and further from the point of improvement of workability such as sticking or the like, the content of the component (D) is preferably 20% by mass or less, based on the total amount of the composition, more preferably 15% by mass or less, further preferably 10% by mass or less.

The electric discharge machining oil of the invention may further include other additives as occasion demands, for the purpose of further enhancing the performances as electric discharge machining oil composition.

Concrete examples of such additives include antioxidant, defoaming agent, rust preventive agent, metal inactivator, oily agent, extreme pressure agent, cleaning dispersant, and surfactant. The content of such additives is generally 0.005 to 10% by mass based on the total amount of the electric discharge machining oil composition.

From the point of safety to fire, the kinematic viscosity at 40° C. of the electric discharge machining oil composition of the invention is preferably 0.5 mm$^2$/s or more, more preferably 1 mm$^2$/s or more, further preferably 1.5 mm$^2$/s or more, although it is not particularly limited. On the other hand, from the point of satisfactorily maintaining removal of working scraps and cooling effect of electrodes or the like, and for obtaining further excellent effects such as easiness of removal of working scraps, satisfactory working surface state, satisfactory cooling effect of electrodes or the like, improved processing rate and the like, the kinematic viscosity at 40° C. is preferably 20 mm$^2$/s or less, more preferably 15 mm$^2$/s or less, further preferably 10 mm$^2$/s or less, particularly preferably 5 mm$^2$/s or less, most preferably 3 mm$^2$/s or less.

According to the electric discharge machining oil of the invention having the above-mentioned structure, both the workability in electric discharge machining and the storage stability can be attained in a high level. In the electric discharge machining for working a workpiece by opposing the workpiece to a tool electrode in an electric discharge machining solution such as oil or water and generating a pulse-like discharge current having a high repetition number, the processing rate is higher as the discharge current or the current pulse width is larger, but the working surface is roughed more (such processing is called "rough processing"). On the other hand, the working surface can be finished so that the surface roughness thereof is, for example, 5 μm or less by Rz by reducing the discharge current or the pulse width (such processing is called "finish processing"). The electric discharge machining oil of the invention is particularly suitable for the finish processing although it is suitably used for both the rough processing and the finish processing, and can improve the workability by further enhancing the processing rate.

Embodiment (Third Mode for Electric Discharge Machining Oil Composition)

The invention of this mode will be concretely described based on Examples and Comparative Examples, but the invention of this mode is never limited by the following examples.

In Examples and Comparative Examples, electric discharge machining oil compositions were prepared using base oils shown in Table 1.3 in mixing ratios shown in Table 2.3. Components used for preparation of each electric discharge machining oil composition are as follows.

(1) Production of Base Oil Used
(Hydrogenation Refined Oil of FT Synthetic Oil, Wax Hydrocracked Oil, and Base Oils 1, 2, 6, 7, 8)

1) FT synthetic hydrocarbon oil using natural gas as raw material (content of hydrocarbon with boiling point of 150° C. or higher: 82% by mass, content of hydrocarbon with boiling point of 360° C. or higher: 41% by mass) was separated into a light fraction with boiling point of 150° C. or lower, an intermediate fraction with boiling point of 150 to 360° C., and a tower bottom residue heavy wax content (FT wax: corresponding to a fraction with boiling point of higher than 360° C.) in a distillation tower.

2) The intermediate fraction separated in 1) was hydrogenation-refined by use of a hydrogenation refining catalyst (Pt: 0.8% by mass to carrier, USY zeolite/silica alumina/alumina binder: 3/57/40 by weight) under hydrogen gas flow in conditions of reaction temperature: 311° C., hydrogen pressure: 3.0 MPa, LHSV: 2.0 h$^{-1}$, and hydrogen/oil ratio; 340 NL/L.

3) The hydrogenation refined oil obtained in 2) was fractioned to a 150-250° C. fraction (kerosene fraction 1) and a 250-360° C. fraction (light oil fraction 1) by distillation.

4) The FT wax obtained in 1) was hydrocracked by use of a hydrocracking catalyst (Pt: 0.8% by mass to carrier, USY zeolite/silica alumina/alumina binder: 3/57/40 by weight) under hydrogen gas flow in conditions of reaction temperature: 326° C., hydrogen pressure: 4.0 MPa, LHSV: 2.0 h$^{-1}$, and hydrogen/oil ratio: 680 NL/L.

5) The hydrocracked oil obtained in 4) was fractioned to a 150-250° C. fraction (kerosene fraction 2) and a 250-360° C. fraction (light oil fraction 2) by distillation.

6) The hydrogenation refined oil obtained in 2) and the hydrocracked oil obtained in 4) were mixed to thereby obtain a 200-260° C. fraction (base oil 1) followed by atmospheric distillation. The properties of the base oil 1 are shown in Table 1.3.

7) Diluted base oil 2 was obtained by mixing the light oil fractions 1 and 2 obtained in 3) and 5) together in a ratio of 51:49 (by mass). The properties of the base oil 2 are shown in Table 1.3.

8) Diluted base oil 6 was obtained by mixing the light oil fractions 1 and 2 obtained in 3) and 5) together in a ratio of 57:43 (by mass). The properties of the base oil 6 are shown in Table 1.3.

9) Base oil 7 was obtained by mixing the kerosene fractions 1 and 2 obtained in 3) and 5) together in a ratio of 63:37 (by mass). The properties of the base oil 7 are shown in Table 1.3.

10) Base oil 8 was obtained by mixing the kerosene fractions 1 and 2 obtained in 3) and 5) together in a ratio of 49:51 (by mass). The properties of the base oil 8 are shown in Table 1.3.

(Base Oils 3 to 5)

1) As base oil 3, general hydrogenation refined mineral oil was used. The properties of the base oil 3 are shown in Table 1.3.

2) As base oil 4, a general isoparaffin solvent was used. The properties of the base oil 4 are shown in Table 1.3

3) As base oil 5, a general normal paraffin solvent was used. The properties of the base oil 5 are shown in Table 1.3

(2) Properties of Base Oils Used in Examples

The properties of Base oils 1 to 8 are summarized in Table 1.3

The conditions of the electric discharge machining are as follows.

Electrode: Copper-made square bar electrode (10 mm×10 mm)

Current peak value (A): 1.0

Pulse width ON ($\mu$ sec): 2.0

Quiescent time OFF ($\mu$ sec): 8.0

Insert depth of electrode (mm): 2

Processing time (min): 40

TABLE 1.3

| | | Electric Discharge Machining Oil/ Base Oil Number | | | | | | | |
|---|---|---|---|---|---|---|---|---|---|
| | | Base Oil 1 | Base Oil 2 | Base Oil 3 | Base Oil 4 | Base Oil 5 | Base Oil 6 | Base Oil 7 | Base Oil 8 |
| Density (15° C.) | kg/m$^3$ | 764.8 | 783.0 | 799 | 791 | 761 | 782.8 | 748.9 | 749.4 |
| Kinematic Viscosity (@40° C.) | mm$^2$/s | 2.240 | 3.341 | 1.77 | 2.45 | 1.74 | 3.329 | 1.245 | 1.242 |
| Flash Point | ° C. | 82 | 128 | 83 | 87 | 96 | 130 | 60 | 58 |
| Aniline Point | ° C. | 89.3 | 97.8 | 70.1 | 86 | 86 | 97.7 | 82.1 | 82.2 |
| Sulfur Content | mass ppm | Less than 1 | Less than 1 | 20 | Less than 1 | Less than 1 | Less than 1 | Less than 1 | Less than 1 |
| Distillation IBP | ° C. | 203.0 | 259.5 | 209 | 210 | 218 | 257.0 | 168.0 | 171.0 |
| Properties 5% | ° C. | 209.5 | 268.0 | 213 | 217 | 223 | 266.5 | 182.0 | 180.5 |
| 10% | ° C. | 211.0 | 270.0 | 215 | 219 | 224 | 269.0 | 184.0 | 182.0 |
| 50% | ° C. | 223.0 | 283.5 | 224 | 231 | 227 | 283.0 | 198.5 | 197.5 |
| 90% | ° C. | 244.0 | 316.5 | 243 | 248 | 234 | 315.5 | 221.5 | 221.5 |
| 95% | ° C. | 249.5 | 325.5 | 249 | | | 324.0 | 226.5 | 226.0 |
| EP | ° C. | 259.5 | 338.0 | 259 | 257 | 240 | 336.0 | 238.0 | 236.5 |
| Distillation Range (90-10) | ° C. | 33.0 | 46.5 | 28.0 | 29.0 | 10.0 | 46.5 | 37.5 | 39.5 |
| Distillation Range (EP-IBP) | ° C. | 56.5 | 78.5 | 50 | 47 | 22 | 79.0 | 70.0 | 65.5 |
| n-Paraffin Content | % by mass | 47.3 | 36.8 | 36 | 0 | 100 | 40.4 | 56.8 | 48.2 |
| Naphthene Content | vol % | 0 | 0 | 24.3 | 0 | 0 | 0 | 0 | 0 |
| Paraffin Content | vol % | 100 | 100 | 68.2 | 100 | 100 | 100 | 100 | 100 |
| Aromatic Content | vol % | 0 | 0 | 7 | 0 | 0 | 0 | 0 | 0 |
| Saturated Content | vol % | 100 | 100 | 92.5 | 100 | 100 | 100 | 100 | 100 |
| Unsaturated Content | vol % | 0 | 0 | 0.5 | 0 | 0 | 0 | 0 | 0 |
| Cetane Index | | | 90.9 | 54.7 | 63.8 | 77.6 | 90.8 | 78.2 | 77.2 |
| Smoke Point | mm | | | | | | | 45 | 44 |

EXAMPLE 1

The following compounds A and B were mixed to the base oils of Table 1.3 in amounts shown in Table 2.3 to thereby prepare electric discharge machining oils.

Compound A: Thiobisphenol type compound of the following formula

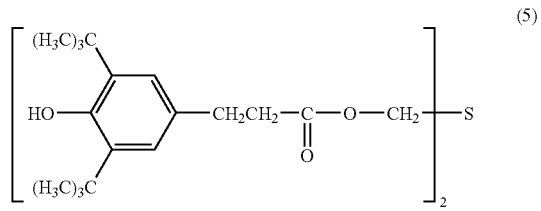

(5)

Compound B: Polybutene hydride (weight average molecular weight: 2900)

Processing was performed using the obtained electric discharge machining oil compositions in the following conditions by a servo-electric discharge machine (DIAX EA12E by MITUBISHI ELECTRIC CORP.), and the metal processing rate was evaluated according to an evaluation method described below.

12 L of the processing solution (electric discharge machining oil) was filled in a processing tank and subjected to the following tests.

(Evaluation of Processing Rate)

The time required for processing (time before the electrode insert depth reaches a predetermined position) and change in weight of a work before and after processing were measured, and the processing rate was calculated using the following equation.

Processing rate (mg/min)=Change in weight of work before and after processing (mg)/Time required for processing (min)

(Evaluation of Odor)

The odor of the processing tank during processing in the above-mentioned conditions was determined.

The determination was performed by ten panelists by giving an evaluation point based on a scoring reference of non-disturbing: 0, slight odorous: 2, and odorous: 4, respectively, and an average value of the points was calculated.

The result is shown by ○: less than 1, Δ: 1 or more and less than 2, and x: 2 or more.

Both the results are summarized in Table 2.3.

TABLE 2.3

|  | Example 1 | Example 2 | Example 3 | Comparative Example 1 | Comparative Example 2 | Comparative Example 3 | Comparative Example 4 |
|---|---|---|---|---|---|---|---|
| Base Oil 1 | 100 | — | 93.8 | — | — | — | — |
| Base Oil 2 | — | 100 | — | — | — | — | — |
| Base Oil 3 | — | — | — | 100 | — | — | — |
| Base Oil 4 | — | — | — | — | 100 | — | — |
| Base Oil 5 | — | — | — | — | — | 100 | 93.8 |
| Compound A | — | — | 0.2 | — | — | — | 0.2 |
| Compound B | — | — | 6 | — | — | — | 0.6 |
| Odor Evaluation | ○ | ○ | ○ | x | Δ | ○ | ○ |
| Processing Rate mg/min | 0.16 | 0.15 | 0.27 | 0.16 | 0.15 | 0.13 | 0.23 |

Fourth Mode (Rust Preventing Oil Composition)

The rust preventing oil composition of the invention in this mode contains the above-mentioned hydrocarbon oil or hydrocarbon oil having a density at 15° C. of 0.7 to 0.8 g/cm$^3$, and including a n-paraffin content of 10 to 90% by mass, an aromatic content of 0 to 3% by volume, and a naphthene content of 0 to 20% by volume (hereinafter referred to as inventive hydrocarbon oil in this mode). More specifically, although the hydrocarbon oil has the properties as described above, the following mode A can be given as a more concrete and preferable mode thereof.

In the preferable mode A, the kinematic viscosity (mm$^2$/s) is preferably 1.0 to 7.0 mm$^2$/s, further preferably 1.0 to 5.5 mm$^2$/s, more preferably 1.2 to 5.0 mm$^2$/s, particularly preferably 2.0 to 4.0 mm$^2$/s. Kinematic viscosities below and beyond the above-mentioned range undesirably cause deterioration of rust preventing property and deterioration of oil removability, respectively.

In the preferable mode A, the initial boiling point (° C.) is preferably 140 to 260° C., further preferably 150 to 255° C., more preferably 160 to 250° C., most preferably 165 to 245° C. When the initial boiling point is too low, the compatibility with organic resin material may be deteriorated.

In the preferable mode A, the 10%-distillation point (° C.) is preferably 150 to 270° C., further preferably 160 to 265° C., more preferably 170 to 260° C., most preferably 180 to 255° C.

In the preferable mode A, the 90%-distillation point (° C.) is preferably 180 to 320° C., further preferably 190 to 310° C., more preferably 200 to 300° C., most preferably 210 to 290° C.

In the preferable mode A, the end point (° C.) is preferably 190 to 310° C., further preferably 200 to 300° C., more preferably 210 to 290° C., most preferably 220 to 280° C.

In the invention of this mode, which includes the inventive hydrocarbon oil as an essential component of the base oil, any one of mineral oil, synthetic oil and oil fat can be used in combination therewith out limiting the kind thereof. In the combined use, mineral oil or synthetic oil is particularly preferred. The combining ratio thereof is not particularly limited, and can be optionally selected as long as the effect of the present invention is not impaired. However, the content of the inventive hydrocarbon oil is set to preferably 85% by mass or more, based on the total amount of the rust preventing oil composition, further preferably 90% by mass or more, most preferably 95% by mass or more. The content of the base oil other than the inventive hydrocarbon oil is set to preferably 60% by mass or less, based on the total amount of the rust preventing oil composition, more preferably 50% by mass or less, most preferably 40% by mass or less.

The rust preventing oil composition of the invention can include oxidized wax salt, carboxylic acid or the like.

In the invention of this mode, as the oxidized wax salt, alkali metal salt, alkali earth metal salt, heavy metal salt and amine salt can be used singly or in combination of two or more thereof. From the point of rust preventing property, at least one selected from alkali metal salt and alkali earth metal salt is preferred, and alkali earth metal salt is more preferred. Further, of the alkali earth metal salt, calcium salt is particularly preferred from the point that further high safety and combination effect with carboxylic acid can be obtained.

From the point of rust preventing property, the content of the oxidized wax salt in the rust preventing oil composition of the invention is preferably 0.5% by mass or more, based on the total amount of the composition, more preferably 1% by mass or more, further preferably 2% by mass or more, although it is not particularly limited. From the point of degreasing property and storage stability, further, the content of the oxidized wax salt is preferably 5% by mass or less, more preferably 4% by mass or less, further preferably 3% by mass or less.

Preferable examples of the carboxylic acid included in the rust preventing oil composition of the invention include fatty acid, dicarboxylic acid, hydroxy fatty acid, naphthenic acid, resin acid, oxidized wax, and lanolin fatty acid, although an optional one can be used as the acid.

The content of the carboxylic acid in the rust preventing oil composition of the invention is preferably 0.01% by mass or more, based on the total amount of the composition, more preferably 0.03% by mass or more, further preferably 0.05% by mass or more although it is not particularly limited. When the content of the carboxylic acid is less than the above-mentioned lower limit value, the improving effect of rust preventing property by the addition is apt to be insufficient. The content of the carboxylic acid is also preferably 0.5% by mass or less, based on the total amount of the composition, more preferably 0.3% by mass or less, further preferably 0.2% by mass or less. When the content of the carboxylic acid exceeds the above-mentioned upper limit value, the storage stability is apt to be deteriorated due to insufficient solubility to the base oil.

Although the content ratio of the oxidized wax to the carboxylic acid is not particularly limited, the ratio of carboxylic acid/oxidized wax (by mass) is preferably $1/100$ to $30/100$, more preferably $3/100$ to $7/100$, further preferably $4/100$ to $6/100$. When the ratio of carboxylic acid/oxidized wax is below $1/100$ or beyond $30/100$, the improving effect of rust preventing property, degreasing property and storage stability by the combined use of the both is apt to be insufficient.

The rust preventing oil composition of the invention can further include various additives described below as occasion demands.

The rust preventing oil composition of the invention may further include a rust preventing additive such as sulfonate, carboxylate, ester, sarcosine type compound, amine, or boron compound.

In addition to the above-mentioned rust preventing additive, an alcohol typified by higher aliphatic alcohol; a phosphoric (phosphorous) derivative typified by phosphoric monoester, phosphoric diester, phosphorous ester, or amine salts thereof or the like can be included as rust preventing additive.

In the rust preventing oil composition of the invention, the above-mentioned rust preventing additives can be used singly or in combination of two kinds or more thereof. However, the sulfonate is preferably used since further high rust preventing property can be obtained in the rust preventing oil composition of the invention containing the carboxylic acid as an essential component. When the sulfonate is used, the composition may further include at least one selected from the carboxylate, the ester, the sarcosine type compound, the amine and the boron compound. As the rust preventing additives used in combination with the sulfonate, at least one selected from the ester and the carboxylate is preferred, and a combination of the ester and the carboxylate is further preferred. As the ester referred to herein, partial ester of polyhydric alcohol and partial ester of alkenyl succinic acid are preferred, and as the carboxylic acid, fatty acid, dimeric acid, and alkenyl succinic acid are preferred. As the carboxylate, fatty acid salt and lanolin fatty acid salt are preferred.

In the rust preventing oil composition of the invention, the content of the rust preventing additives other than the oxidized wax and the carboxylic acid is preferably 0.1 to 40% by mass, more preferably 0.5 to 30% by mass, further preferably 1 to 20% by mass. When the content of the rust preventing additives is below the above-mentioned lower limit value, the improving effect of rust preventing property by the addition is apt to be insufficient. Even if the content of the rust preventing additives exceeds 40% by mass, the effect proportionate to the content cannot be obtained as the improving effect of rust preventing property.

The rust preventing oil composition of the invention may further include other additives as needed. Concrete examples of the other additives used in the invention include paraffin wax which is remarkably effective for improving exposure rust preventing property in an acidic atmosphere; sulfidized fat, sulfidized ester, long-chain zinc alkyl dithiophosphate, phosphate such as tricresylphosphate, fat such as lard, fatty acid, higher alcohol, calcium carbonate, or potassium borate, which is remarkably effective for improving press moldability or lubricity; phenol-based or amine-based antioxidant for improving anti-oxidizing performance; corrosion inhibitor for improving anticorrosive performance (benzotriazole or derivatives thereof, thiadiazol, benzothiazol, etc.); wetting agent such as diethylene glycol monoalkyl ether; film forming agent such as acrylic polymer, paraffin wax, microwax, slack wax, polyolefin wax or petrolatum; defoaming agent such as methylsilicone, fluorosilicone, or polyacrylate; water and surface active agent for removing a water-soluble decay factor; and mixtures thereof.

The rust preventing oil composition of the invention having the above-mentioned constitution can entirely attain high-level rust preventing property, degreasing property and storage stability in a balanced manner, and can be thus used suitably as rust preventing oil for various metallic members.

The metallic member that is a treatment object is not particularly limited, and concrete examples thereof include a surface-treated steel plate which is worked into an automotive body or electric product body, such as cold rolled steel plate, hot rolled steel plate, high-tension steel plate or galvanized steel plate; a metallic plate material such as original sheet for tin plate, aluminum alloy plate or magnesium alloy plate; further a bearing part such as rolling bearing, tapered rolling bearing or needle bearing; a building steel product; and a precision part.

Examples of the rust preventing oil for such a metallic member include intermediate rust preventing oil used in a process such as working process of the metallic member, shipping rust preventing oil used for rust prevention at the time of shipping, and detergent rust preventing oil used in a cleaning process for removal of foreign matter prior to pressing or for removal of foreign matter prior to shipping in a metal plate manufacturing maker. The rust preventing oil composition of the invention can be used for each of the above-mentioned purposes.

When the rust preventing oil composition of the invention is used as the detergent rust preventing oil composition, cleaning and subsequent rust prevention of the metallic member can be satisfactorily attained by feeding a highly excessive amount of the rust preventing oil composition of the invention to the surface thereof by spray, shower, dip coating or the like. Further, the efficiency of foreign matter removal can be enhanced by performing surface cleaning by use of a roll brush or the like in combination after the above-mentioned metalworking process. In the cleaning using the rust preventing oil composition of the invention, further, the adhesion amount of oil to the surface of the metallic member is preferably adjusted by performing surface treatment to the metallic member with a ringer roll or the like in combination.

The inventive hydrocarbon oil has features such that it is less odorous so that the working environments can be improved, and it hardly adversely affects a rubber or plastic part existing around a part where the oil is used.

Embodiment (Fourth Mode for Rust Preventing Oil Composition)

EXAMPLES AND COMPARATIVE EXAMPLES

The invention of this mode will be further concretely described based on Examples and Comparative Examples, but the invention of this mode is never limited by the following examples.

In Examples and Comparative Examples, rust preventing oil compositions were prepared using base oils shown in Table 1.4 in mixing ratios shown in Table 2.4. Components used for preparation of each rust preventing oil composition are as follows.

(2) Production of Base Oil Used
(Hydrogenation Refined Oil of FT Synthetic Oil, Wax Hydrocracked Oil, and Base Oils 1, 2, 6, 7)

1) FT synthetic hydrocarbon oil using natural gas as raw material (content of hydrocarbon with boiling point of 150° C. or higher: 82% by mass, content of hydrocarbon with boiling point of 360° C. or higher: 41% by mass) was separated into a light fraction with boiling point of 150° C. or lower, an intermediate fraction with boiling point of 150 to 360° C., and a tower bottom residue heavy wax content (FT wax: corresponding to a fraction with boiling point of higher than 360° C.) in a distillation tower.

2) The intermediate fraction separated in 1) was hydrogenation-refined by use of a hydrogenation refining catalyst (Pt: 0.8% by mass to carrier, USY zeolite/silica alumina/alumina binder: 3/57/40 by weight) under hydrogen gas flow in conditions of reaction temperature: 311° C., hydrogen pressure: 3.0 MPa, LHSV: 2.0 h$^{-1}$, and hydrogen/oil ratio; 340 NL/L.

2) As base oil 4, general hydrogenation refined mineral oil was used. The properties of the base oil 4 are shown in Table 1.4.

3) As base oil 5, general hydrogenation refined mineral oil was used. The properties of the base oil 5 are shown in Table 1.4.

TABLE 1.4

| | | Base Oil Number of Rust Preventing Oil | | | | | | |
|---|---|---|---|---|---|---|---|---|
| | | Base Oil 1 | Base Oil 2 | Base Oil 3 | Base Oil 4 | Base Oil 5 | Base Oil 6 | Base Oil 7 |
| Density (15° C.) | kg/m$^3$ | 783.0 | 748.9 | 799.8 | 862.2 | 902.1 | 782.8 | 749.4 |
| Kinematic Viscosity (@40° C.) | mm$^2$/s | 3.341 | 1.245 | 1.65 | 22.0 | 480 | 3.329 | 1.242 |
| Flash Point | ° C. | 128 | 60 | 81 | 210 | 312 | 130 | 58 |
| Aniline Point | ° C. | 97.8 | 82.1 | | 98.2 | 121.3 | 97.7 | 82.2 |
| Sulfur Content | mass ppm | Less than 1 | Less than 1 | Less than 10 | 0.09 | 0.51 | Less than 1 | Less than 1 |
| Distillation Properties IBP | ° C. | 259.5 | 168.0 | 201 | 290.1 | 441 | 257.0 | 171.0 |
| 5% | ° C. | 268.0 | 182.0 | 205 | 343.4 | 506 | 266.5 | 180.5 |
| 10% | ° C. | 270.0 | 184.0 | 209 | 359.6 | 527 | 269.0 | 182.0 |
| 50% | ° C. | 283.5 | 198.5 | 216 | 408.4 | 593 | 283.0 | 197.5 |
| 90% | ° C. | 316.5 | 221.5 | 228 | 444.6 | 665 | 315.5 | 221.5 |
| 95% | ° C. | 325.5 | 226.5 | 233 | 452.7 | 686 | 324.0 | 226.0 |
| EP | ° C. | 338.0 | 238.0 | 244 | 472.9 | 720 | 336.0 | 236.5 |
| Distillation Range (90-10) | ° C. | 46.5 | 37.5 | 19.0 | 85.0 | 138.0 | 46.5 | 39.5 |
| Distillation Range (EP-IBP) | ° C. | 78.5 | 70.0 | 48 | 182.8 | 279 | 79.0 | 65.5 |
| n-Paraffin Content | % by mass | 36.8 | 56.8 | 36 | 21 | 17 | 40.4 | 48.2 |
| Naphthene Content | vol % | 0 | 0 | 24.3 | 28.6 | 20 | 0 | 0 |
| Paraffin Content | vol % | 100 | 100 | 68.2 | 48.4 | 40 | 100 | 100 |
| Aromatic Content | vol % | 0 | 0 | 7 | 23 | 40 | 0 | 0 |
| Saturated Content | vol % | 100 | 100 | 92.5 | 77 | 60 | 100 | 100 |
| Unsaturated Content | vol % | 0 | 0 | 0.5 | | | 0 | 0 |
| Cetane Index | | 90.9 | 78.2 | 54.7 | 76.5 | 91 | 90.8 | 77.2 |
| Smoke Point | mm | | 45 | | | | | 44 |

3) The hydrogenation refined oil obtained in 2) was fractioned to a 150-250° C. fraction (kerosene fraction 1) and a 250-360° C. fraction (light oil fraction 1) by distillation.

4) The FT wax obtained in 1) was hydrocracked by use of a hydrocracking catalyst (Pt: 0.8% by mass to carrier, USY zeolite/silica alumina/alumina binder: 3/57/40 by weight) under hydrogen gas flow in conditions of reaction temperature: 326° C., hydrogen pressure: 4.0 MPa, LHSV: 2.0 h$^{-1}$, and hydrogen/oil ratio: 680 NL/L.

5) The hydrocracked oil obtained in 4) was fractioned to a 150-250° C. fraction (kerosene fraction 2) and a 250-360° C. fraction (light oil fraction 2) by distillation.

6) Diluted base oil 1 was obtained by mixing the light oil fractions obtained in 3) and 5) together in a ratio of 51:49 (by mass). The properties of the base oil 1 are shown in Table 1.4.

7) Base oil 2 was obtained by mixing the kerosene oil fractions 1 and 2 obtained in 3) and 5) together in a ratio of 63:37 (by mass). The properties of the base oil 2 are shown in Table 1.4.

8) Diluted base oil 6 was obtained by mixing the light oil fractions 1 and 2 obtained in 3) and 5) together in a ratio of 57:43 (by mass). The properties of the base oil 6 are shown in Table 1.4.

9) Base oil 7 was obtained by mixing the kerosene fractions 1 and 2 obtained in 3) and 5) together in a ratio of 49:51 (by mass). The properties of the base oil 7 are shown in Table 1.4.

(Base Oils 3 to 5)

1) As base oil 3, general hydrogenation refined mineral oil was used. The properties of the base oil 3 are shown in Table 1.4.

In Examples and Comparative Example, rust preventing oil compositions having compositions shown in Table 2.4 were prepared using the base oils shown in Table 1.4 and additives described below.

The additives added to the rust preventing oils which are shown in Table 2.4 are as follows.

(Additives)

A1: Alkylbenzene calcium sulfonate

A2: Calcium salt of oxidized wax

A3: Ester of polyhydric alcohol

A4: di-tert-Butyl-p-cresol

Resin Compatibility Test

The compatibility with resin was tested according to the following method.

Testing method: A resin to be evaluated (50 mm×50 mm×5 mm) is perfectly dipped in 300 ml of sample oil. Thereafter, the resin is held at 25±3° C. for 30 days to measure a volume change rate.

Evaluation method: The volume change rate is evaluated by ○: less than 10% and x: 10% or more.

Kind of evaluation object resin: Polyethylene resin, NBR rubber

Other Tests:

A wetting test according to JIS K2246 and a salt spray test according to JIS K2246 were also performed.

The respective results are shown in Table 2.4.

TABLE 2.4

Solvent-Used Rust Preventing Oil (% by mass)

|  |  | Example 1 | Example 2 | Comparative Example 1 |
|---|---|---|---|---|
| Base Oil 1 |  | 59.5 | — | — |
| Base Oil 2 |  | — | 59.5 | — |
| Base Oil 3 |  | — | — | 59.5 |
| Base Oil 4 |  | 10 | 10 | 10 |
| Base Oil 5 |  | 10 | 10 | 10 |
| A1 |  | 10 | 10 | 10 |
| A2 |  | 5 | 5 | 5 |
| A3 |  | 5 | 5 | 5 |
| B1 |  | 0.5 | 0.5 | 0.5 |
| Resin Compatibility Test | Polyethylene | ○ | ○ | x |
|  | NBR | ○ | ○ | x |
| Humidity Cabinet Test: Grade/1000 hrs. |  | A | A | A |
| Salt Spray Test: Grade/48 hrs. |  | A | A | A |

Fifth Mode (Detergent Composition)
Properties of Hydrocarbon Oil as Base Oil:

The detergent oil composition of the invention contains the above-mentioned hydrocarbon oil, or a hydrocarbon oil having a density at 15° C. of 0.7 to 0.8 g/cm$^3$, and including a n-paraffin content of 10 to 90% by mass, an aromatic content of 0 to 3% by volume, and a naphthene content of 0 to 20% by volume (referred to as inventive hydrocarbon oil in the fifth mode). More specifically, although the hydrocarbon oil has the properties as described above, the following mode A can be given as a more concrete and preferable mode thereof.

In the preferable mode A, the kinematic viscosity (mm$^2$/s) is preferably 0.5 to 5.0 mm$^2$/s, further preferably 1.0 to 3.0 mm$^2$/s, more preferably 1.0 to 2.0 mm$^2$/s. Kinematic viscosities below and beyond the above-mentioned range undesirably cause deterioration of compatibility with organic resin material and deterioration of cleaning property, respectively.

In the preferable mode A, the initial boiling point (° C.) is preferably 140 to 260° C., further preferably 150 to 255° C., more preferably 160 to 250° C., most preferably 165 to 245° C. When the initial boiling point is too low, the usage of lubricant is undesirably increased.

In the preferable mode A, the 10%-distillation point (° C.) is preferably 150 to 270° C., further preferably 160 to 265° C., more preferably 170 to 260° C., most preferably 180 to 255° C.

In the preferable mode A, the 90%-distillation point (° C.) is preferably 180 to 320° C., further preferably 190 to 310° C., more preferably 200 to 300° C., most preferably 210 to 290° C.

In the preferable mode A, the end point (° C.) is preferably 190 to 310° C., further preferably 200 to 300° C., more preferably 210 to 290° C., most preferably 220 to 280° C.

In the invention of this mode, which includes the above-mentioned hydrocarbon oil as base oil, any one of mineral oil, synthetic oil and oil fat can be used in combination therewithout limiting the kind thereof. In the combined use, mineral oil or synthetic oil is particularly preferably used. The combining ratio thereof is not particularly limited, and can be optionally selected as long as the effect of the present invention is not impaired. However, the content of the hydrocarbon oil of the invention is set to preferably 60% by mass or more, based on the total amount of the detergent oil composition, more preferably 70% by mass, most preferably 80% by mass or more.

The content of the base oil other than the hydrocarbon oil of the invention is set to preferably 30% by mass or less, based on the total amount of the detergent oil composition, more preferably 20% by mass or less, most preferably 10% by mass or less.

As the base oil other than the hydrocarbon oil of the invention to be used in combination, oil higher in viscosity than the hydrocarbon oil of the invention, more concretely, base oil having a kinematic viscosity at 40° C. exceeding 6 mm$^2$/s is usable.

The detergent oil of the invention preferably further includes a compound represented by the following general formula as a component (D);

wherein $R^3$ represents a hydrocarbon group having 1 to 24 carbon atoms, $R^4$ represents an alkylene group having 2 to 4 carbon atoms, a and c each represent 1 or 2, satisfying the condition represented by a+c=3, and b represents an integer of 1 to 6. According to this, the rust preventing property can be further enhanced.

Examples of the hydrocarbon group represented by $R^3$ in the formula (2) of this mode include alkyl group, alkenyl group, cycloalkyl group, alkylcycloalkyl group, aryl group, alkylaryl group, and arylalkyl group. Particularly, alkyl group, cycloalkyl group, and alkylcycloalkyl group are preferred, and alkyl group and cycloalkyl group are more preferred. The number of carbon atoms in the hydrocarbon group represented by $R^3$ is 1 to 24 as described above, preferably 1 to 18, more preferably 1 to 12, further preferably 1 to 10, most preferably 1 to 8.

The above-mentioned (a) and (c), which each represent an integer of 1 or 2, satisfying the condition of a+c=3, are preferably 1 and 2, respectively. Further, (b), which is an integer of 1 to 6 as described above, is preferably an integer of 1 to 4, more preferably an integer of 1 to 3, further preferably 1 or 2, most preferably 1.

Preferable combinations of $R^3$, $R^4$, and (a) to (c) in the formula (2) of this mode are shown in Table 1.5.

TABLE 1.5

| Compound No. | $R^3$ | $R^4$ | a | b | c |
|---|---|---|---|---|---|
| 1 | Methyl | Ethylene | 1 | 1 | 2 |
| 2 | Methyl | Ethylene | 2 | 1 | 1 |
| 3 | Methyl | Propylene | 1 | 1 | 2 |
| 4 | Methyl | Propylene | 2 | 1 | 1 |
| 5 | Ethyl | Ethylene | 1 | 1 | 2 |
| 6 | Ethyl | Ethylene | 2 | 1 | 1 |
| 7 | Ethyl | Propylene | 1 | 1 | 2 |
| 8 | Ethyl | Propylene | 2 | 1 | 1 |
| 9 | Isopropyl | Ethylene | 1 | 1 | 2 |
| 10 | Isopropyl | Ethylene | 2 | 1 | 1 |
| 11 | Isopropyl | Propylene | 1 | 1 | 2 |
| 12 | Isopropyl | Propylene | 2 | 1 | 1 |
| 13 | n-Butyl | Ethylene | 1 | 1 | 2 |
| 14 | n-Butyl | Ethylene | 2 | 1 | 1 |
| 15 | n-Butyl | Propylene | 1 | 1 | 2 |
| 16 | n-Butyl | Propylene | 2 | 1 | 1 |
| 17 | 2-Butyl | Ethylene | 1 | 1 | 2 |
| 18 | 2-Butyl | Ethylene | 2 | 1 | 1 |
| 19 | 2-Butyl | Propylene | 1 | 1 | 2 |
| 20 | 2-Butyl | Propylene | 2 | 1 | 1 |
| 21 | 3-Butyl | Ethylene | 1 | 1 | 2 |
| 22 | 3-Butyl | Ethylene | 2 | 1 | 1 |
| 23 | 3-Butyl | Propylene | 1 | 1 | 2 |
| 24 | 3-Butyl | Propylene | 2 | 1 | 1 |
| 25 | Cyclohexyl | Ethylene | 1 | 1 | 2 |
| 26 | Cyclohexyl | Ethylene | 2 | 1 | 1 |

TABLE 1.5-continued

| Compound No. | R³ | R⁴ | a | b | c |
|---|---|---|---|---|---|
| 27 | Cyclohexyl | Propylene | 1 | 1 | 2 |
| 28 | Cyclohexyl | Propylene | 2 | 1 | 1 |

The content of the compound represented by the formula (2) of this mode is preferably 0.1 to 10% by mass, based on the total amount of the composition, more preferably 0.2 to 9% by mass, further preferably 0.3 to 8% by mass, further more preferably 0.5 to 7% by mass. When the content is below 0.1% by mass, the rust preventing property cannot be expected. Even if the content is beyond 10% by mass, the improvement in effect proportionate to the content effect cannot be expected, and the rust preventing property may be rather deteriorated.

Although components (G) and (I) described later include those corresponding to the compound represented by the formula (2) of this mode, the content of the compound represented by the formula (2) of this mode referred to herein means the total sum of contents of the compounds concerned contained in the detergent composition with no distinction from the components (G) and (I).

The detergent composition of the invention preferably further includes wax as a component (E). According to this, the rust preventing property of the detergent composition of the invention can be enhanced.

The content of the wax is preferably 0.5 to 10% by mass, based on the total amount of the composition, more preferably 1 to 8% by mass, further preferably 2 to 5% by mass, although it may be optionally determined. When the content is below 1% by mass, the improving effect of rust preventing property by the addition cannot be obtained, and when it exceeds 10% by mass, the handling property is deteriorated due to deterioration of low-temperature fluidity.

The detergent composition of this mode can further include other additives for further enhancing the excellent performances thereof.

Concrete examples of the other additives include (F) phenol-based or amine-based antioxidant; (G) sulfonate; (H) partial ester of polyhydric alcohol; (I) amine salt of fatty acid; (J) at least one selected from benzotriazole compound, thiadiazole compound, and benzothiadiazole compound; (K) alkyl or alkenyl succinic acid derivative; (L) monohydric alcohol having 10 to 24 carbon atoms; (M) lanolin fatty acid ester; and (N) at least one selected from oxidized paraffin, salt of oxidized paraffin and ester of oxidized paraffin. The content (in total) of the other additives is generally preferably 15% by mass or less, based on the total amount of the composition, more preferably 10% by mass or less, although it may be optionally determined.

When the detergent composition of the invention is used as detergents for removing fingerprints from a metallic part which is mainly handled with bare hands and for removing a corrosive factor such as chloride generated in metal working process, a combined use of nonionic surfactant with water is preferred.

Concrete examples of the nonionic surfactant include alkylene glycol, polyoxyalkylene glycol, polyoxyalkylene alkyl ether, polyoxyalkylene aryl ether, fatty acid ester of polyoxyalkylene adduct of polyhydric alcohol, polyoxyalkylene fatty acid ester, polyoxyalkylene alkylamine, and alkylalkanolamide.

As the nonionic surfactant component in the present invention, as is matter of course, one kind selected from these compounds may be used singly, or two kinds or more thereof may be used in combination.

In the detergent composition of the invention, the content of the nonionic surfactant is preferably 0.5 to 20% by mass, based on the total amount of the composition. Namely, from the point of solution stability (two-layer separation, etc.) of the detergent composition, the content is preferably 0.5% by mass or more, more preferably 1% by mass or more, further more preferably 1.5% by mass or more, most preferably 2% by mass or more. From the point of cleaning performance, the content is preferably 20% by mass or less, more preferably 15% by mass or less, further preferably 10% by mass or less, most preferably 7% by mass or less.

The component to be combined with the nonionic surfactant in the invention is water. As such water, industrial water, city water, ion exchange water, distilled water, and water treated with activated charcoal or through a household water filter can be optionally used.

In the detergent composition of the invention, the content of the water combined with the nonionic surfactant is preferably 0.1 to 20% by mass, based on the total amount of the composition. Namely, from the point of cleaning performance, the content of water is preferably 0.1% by mass or more, more preferably 0.5% by mass or more, most preferably 0.8% by mass or more. From the point of solution stability (two-layer separation, etc.) of the detergent composition, the content is preferably 20% by mass or less, more preferably 15% by mass or less, further preferably 10% by mass or less, most preferably 5% by mass or less.

In the detergent composition of the invention, the ratio of the nonionic surfactant to the water (by mass) is preferably 20:1 to 1:6. When the content of the nonionic surfactant exceeds 20 times the content of water, the cleaning performance is apt to be insufficient, and when the content of the nonionic surfactant is less than 1/6 of the content of water, the solution stability (two-layer separation, etc.) of the detergent composition is apt to be insufficient. For the same reason, the ratio of the nonionic surfactant to the water (by mass) is preferably 10:1 to 1:4, more preferably 6:1 to 1:3.

Further, when the detergent composition of the invention is used as a detergent for cleaning a water-soluble lubricant adhered mainly to a metallic part, amine salt of fatty acid, alkyl succinic acid derivative, alkenyl succinic acid derivative, phosphate, phosphite or the like is preferably mixed thereto.

In the detergent composition of the invention, the content of the component (B) is preferably 0.1 to 10% by mass, based on the total amount of the composition. From the point of cleaning performance, the content is preferably 0.1% by mass or more, more preferably 0.3% by mass or more, further more preferably 0.5% by mass or more, most preferably 1% by mass or more. Further, since the effect proportionate to the content cannot be obtained even if the content exceeds 10% by mass, the content is preferably 10% by mass or less, more preferably 8% by mass or less, further preferably 7% by mass or less, most preferably 6% by mass or less.

The detergent composition of the invention having the above-mentioned constitution has excellent efficiency of removing a residue such as metalworking oil, abrasion powder or rust preventing oil. Therefore, a metallic product can be shipped without application of rust preventing oil thereto by cleaning the metallic part by use of the detergent composition of the invention after metalworking process. The detergent composition of the invention is particularly excellent in cleaning performance of water-insoluble metalworking lubricant.

Therefore, the detergent composition of the invention is particularly useful for cleaning/degreasing of a metallic part for a refrigeration system such as a cooling device for a room air conditioner, a package air conditioner, a refrigerator, an automotive air conditioner, a dehumidifier, a freezer, a refrigerator-freezer, a vending machine, a showcase, a chemical plant or the like.

From the point that the probability of clogging of the refrigeration system can be further reduced, it is preferred to wash off, prior to shipping of the metallic part, the detergent composition of the invention itself with a solvent such as kerosene after using the detergent composition. On the other hand, when the effect as temporary rust preventing oil is expected for the detergent composition of the invention, it is preferred to ship the metallic part as it is without washing off the detergent composition with the solvent such as kerosene.

Examples of the solvent other than kerosene include a solvent produced by distillation of petroleum or refining such as hydrogenation refining or solvent refining after distillation, a solvent obtained by polymerization or Fischer-Tropsch reaction of low molecular hydrocarbon such as methane, ethylene, or propylene, and other general solvents.

Although the metallic part can be shipped without application of rust preventing oil thereto by cleaning the metallic part with the detergent composition of the invention, the rust preventing oil can be applied prior to shipping when further reduction in probability of rusting of the metallic part is desired. The rust preventing oil used therefor can be easily and surely removed using the detergent composition of the invention prior to the assembling process of the metallic part. However, as the rust preventing oil, a one which has excellent rust preventing property and never causes clogging of the refrigeration system even if the removal of rust preventing oil prior to the assembling process is not necessarily perfect is preferably used.

Embodiment (Fifth Mode for Detergent Composition)

The invention of this mode will be concretely described based on Examples and Comparative Examples, but the invention of this mode is never limited by the following examples.

In Examples and Comparative Examples, detergent compositions were prepared using base oils shown in Table 2.5 in mixing ratios shown in Table 3.5. Components used for preparation of each detergent component are as follows.

(1) Production of Base Oil Used (Hydrogenation Refined Oil of FT Synthetic Oil, Wax Hydrocracked Oil, and Base Oils 1, 2, 6, 7)

1) FT synthetic hydrocarbon oil using natural gas as raw material (content of hydrocarbon with boiling point of 150° C. or higher: 82% by mass, content of hydrocarbon with boiling point of 360° C. or higher: 41% by mass) was separated into a light fraction with boiling point of 150° C. or lower, an intermediate fraction with boiling point of 150 to 360° C., and a tower bottom residue heavy wax content (FT wax: corresponding to a fraction with boiling point of higher than 360° C.) in a distillation tower.

2) The intermediate fraction separated in 1) was hydrogenation-refined by use of a hydrogenation refining catalyst (Pt: 0.8% by mass to carrier, USY zeolite/silica alumina/alumina binder: 3/57/40 by weight) under hydrogen gas flow in conditions of reaction temperature: 311° C., hydrogen pressure: 3.0 MPa, LHSV: 2.0 h$^{-1}$, and hydrogen/oil ratio; 340 NL/L.

3) The hydrogenation refined oil obtained in 2) was fractioned to a 150-250° C. fraction (kerosene fraction 1) and a 250-360° C. fraction (light oil fraction 1) by distillation.

4) The FT wax obtained in 1) was hydrocracked by use of a hydrocracking catalyst (Pt: 0.8% by mass to carrier, USY zeolite/silica alumina/alumina binder: 3/57/40 by weight) under hydrogen gas flow in conditions of reaction temperature: 326° C., hydrogen pressure: 4.0 MPa. LHSV: 2.0 h$^{-1}$, and hydrogen/oil ratio: 680 NL/L.

5) The hydrocracked oil obtained in 4) was fractioned to a 150-250° C. fraction (kerosene fraction 2) and a 250-360° C. fraction (light oil fraction 2) by distillation.

6) Diluted base oil 1 was obtained by mixing the light oil fractions 1 and 2 obtained in 3) and 5) together in a ratio of 51:49 (by mass). The properties of the base oil 1 are shown in Table 1.5

7) Base oil 2 was obtained by mixing the kerosene oil fractions 1 and 2 obtained in 3) and 5) together in a ratio of 63:37 (by mass). The properties of the base oil 2 are shown in Table 1.5

8) Diluted base oil 6 was obtained by mixing the light oil fractions 1 and 2 obtained in 3) and 5) together in a ratio of 57:43 (by mass). The properties of the base oil 6 are shown in Table 1.5.

9) Base oil 7 was obtained by mixing the kerosene fractions 1 and 2 obtained in 3) and 5) together in a ratio of 49:51 (by mass). The properties of the base oil 7 are shown in Table 1.5.

(Base Oils 3 to 5)

1) As base oil 3, general hydrogenation refined mineral oil was used. The properties of the base oil 3 are shown in Table 1.5.

2) As base oil 4, general hydrogenation refined mineral oil was used. The properties of the base oil 4 are shown in Table 1.5.

3) As base oil 5, general hydrogenation refined mineral oil was used. The properties of the base oil 5 are shown in Table 1.5.

(2) Properties of Base Oils

The properties of the base oils are as shown in Table 2.5.

Additives added to the rust preventing oils which are shown in Tables 2.5 to 4.5 are as follows.

A1: Alkylbenzene calcium sulfonate
A2: Calcium salt of oxidized wax
A3: Ester of polyhydric alcohol
B1: Di-tert-butyl-p-cresol
C1: Dicyclohexylamine EO adduct
C2: City water
C3: Octanoic acid 1-octylamine salt

TABLE 2.5

| | | Base Oil Number of Detergent Oil | | | | | | |
|---|---|---|---|---|---|---|---|---|
| | | Base Oil 1 | Base Oil 2 | Base Oil 3 | Base Oil 4 | Base Oil 5 | Base Oil 6 | Base Oil 7 |
| Density (15° C.) | kg/m³ | 783.0 | 748.9 | 799.8 | 862.2 | 902.1 | 782.8 | 749.4 |
| Kinematic Viscosity (@40° C.) | mm²/s | 3.341 | 1.245 | 1.65 | 22.0 | 480 | 3.329 | 1.242 |
| Flash Point | ° C. | 128 | 60 | 81 | 210 | 312 | 130 | 58 |
| Aniline Point | ° C. | 97.8 | 82.1 | | 98.2 | 121.3 | 97.7 | 82.2 |
| Sulfur Content | mass ppm | Less than 1 | Less than 1 | Less than 10 | 0.09 | 0.51 | Less than 1 | Less than 1 |
| Distillation Properties IBP | ° C. | 259.5 | 168.0 | 201 | 290.1 | 441 | 257.0 | 171.0 |
| 5% | ° C. | 268.0 | 182.0 | 205 | 343.4 | 506 | 266.5 | 180.5 |
| 10% | ° C. | 270.0 | 184.0 | 209 | 359.6 | 527 | 269.0 | 182.0 |
| 50% | ° C. | 283.5 | 198.5 | 216 | 408.4 | 593 | 283.0 | 197.5 |
| 90% | ° C. | 316.5 | 221.5 | 228 | 444.6 | 665 | 315.5 | 221.5 |
| 95% | ° C. | 325.5 | 226.5 | 233 | 452.7 | 686 | 324.0 | 226.0 |
| EP | ° C. | 338.0 | 238.0 | 244 | 472.9 | 720 | 336.0 | 236.5 |
| Distillation Range (90-10) | ° C. | 46.5 | 37.5 | 19.0 | 85.0 | 138.0 | 46.5 | 39.5 |
| Distillation Range (EP-IBP) | ° C. | 78.5 | 70.0 | 48 | 182.8 | 279 | 79.0 | 65.5 |
| n-Paraffin Content | % by mass | 36.8 | 56.8 | 36 | 21 | 17 | 40.4 | 48.2 |
| Naphthene Content | vol % | 0 | 0 | 24.3 | 28.6 | 20 | 0 | 0 |
| Paraffin Content | vol % | 100 | 100 | 68.2 | 48.4 | 40 | 100 | 100 |
| Aromatic Content | vol % | 0 | 0 | 7.0 | 23 | 40 | 0 | 0 |
| Saturated Content | vol % | 100 | 100 | 92.5 | 77 | 60 | 100 | 100 |
| Unsaturated Content | vol % | 0 | 0 | 0.5 | | | 0 | 0 |
| Cetane Index | | 90.9 | 78.2 | 54.7 | 76.5 | 91 | 90.8 | 77.2 |
| Smoke Point | mm | | 45 | | | | | 44 |

The following tests were performed to each sample oil shown in Tables 2.5 to 4.5.

Resin Compatibility Test

Testing method: A resin to be evaluated (50 mm×50 mm×5 mm) is perfectly dipped in 300 ml of sample oil. Thereafter, the resin is held at 25±3° C. for 30 days to measure a volume change rate.

Evaluation method: The volume change rate is evaluated by ○: less than 10% and x: 10% or more.

Kind of evaluation object resin: Polyethylene resin, NBR rubber Cleaning Test

Testing method: A test piece was prepared by adhering each of eleven kinds of JIS dusts to a cold rolled steel plate. Various detergent rust preventing oils described above were sprayed to the test piece at a fixed blow rate for 30 seconds. After completion of cleaning, the quantity of dust left on the test piece was measured, and the cleaning rate of the test piece was determined according to the following equation.

Cleaning rate (%)=(1−(Uncleaned dust quantity/Adhered dust quantity before test))×100

The results are shown in Table 3.5.

Fingerprint Removability Test

The test was performed by a method according to JIS K2246 5.31 "Fingerprint Removability Test".

Water Displacement Test

A test piece cleaned by a method regulated in JIS K2246 "Rust Preventing Oil" was dipped in an aqueous solution of 0.1% by mass sodium chloride, and the test piece was taken out and then immediately gently moved into a 500-ml beaker containing 400 ml of a detergent composition. The test piece was taken out after 1 minute, transferred gently into a 500-ml beaker containing 400 ml of kerosene to remove the detergent composition, further transferred to a 500-ml beaker containing 400 ml of n-hexane to remove the kerosene.

The test piece was then horizontally placed on a base within a container 3 filled with water so as not to directly contact with the water 2, capped, and stored at room temperature.

After the lapse of 24 hours, the cleaning performance of the detergent composition was evaluated by evaluating rusting/non-rusting. The results are shown in Table 4.5.

TABLE 3.5

| | Solvent-Used Rust Preventing Oil (% by mass) | | |
|---|---|---|---|
| | Example 1 | Example 2 | Comparative Example 1 |
| Base Oil 1 | 95.5 | | |
| Base Oil 2 | | 95.5 | |
| Base Oil 3 | | | 95.5 |
| Base Oil 4 | 2 | 2 | 2 |
| A1 | 1 | 1 | 1 |
| A2 | 0.5 | 0.5 | 0.5 |
| A3 | 0.5 | 0.5 | 0.5 |
| B1 | 0.5 | 0.5 | 0.5 |
| Resin Compatibility Test Polyethylene | ○ | ○ | x |
| NBR | ○ | ○ | x |
| Cleaning Rate | 100% | 100% | 100% |

TABLE 4.5

| | Solvent-Used Rust Preventing Oil (% by mass) |
|---|---|
| | Example 1 |
| Base Oil 1 | 94.0 |
| Base Oil 4 | 2 |
| A1 | 1 |
| A2 | 0.5 |
| A3 | 0.5 |
| B1 | 0.5 |
| C1 | 0.5 |

TABLE 4.5-continued

Solvent-Used Rust Preventing Oil (% by mass)

| | | Example 1 |
|---|---|---|
| C2 | | 1.0 |
| Resin Compatibility Test | Polyethylene | ○ |
| | NBR | ○ |
| Cleaning Rate | | 100% |
| Fingerprint Removability Test | | Non-rusting |

TABLE 5.5

Solvent-Used Rust Preventing Oil (% by mass)

| | | Example 1 |
|---|---|---|
| Base Oil 1 | | 93.5 |
| Base Oil 4 | | 2 |
| A1 | | 1 |
| A2 | | 0.5 |
| A3 | | 0.5 |
| B1 | | 0.5 |
| C3 | | 2.0 |
| Resin Compatibility Test | Polyethylene | ○ |
| | NBR | ○ |
| Cleaning Rate | | 100% |
| Water Displacement Test | | Non-rusting |

Industrial Applicability

The multifunctional hydrocarbon oil composition of the invention can be used for various industrial purposes by utilizing the features of the hydrocarbon base oil.

For example, the metalworking oil as the invention of the first mode is used for working various metals such as aluminum, magnesium, transition metal such as copper, iron, chromium, nickel, zinc, tin, or titanium, and alloys thereof. This oil can be applied to processing methods, including metal working such as cold, warm, and hot rolling, pressing, stamping, squeezing, drawing, extraction, forging, and cutting/grinding including minimal quantitative lubrication (MQL) cutting.

In the invention of the second mode as metalworking oil, the metalworking oil composition of the invention having the above-mentioned constitution can be suitably used for extensive purposes of metal working field since it is excellent in processing performance such as processing efficiency or tool life and in handling property. The metal working referred to herein extensively means general metalworking without being limited to cutting/grinding. The metalworking oil composition of the invention in the second mode is preferably used as a lubricant for minimal quantitative lubrication (MQL) working since a further remarkable effect can be exhibited, although it is applicable to metalworking by general lubrication method.

In the invention of the third mode as electric discharge machining oil, both workability in electric discharge machining and storage stability can be attained in a high level. Particularly, the electric discharge machining oil composition of the invention as the invention of the third mode is particularly suitable for finish processing, although it can be suitably used for both rough processing and finish processing, and can further enhance the processing rate to improve the workability.

In the invention of the fourth mode as rust preventing oil composition, the rust preventing oil composition of the invention can attain all of rust preventing property, degreasing property and storage stability in a high level in a well-balanced manner, and thus can be suitably used as rust preventing oil for various metallic members. The metallic member that is a treatment object is not particularly limited, and concrete examples thereof include a surface-treated steel plate to be worked into an automotive body or electric product body, such as cold rolled steel plate, hot rolled steel plate, high-tension steel plate or galvanized steel plate, a metallic plate material such as original sheet for tin plate, aluminum alloy plate or magnesium alloy plate, further, a bearing part such as rolling bearing, tapered rolling bearing, or needle bearing, a building steel product, and a precise part.

In the invention of the fifth mode as detergent composition, excellent removing efficiency of a residue such as metalworking oil, abrasion powder, or rust preventing oil can be obtained, and metallic parts can be thus shipped without application of rust preventing oil thereto by cleaning them with the detergent composition of the invention after metalworking process. Particularly, the detergent composition of the invention is excellent in cleaning performance of water-insoluble metalworking lubricant.

Accordingly, the detergent composition of the invention is particularly effectively used for cleaning/degreasing of a metallic part for a refrigeration system such as a cooling device of a room air conditioner, a package air conditioner, a refrigerator, an automotive air conditioner, a dehumidifier, a freezer, a refrigerator-freezer, a vending machine, a showcase, a chemical plant or the like.

The invention claimed is:

1. A metal working oil composition comprising:
    a light oil/kerosene fraction hydrocarbon oil produced by a production process comprising a hydrocracking process for a wax-containing component, and optionally a hydrogenation refining process for a component obtained from the hydrocracking process for a wax-containing component;
    wherein the hydrocarbon oil has a density at 15° C. of 0.73 to 0.785 g/cm$^3$ and a kinematic viscosity at 40° C. of 1.0 to 5.5mm$^2$/s;
    wherein the hydrocarbon oil comprises 10 to 90% by mass of n-paraffin, 0% by volume of aromatics, 0% by volume of naphthene,
    a first oily agent consisting of a monohydric alcohol, and
    optionally a second oily agent comprising at least one selected from the group consisting of an ester and a carboxylic acid;
    wherein the hydrocarbon oil comprises 30 mass % or more relative to a total amount of the metalworking oil composition; and
    wherein a total amount of the first oily agent and the second oily agent consists of .01 to 15 mass % relative to a total amount of the composition.

2. A method of producing a metalworking oil composition comprising a light oil/kerosene fraction hydrocarbon oil and a first oily agent, the method comprising:
    hydrocracking a wax-containing component, and optionally carrying out a hydrogenation refining process for a component obtained from hydrocracking the wax-containing component;
    wherein the hydrocarbon oil has a density at 15° C. of 0.73 to 0.785 g/cm$^3$ and a kinematic viscosity at 40° C. of 1.0 to 5.5 mm$^2$/s;
    wherein the hydrocarbon oil comprises 10 to 90% by mass of n-paraffin, 0% by volume of aromatics, 0% by volume of naphthene,
    a first oily agent consisting of a monohydric alcohol; and
    optionally a second oily agent comprising at least one selected from the group consisting of an ester and a carboxylic acid;

wherein the hydrocarbon oil comprises 30 mass % or more; and wherein a total amount of the first oily agent and the second oily agent consists of .01 to 15 mass % relative to a total amount of the composition.

3. The metalworking oil composition of claim 1 wherein the total amount of the first oily agent and the second oily agent comprise 0.07 to 10 mass % relative to a total amount of the metalworking oil composition.

4. The method of claim 2 wherein the total amount of the first oily agent and the second oily agent comprises 0.07 to 10 mass % relative to a total amount of the metalworking oil composition.

5. The metalworking oil composition according to claim 2, wherein a content of an oxygenated compound is 0.005 to 10.0 mass % relative to the total amount of the metalworking oil composition.

6. The metalworking oil composition according to claim 3, wherein a content of an oxygenated compound is 0.005 to 10.0 mass % relative to the total amount of the metalworking oil composition.

7. The metalworking oil composition according to claim 6, wherein the second oily agent comprises the ester of a monohydric alcohol and an acid selected from the group consisting of a first monobasic acid consisting of a total of 7 to 26 carbon atoms, a carboxylic acid of a second monobasic acid consisting of 6 to 20 carbon atoms, and combinations thereof.

8. The method of producing the metalworking oil composition according to claim 2, wherein a content of an oxygenated compound is 0.005 to 10.0 mass % relative to the total amount of the metalworking oil composition.

9. The method of producing the metalworking oil composition according to claim 4, wherein a content of an oxygenated compound comprises 0.005 to 10.0 mass % relative to the total amount of the metalworking oil composition.

10. The method of producing the metalworking oil composition according to claim 9, wherein the second oily agent comprises the ester of monohydric alcohol and an acid selected from the group consisting of a first monobasic acid consisting of 7 to 26 total carbon atoms, a carboxylic acid of a second monobasic acid consisting of 6 to 20 carbon atoms, and combinations thereof.

11. A metal working oil composition consisting of a light oil/kerosene fraction hydrocarbon oil produced by a production process comprising a hydrocracking process for a wax-containing component, and optionally a hydrogenation refining process for a component obtained from the hydrocracking process for a wax-containing component, wherein the hydrocarbon oil has a density at 15° C. of 0.73 to 0.785g/cm$^3$ and a kinematic viscosity at 40° C. of 1.0 to 5.5mm$^2$/s;

wherein the hydrocarbon oil comprises 10 to 90% by mass of n-paraffin, 0% by volume of aromatics, 0% by volume of naphthene, a first oily agent consisting of a monohydric alcohol; and optionally a second oily agent comprising at least one selected from the group consisting of an ester and a carboxylic acid;

wherein the hydrocarbon oil comprises 30 mass % or more relative to a total amount of the metalworking oil composition; and wherein a total amount of the first oily agent and the second oily agent consists of 0.01 to 15 mass % relative to a total amount of the composition.

* * * * *